INVENTOR
THEO HENSE
By Toulmin & Toulmin
Attorneys

FIG. 2

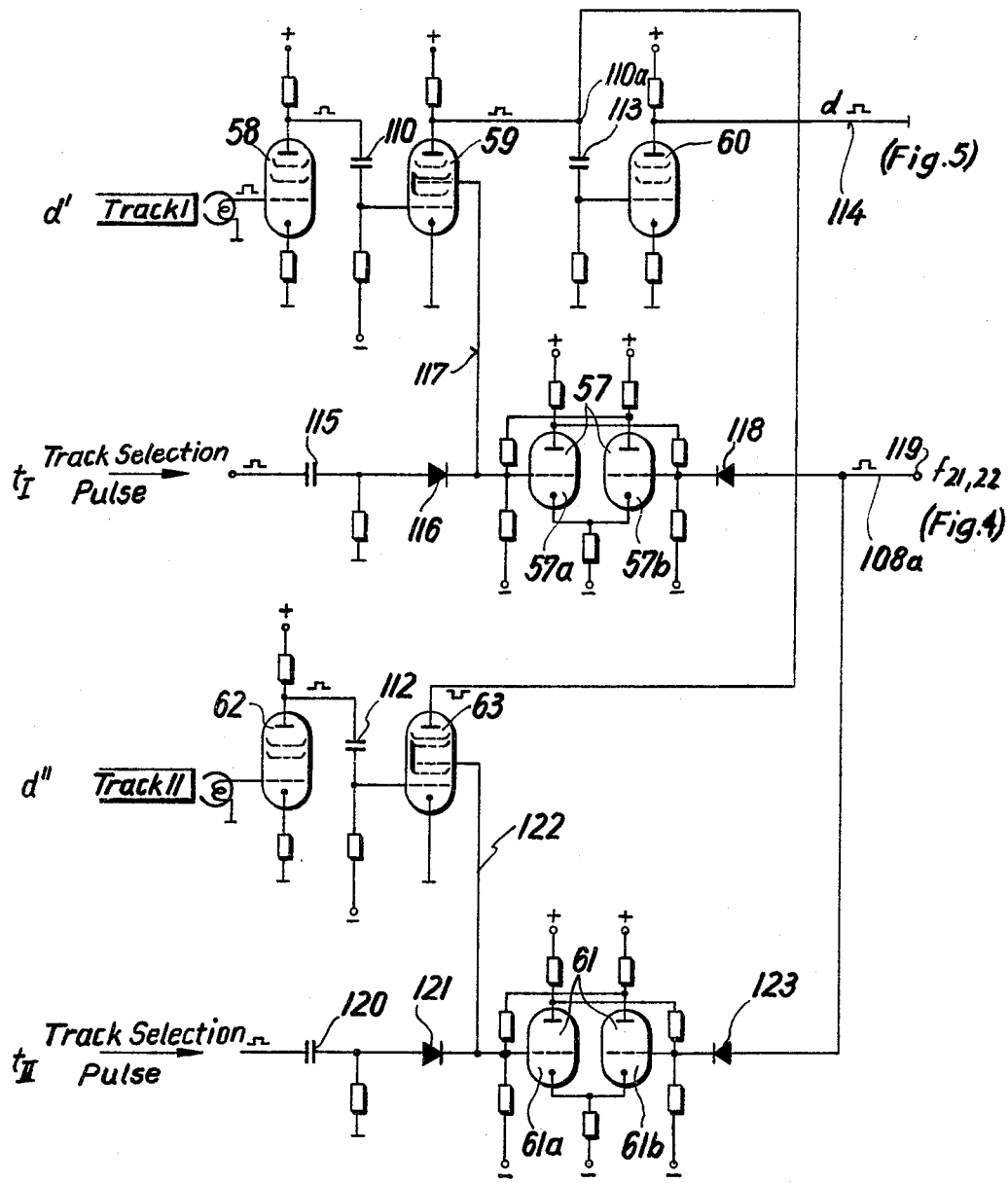

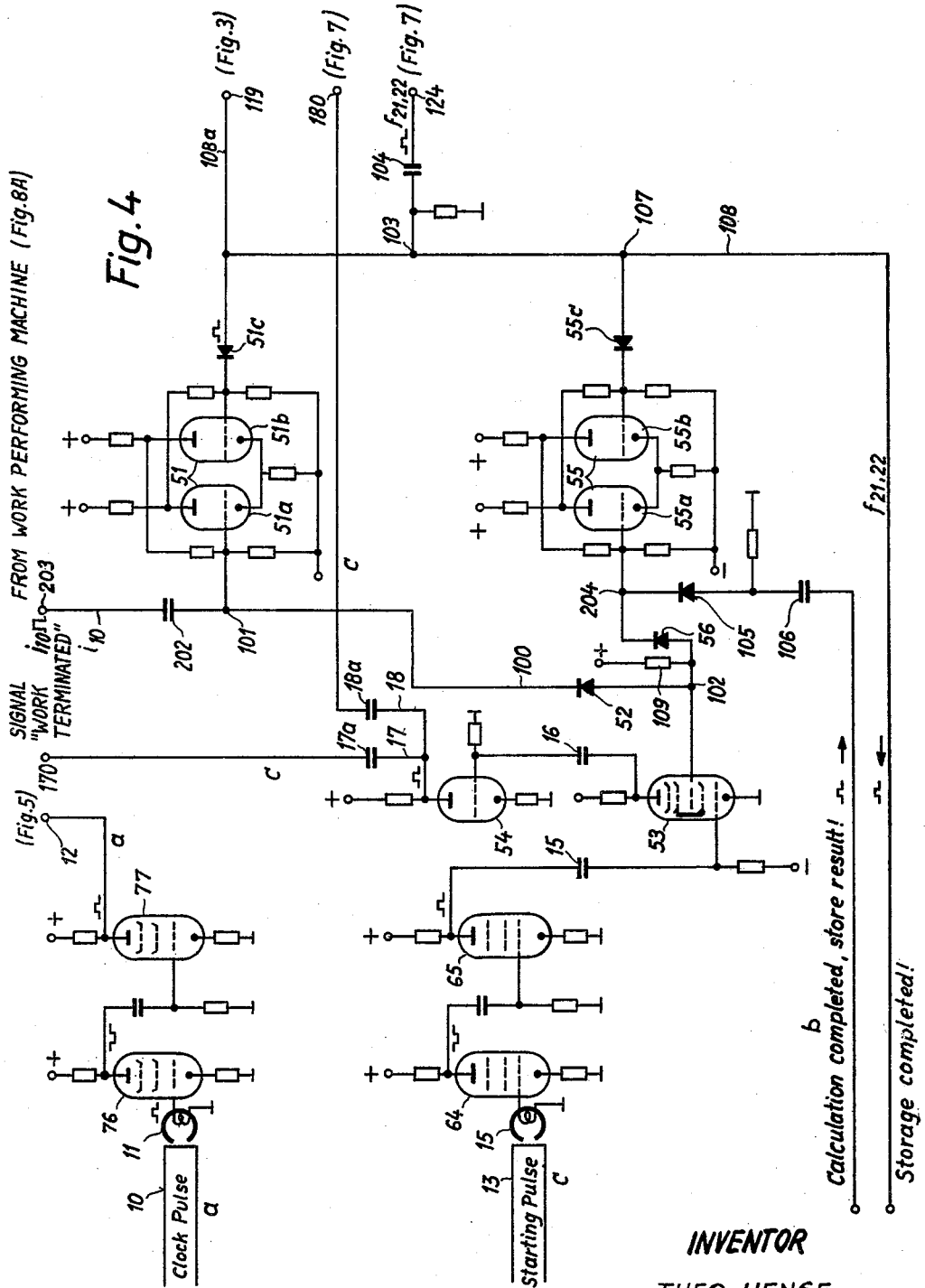

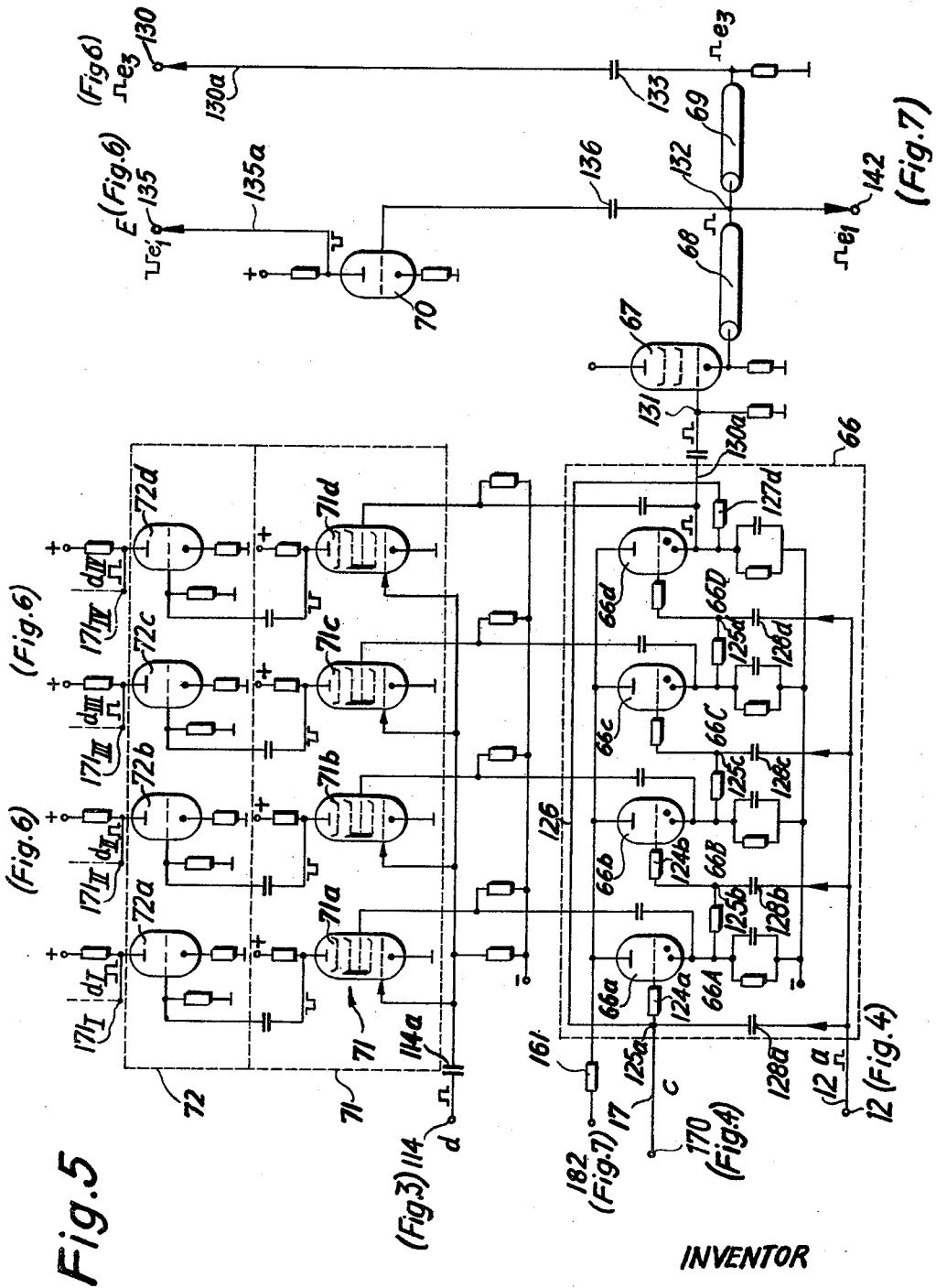

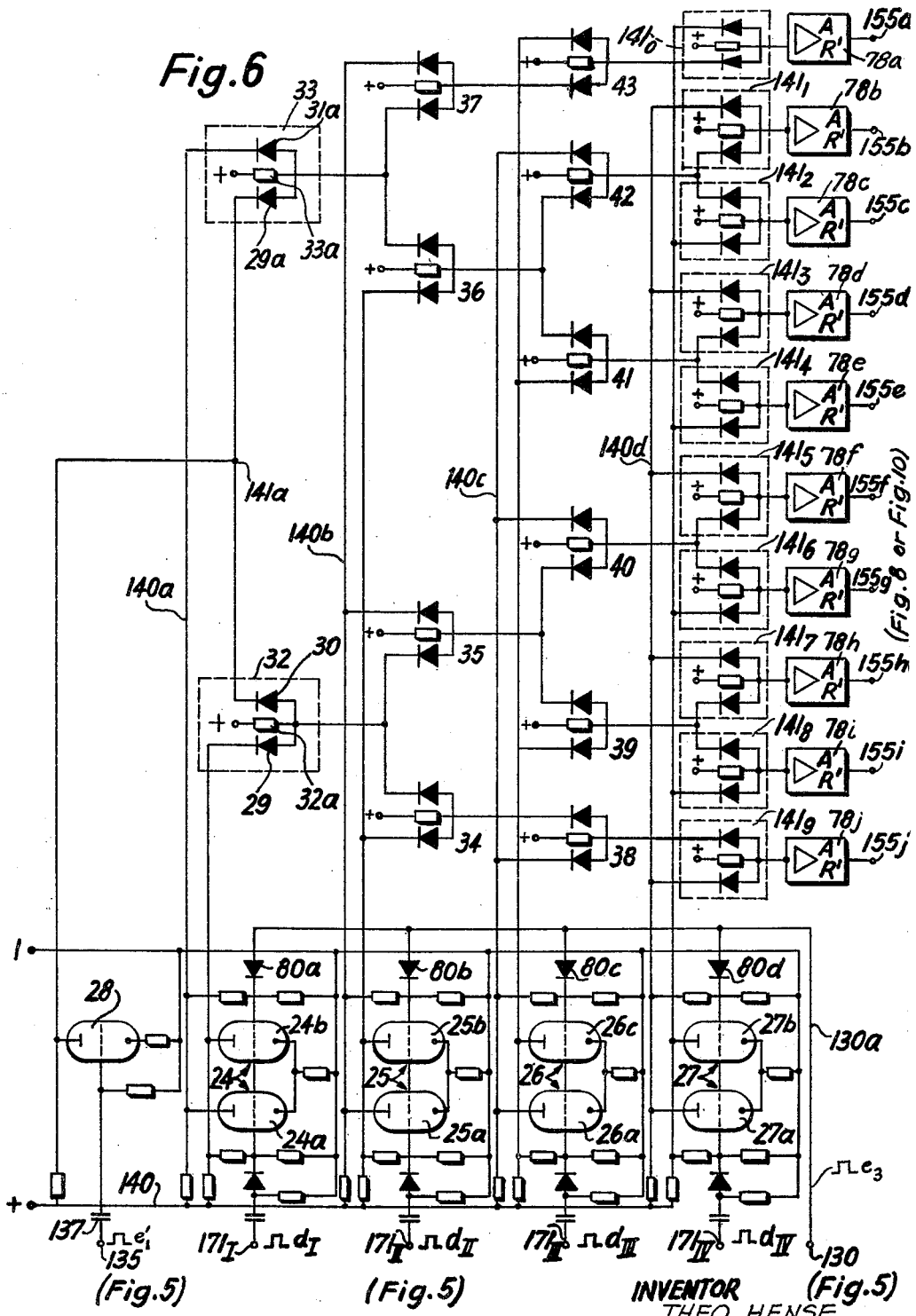

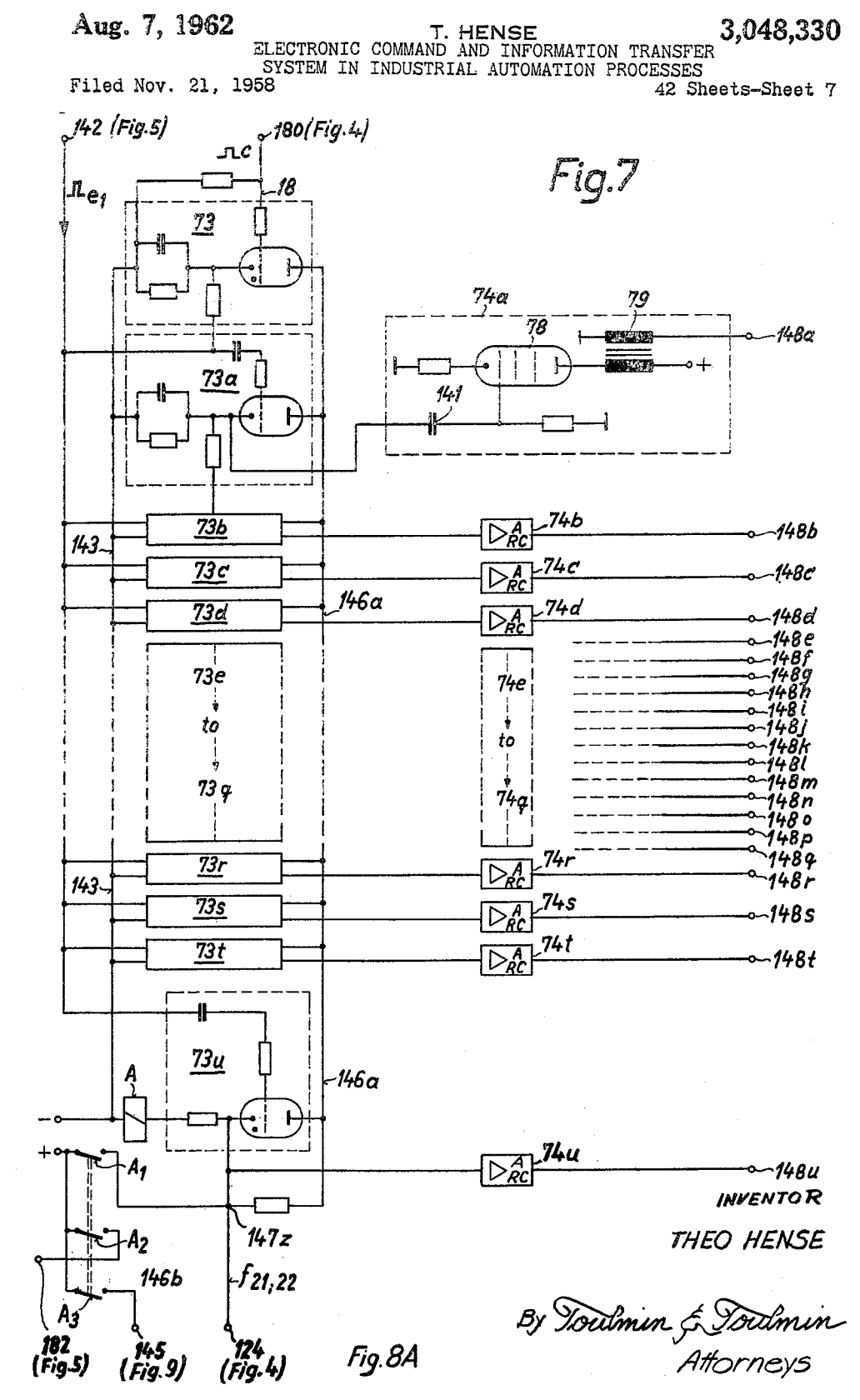

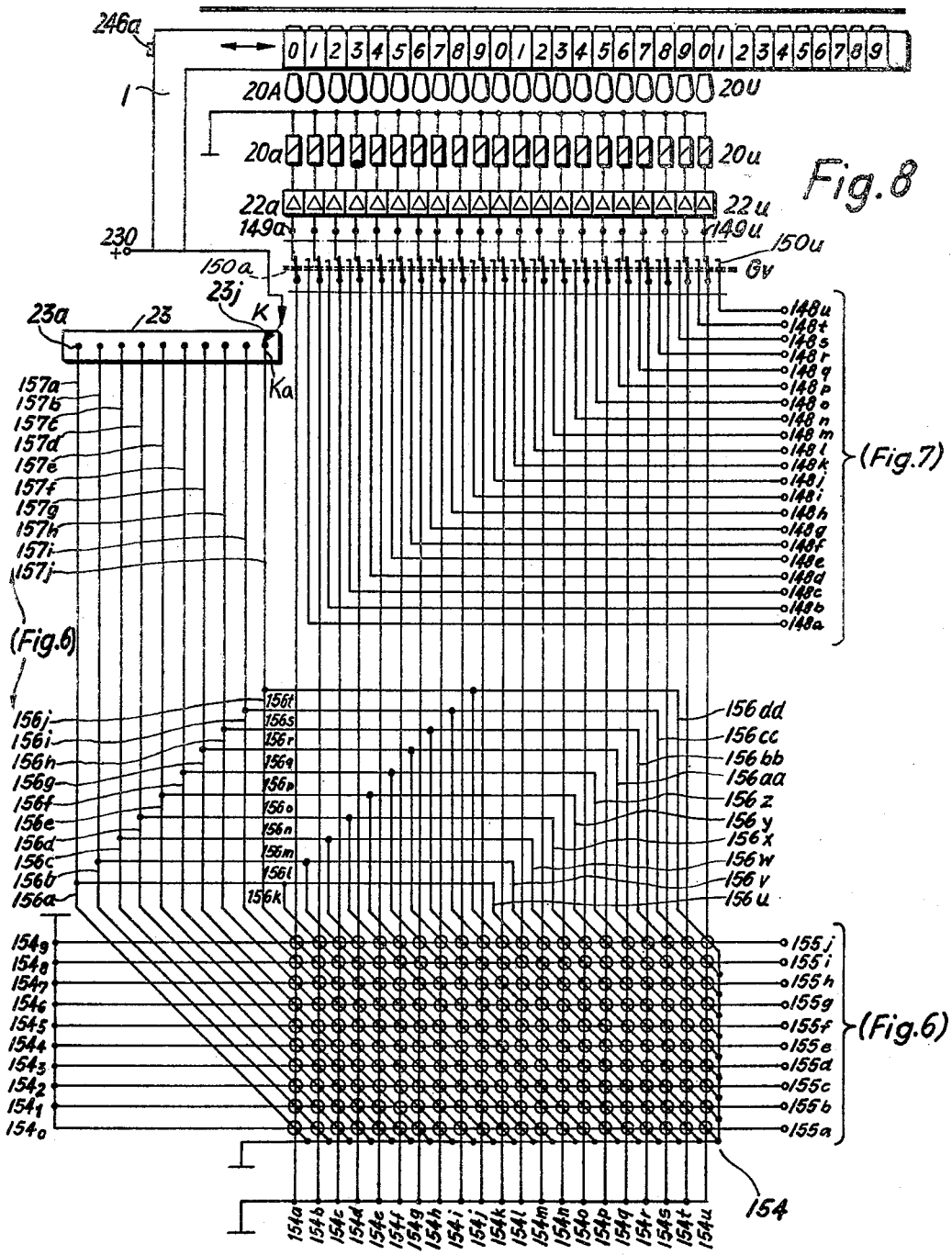

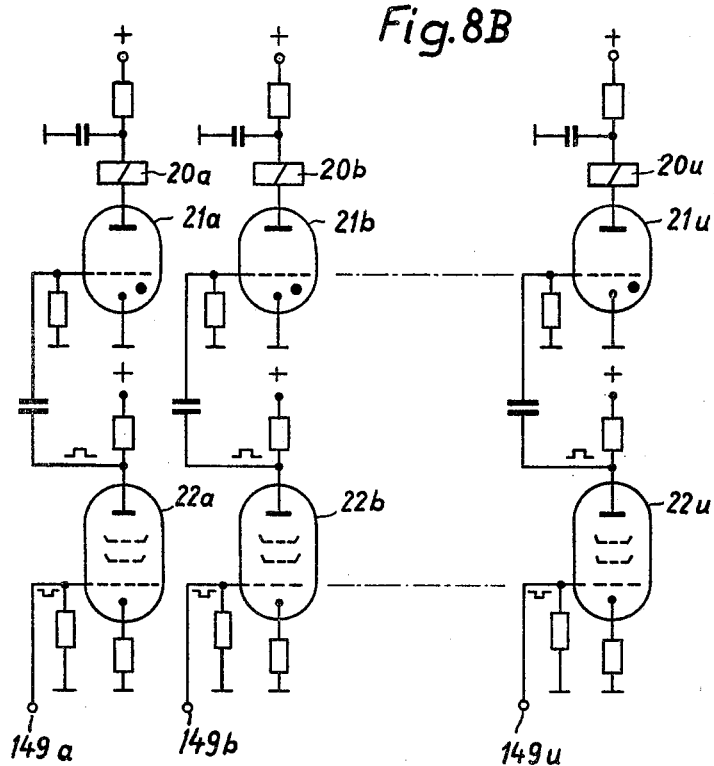

INVENTOR
THEO HENSE

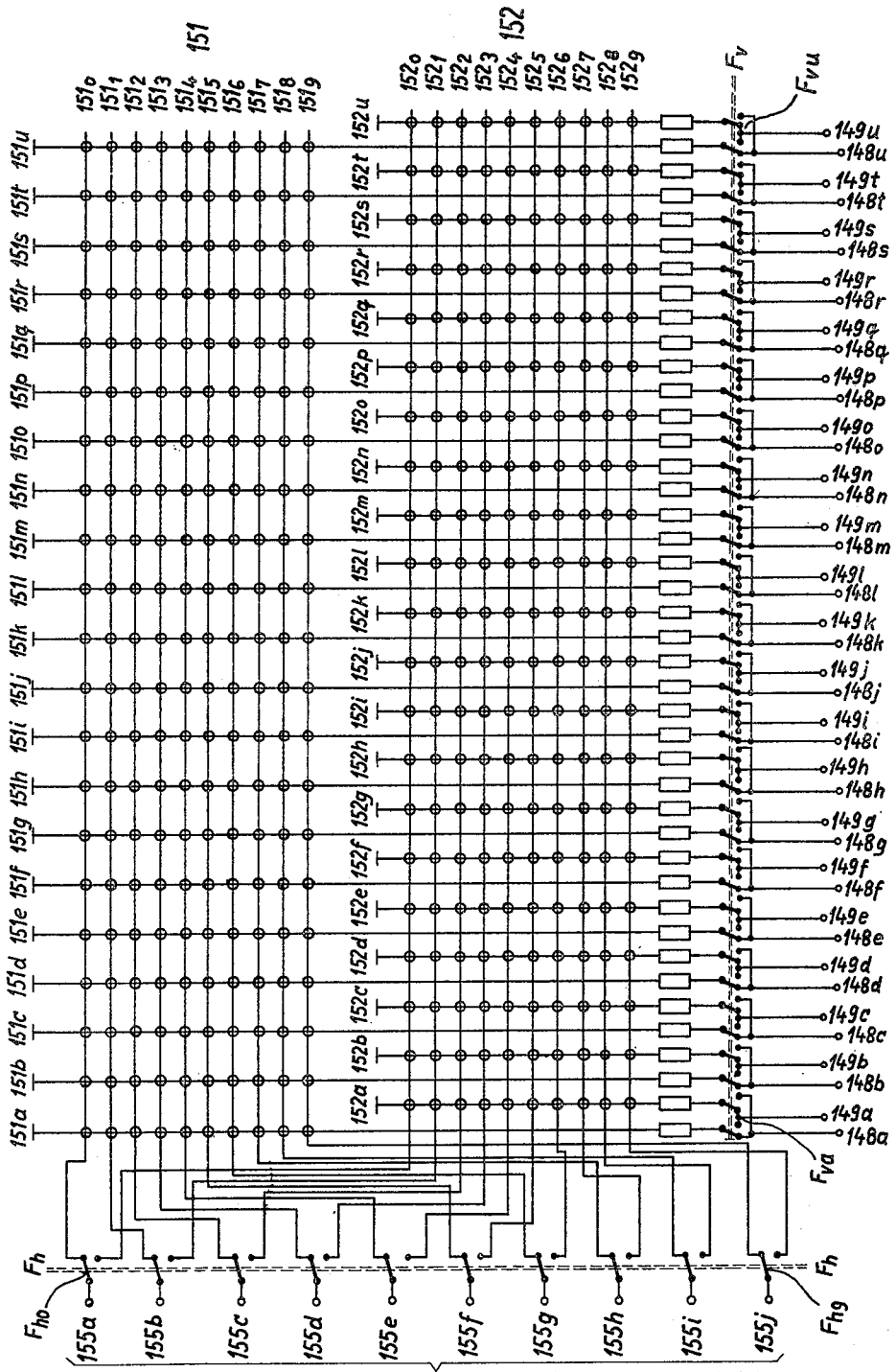

INVENTOR
THEO HENSE
By Toulmin & Toulmin
Attorneys

INVENTOR
THEO HENSE
By Toulmin & Toulmin
Attorneys

INVENTOR
THEO HENSE
By Toulmin & Toulmin
Attorneys

Aug. 7, 1962 T. HENSE 3,048,330
ELECTRONIC COMMAND AND INFORMATION TRANSFER
SYSTEM IN INDUSTRIAL AUTOMATION PROCESSES
Filed Nov. 21, 1958 42 Sheets-Sheet 18

INVENTOR
THEO HENSE
By Toulmin & Toulmin
Attorneys

INVENTOR
THEO HENSE
By Toulmin & Toulmin
Attorneys

Aug. 7, 1962 — T. HENSE — 3,048,330

ELECTRONIC COMMAND AND INFORMATION TRANSFER SYSTEM IN INDUSTRIAL AUTOMATION PROCESSES

Filed Nov. 21, 1958

INVENTOR
THEO HENSE

By Toulmin & Toulmin
Attorneys

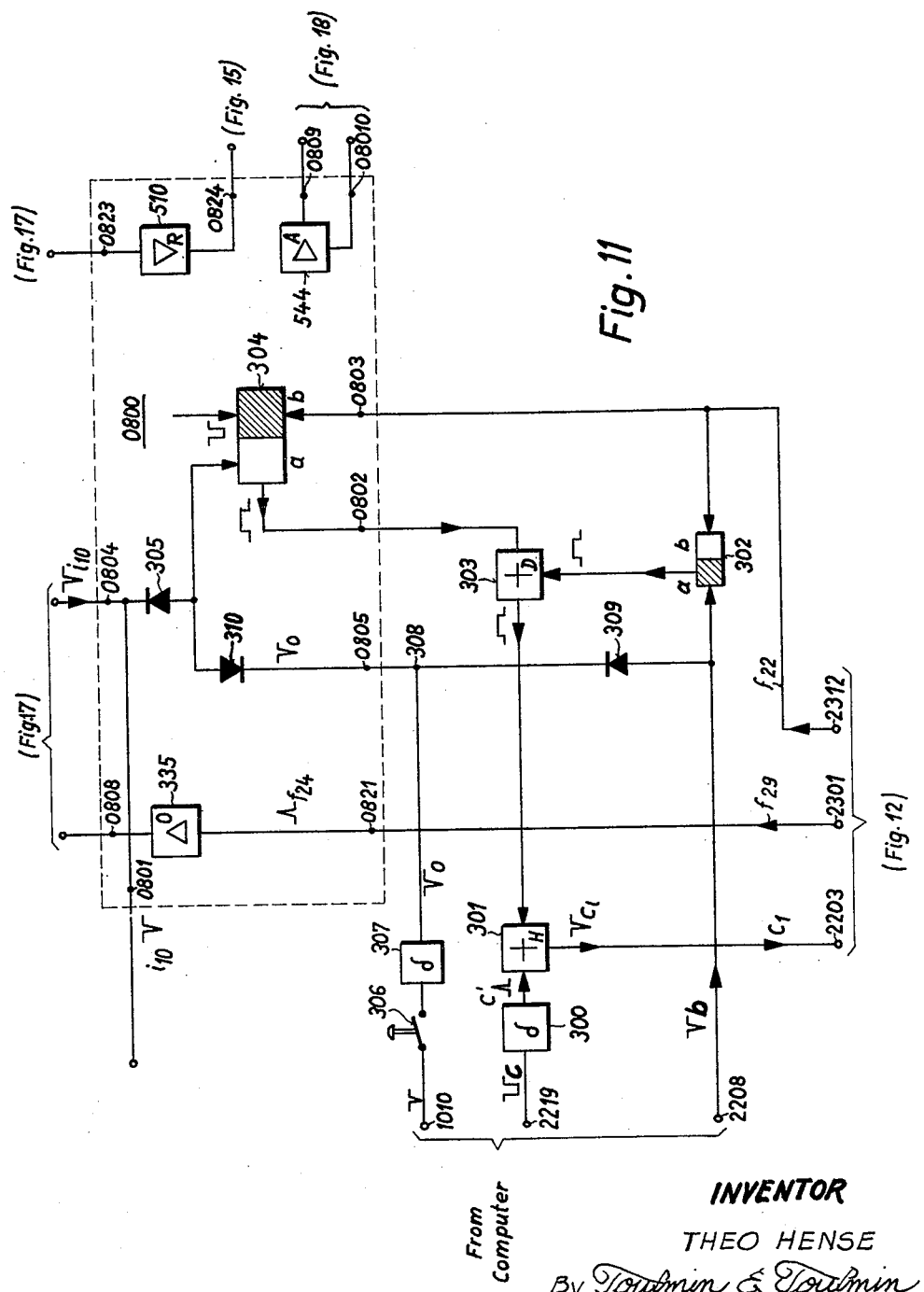

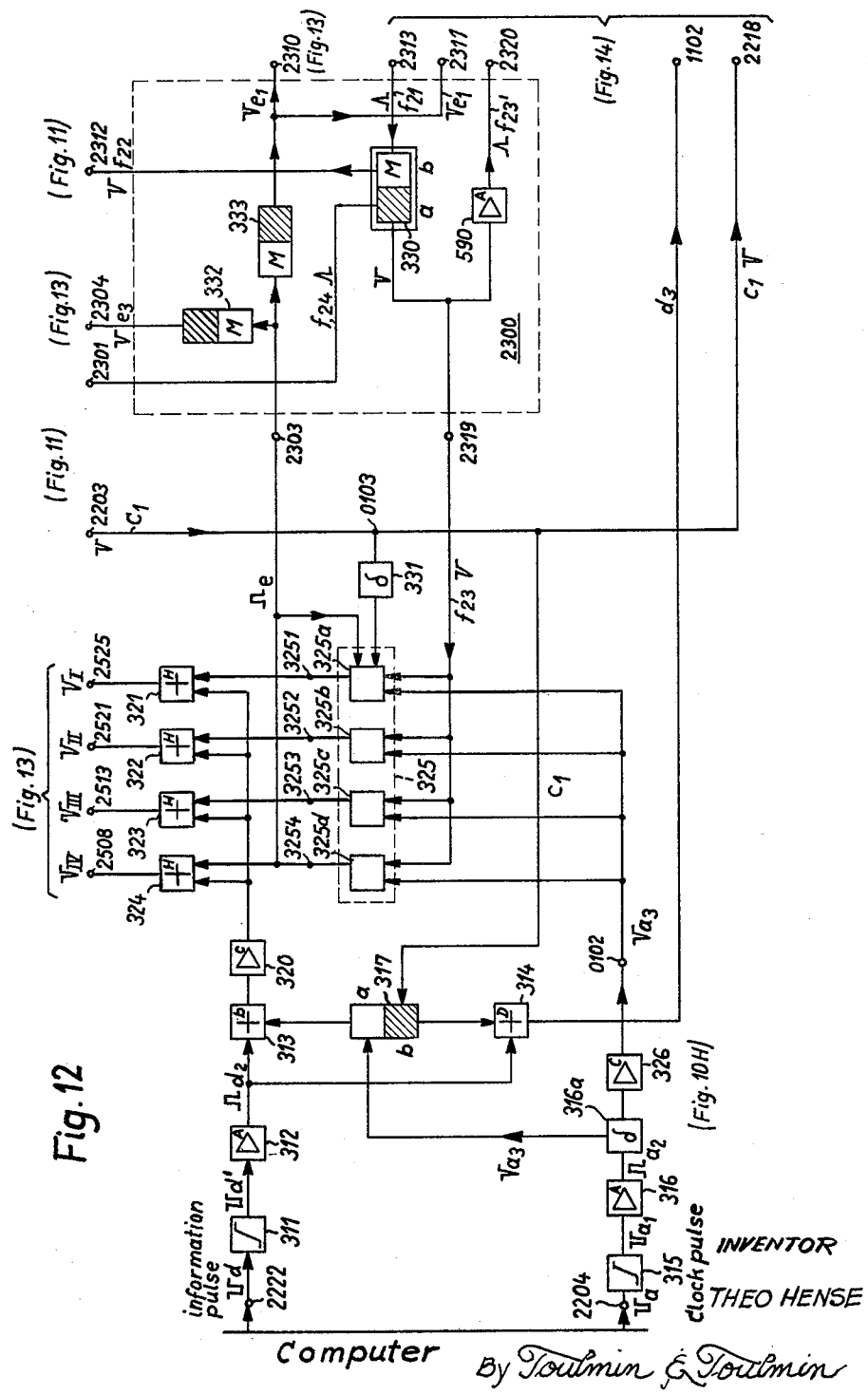

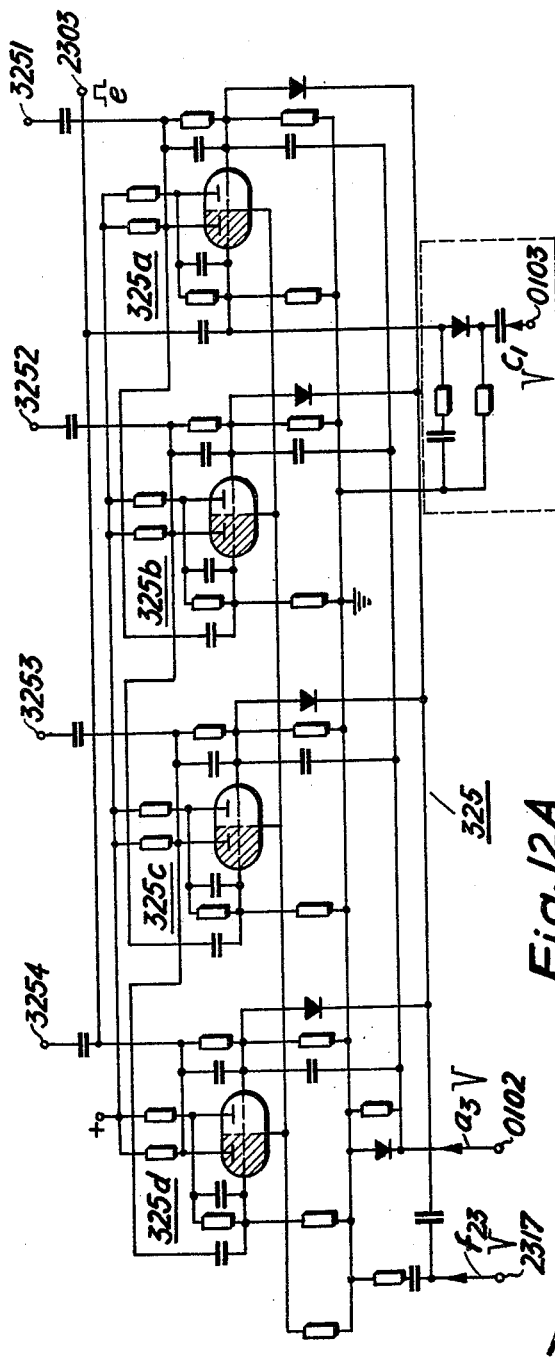

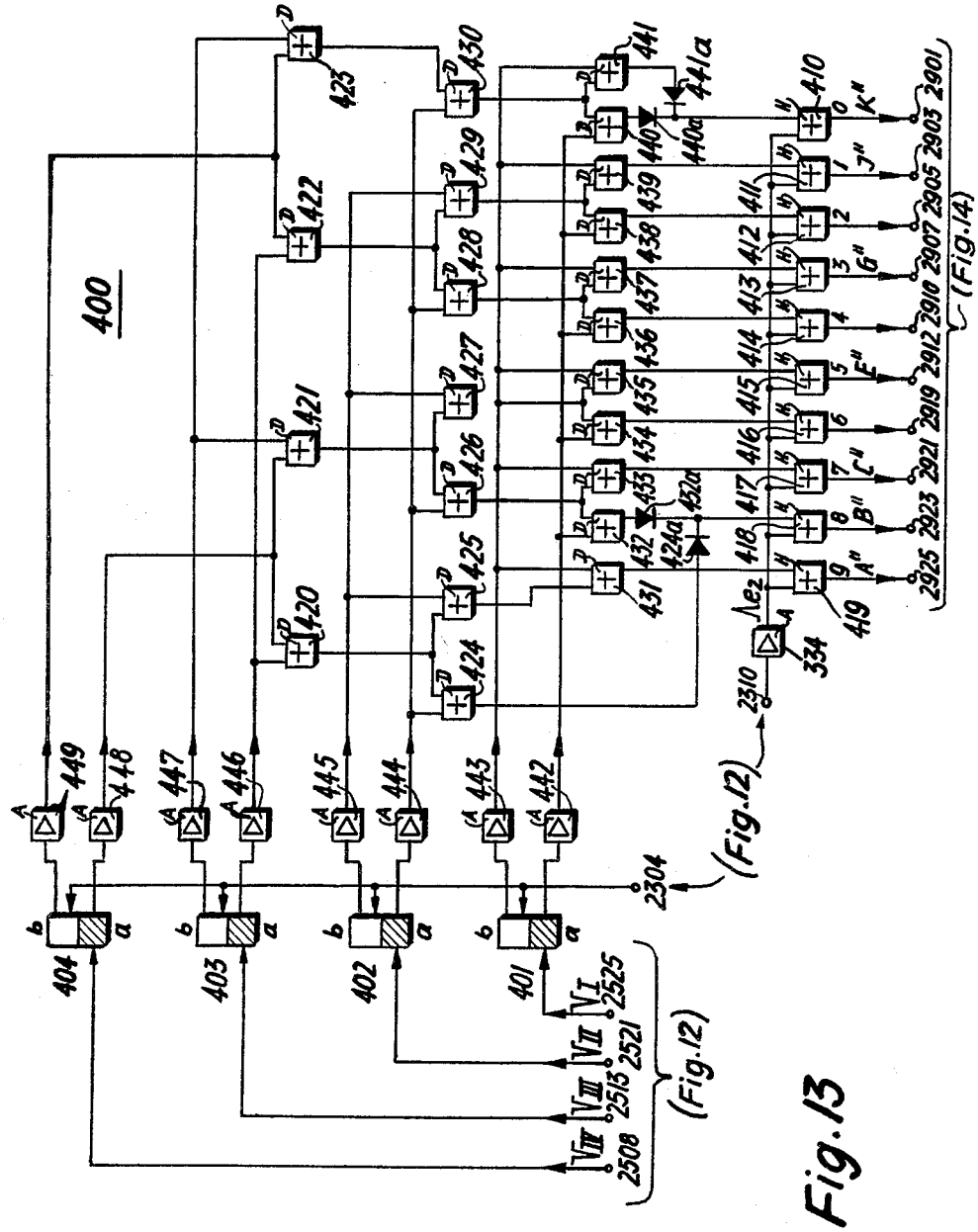

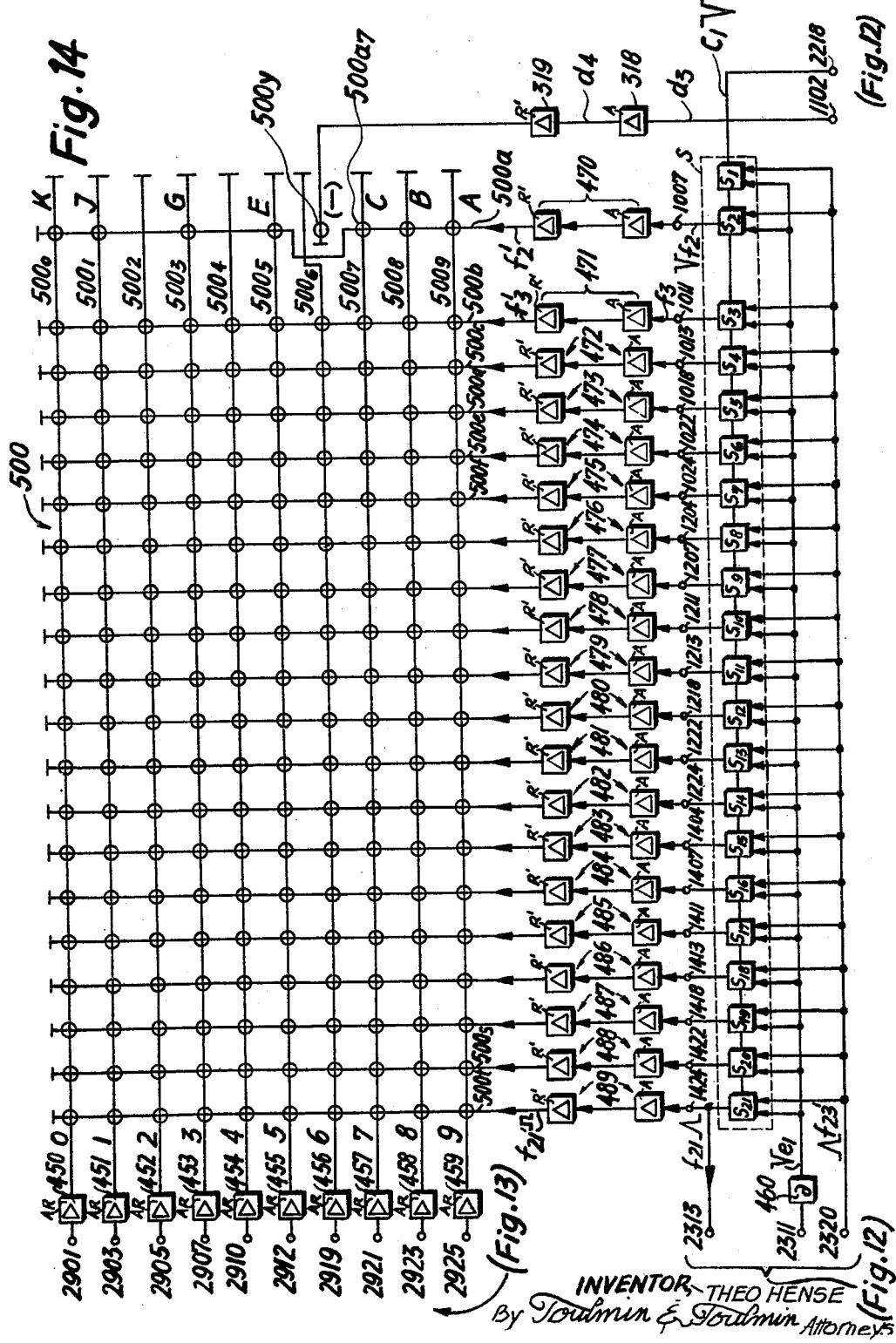

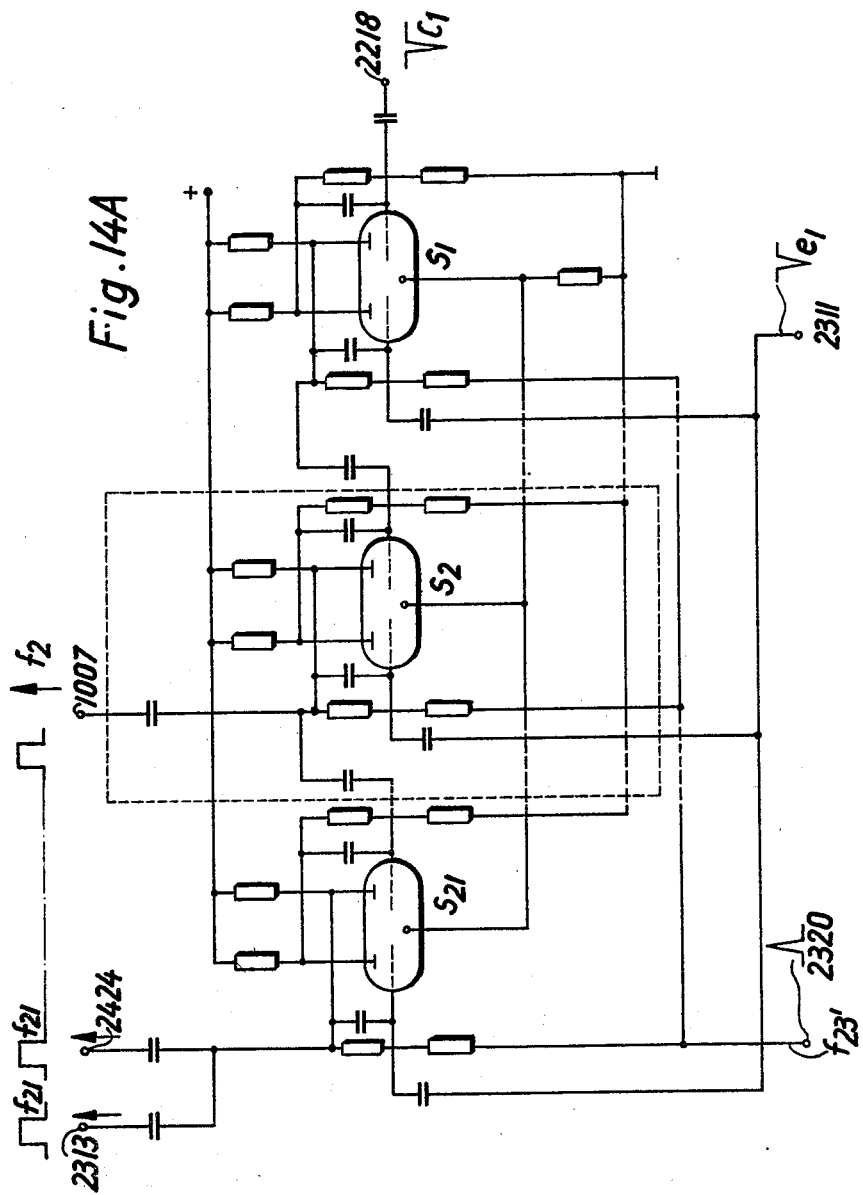

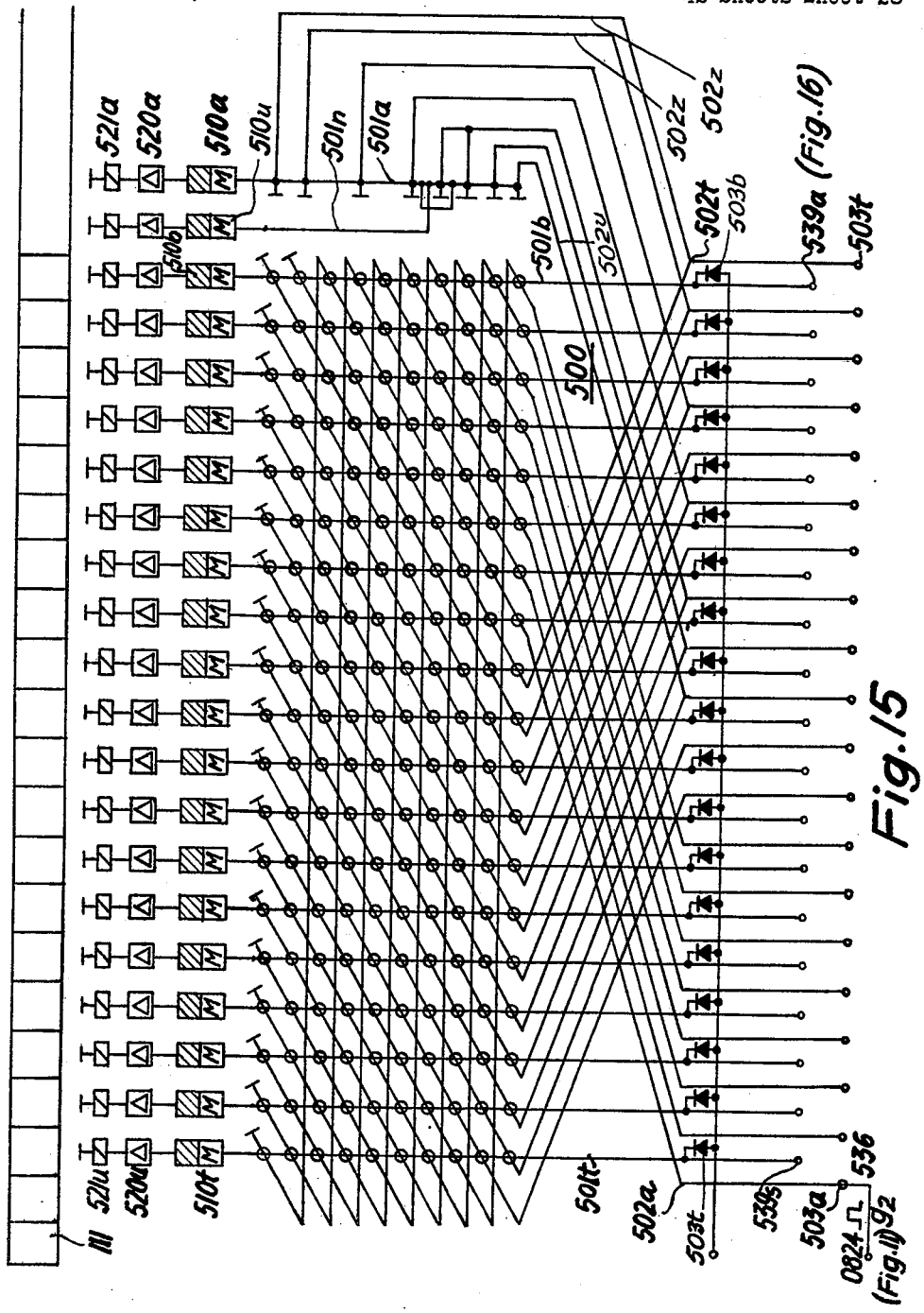

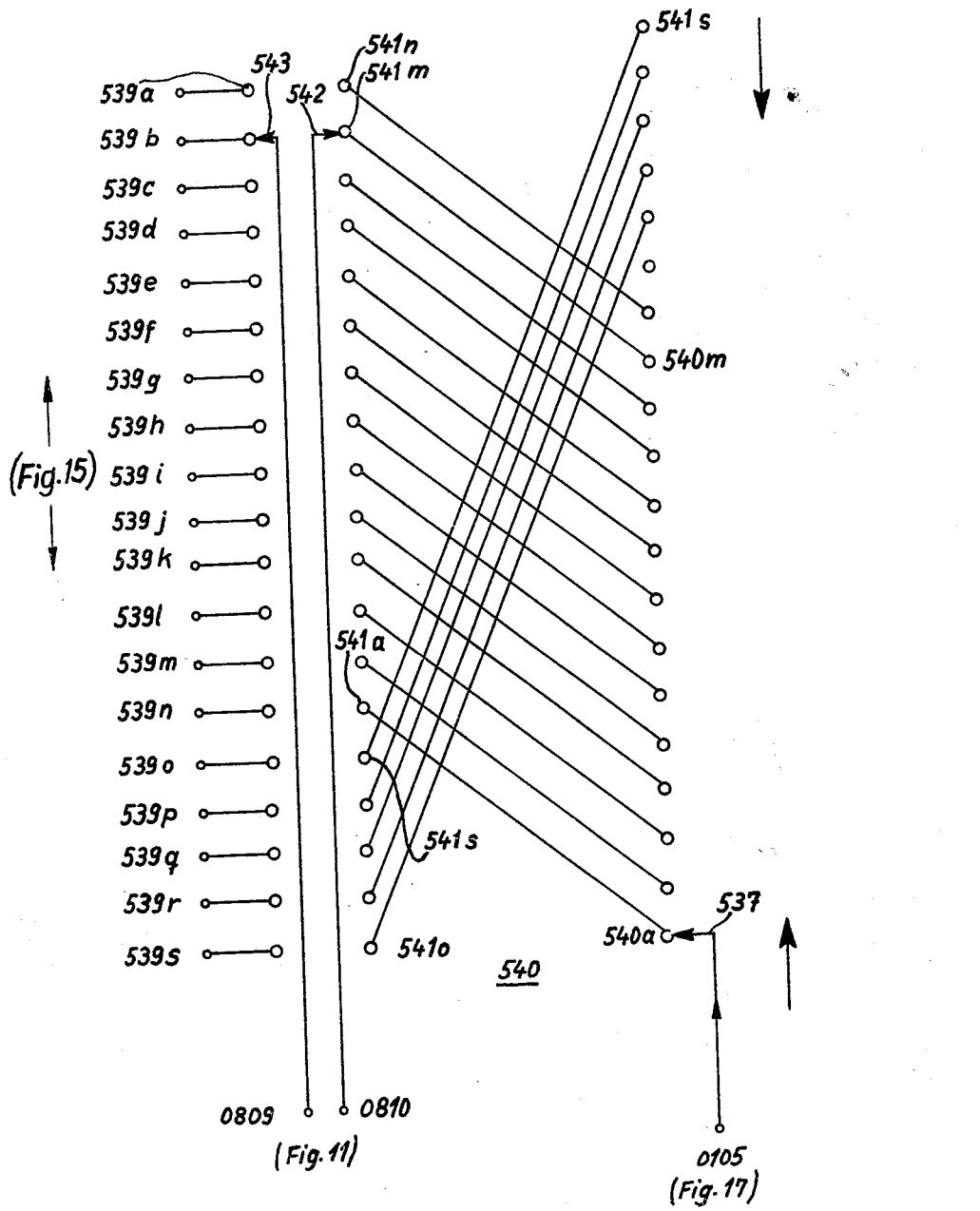

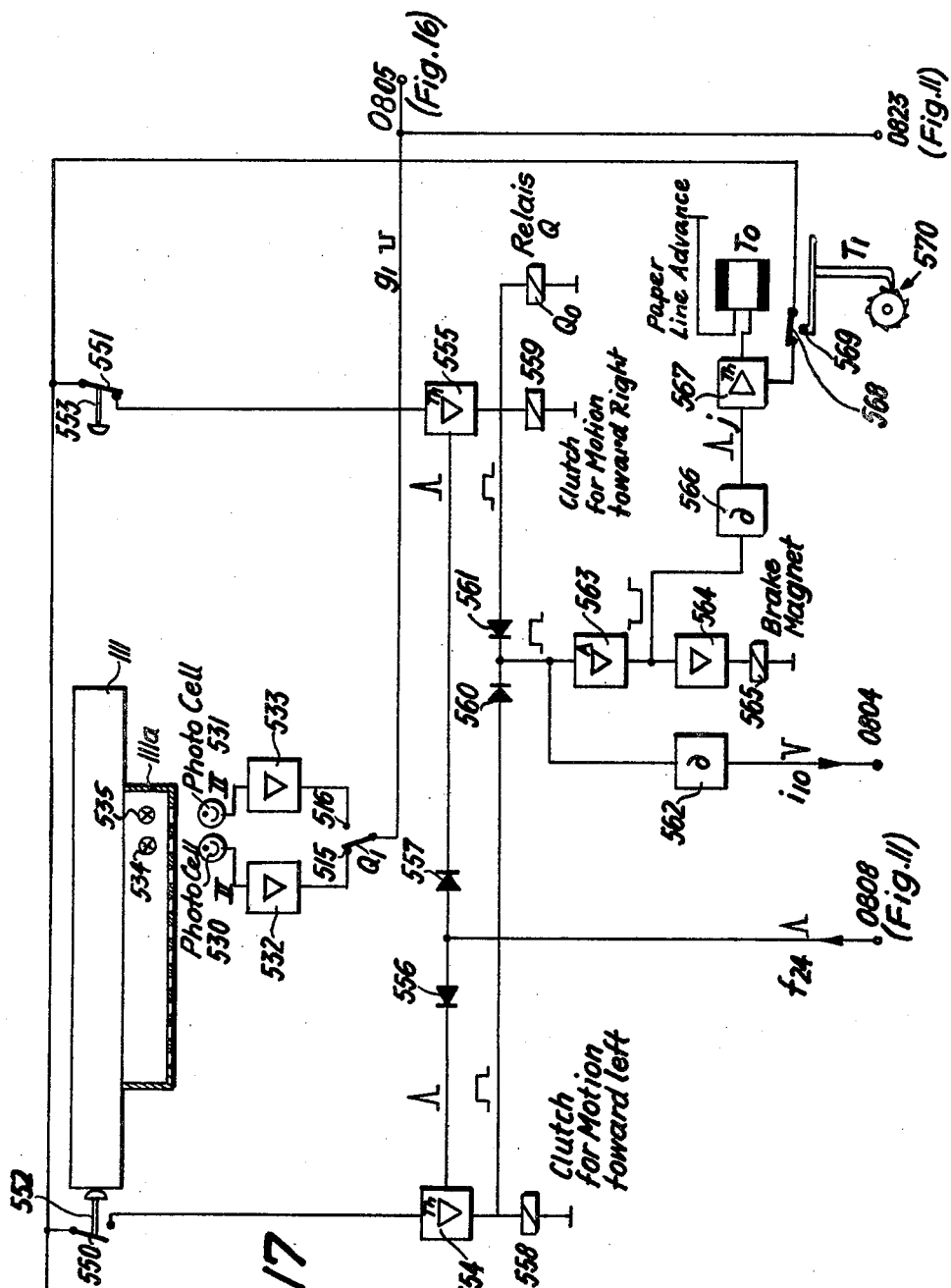

INVENTOR
THEO HENSE

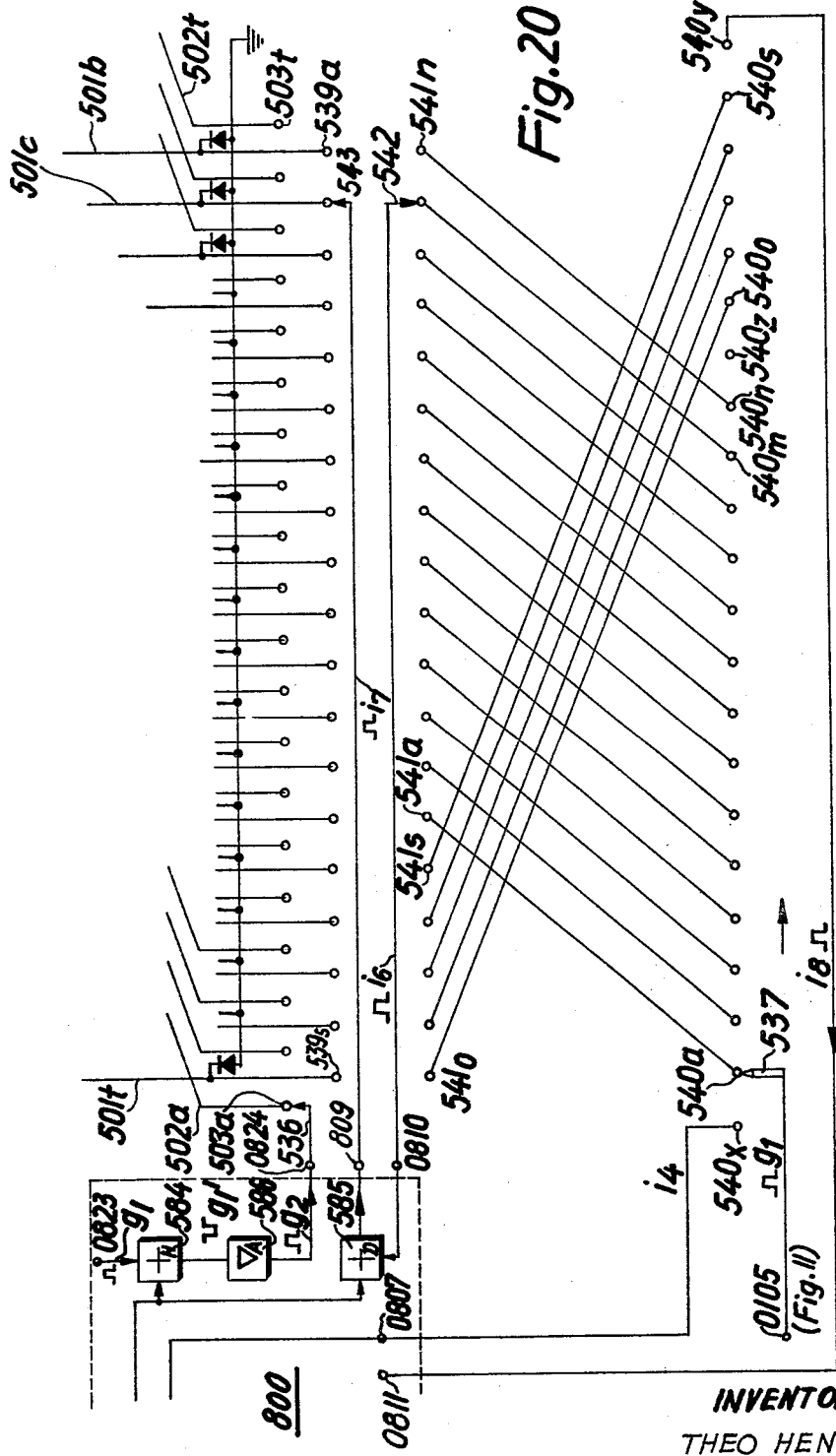

Aug. 7, 1962 T. HENSE 3,048,330
ELECTRONIC COMMAND AND INFORMATION TRANSFER
SYSTEM IN INDUSTRIAL AUTOMATION PROCESSES
Filed Nov. 21, 1958 42 Sheets-Sheet 33

INVENTOR
THEO HENSE

By Toulmin & Toulmin
Attorneys

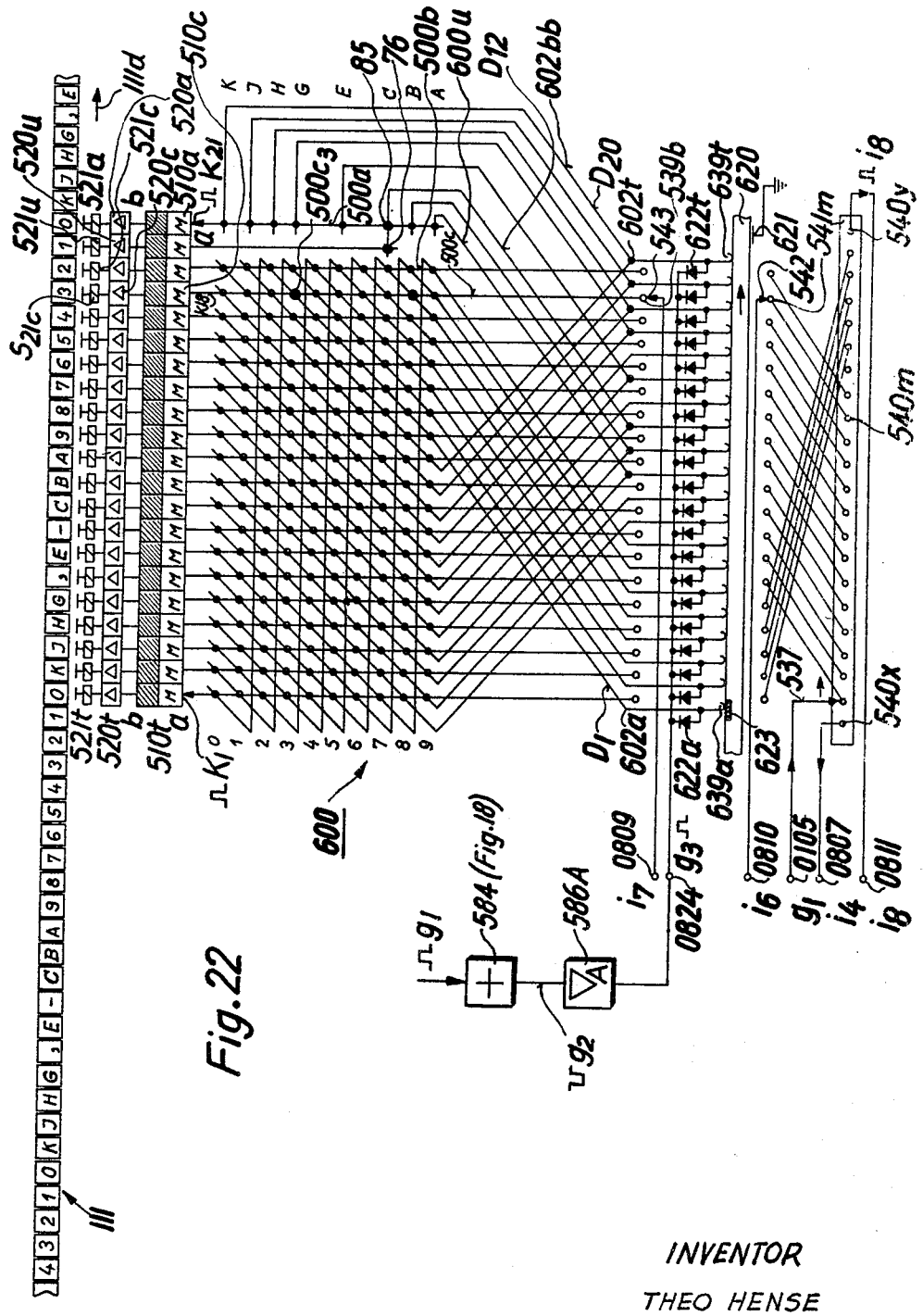

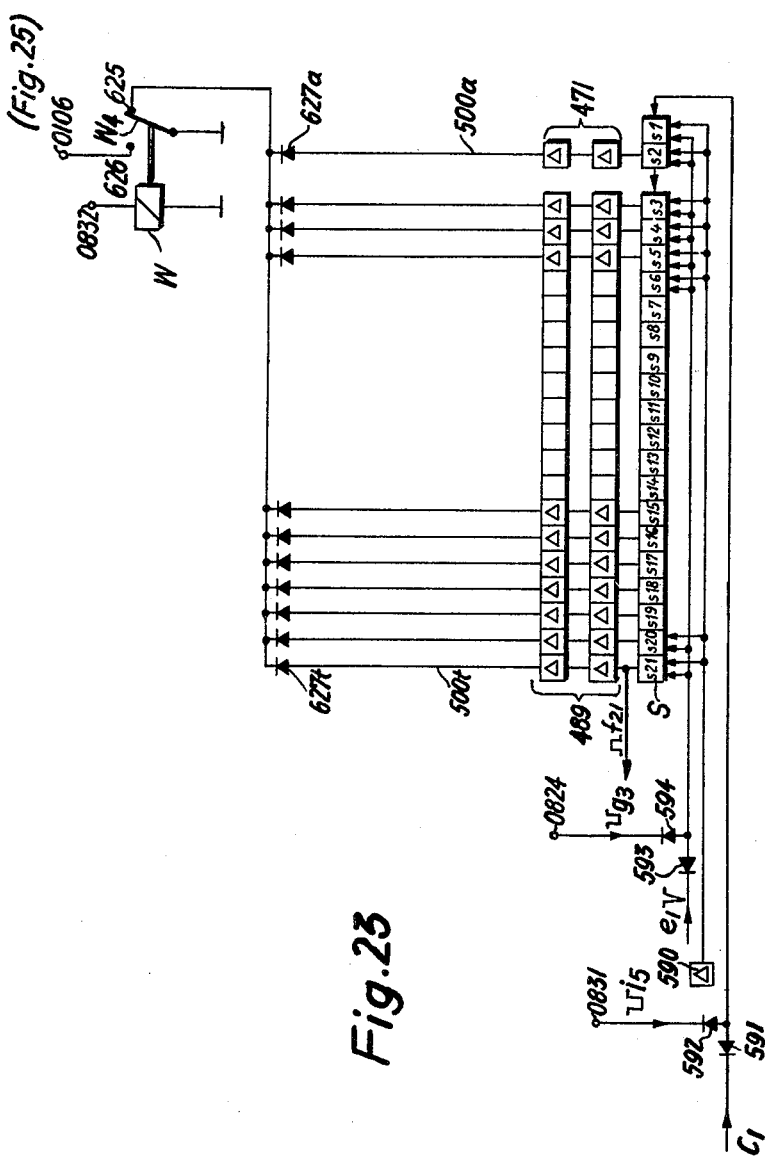

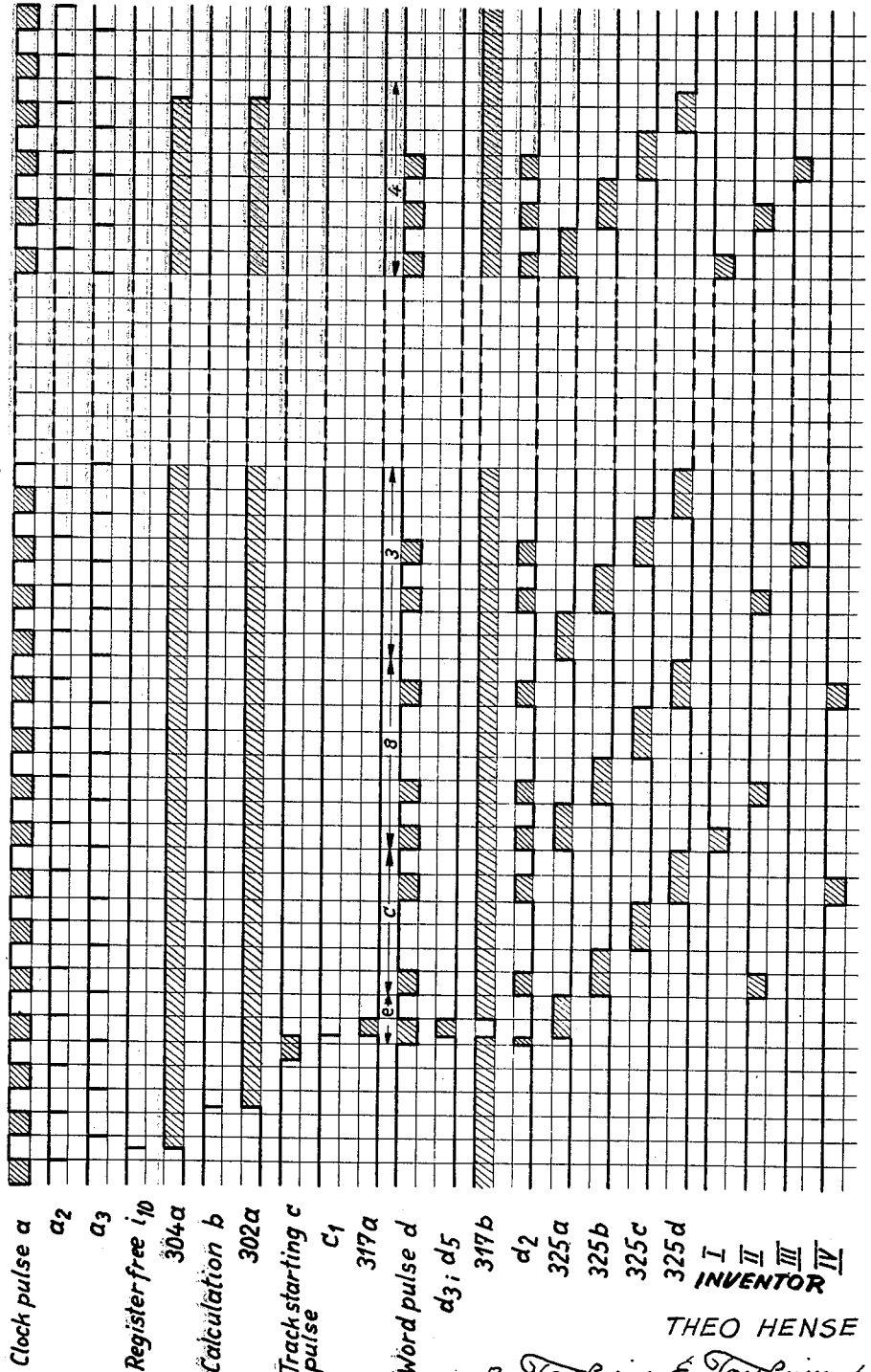

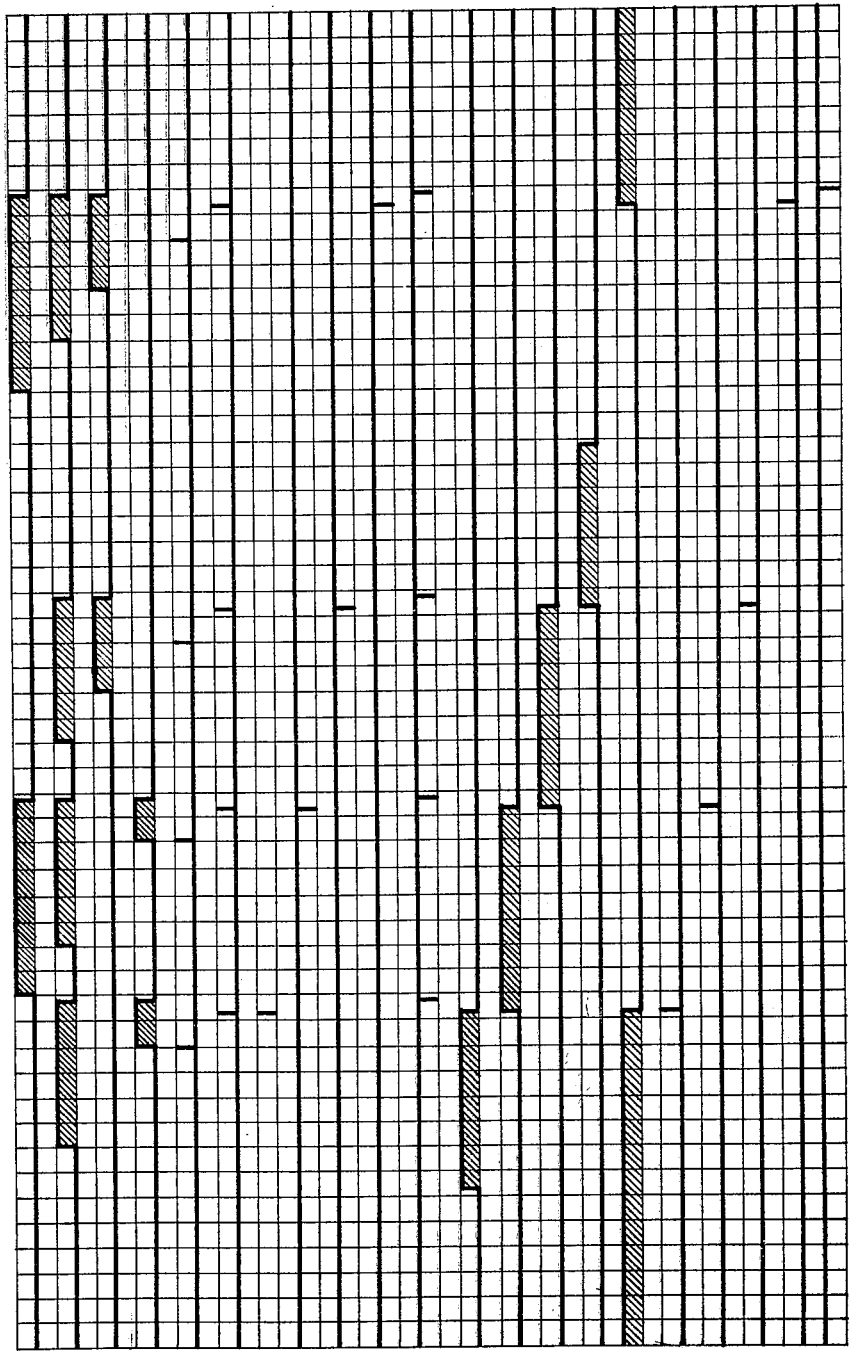

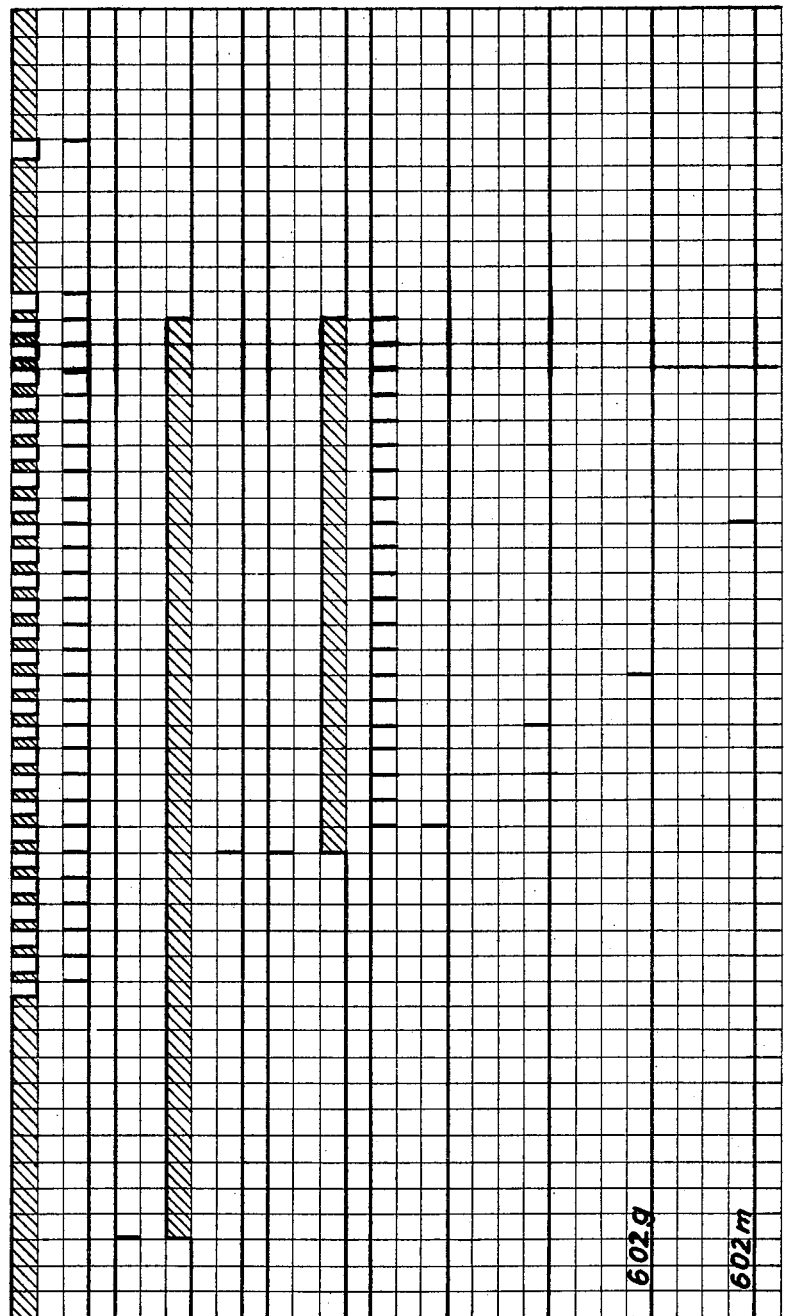

United States Patent Office 3,048,330
Patented Aug. 7, 1962

3,048,330
ELECTRONIC COMMAND AND INFORMATION TRANSFER SYSTEM IN INDUSTRIAL AUTOMATION PROCESSES
Theo Hense, Tom Brokstrasse 61, Wilhelmshaven, Germany
Filed Nov. 21, 1958, Ser. No. 775,533
44 Claims. (Cl. 235—151)

This application is a continuation-in-part application of my pending patent application Serial No. 640,282, filed February 14, 1957, now abandoned.

This invention relates to a fully automatic command and information transfer system for use in industrial automation processes. The invention relates more particularly to an automatic command and information transfer system for translating coded information received from computing devices or similar calculating machines to a work performing machine which is automatically commanded and controlled in accordance with the information obtained from the computing machine.

More specifically, the work performing machine should be a machine carrying out several actions concurrently, such as, for instance, a printing machine printing concurrently several numbers of a line to be printed containing a plurality of such numbers. The numbers may be letters, ciphers, interpunctuation marks and the like symbols.

The terminology adopted in the specification is based on that employed in "High-Speed Computing Devices" (HSCD) by Engineering Research Associates, Inc., 1950.

The command system according to the invention is particularly useful for transferring commands from the recording means of a calculating machine, for instance, a high speed electronic computer, to printing apparatus of the kind described in my Patent 2,874,634 and my Patent 2,936,704.

Computing machines have already been described in the art, in which the computer system also comprises facilities for printing the computed information. However, in these known machines, the entire computing, decoding, storing, and printing operations are centrally controlled in an integrated system. The integration of these operations is still made more intimate, where machine operation is programmed by a punching card system or the like. In this integrated machine, control and work performing elements for the printing operation are so combined with corresponding elements of the computing, storing and other functional sections in the machine that it is impossible to derive from such machines an independent intermediary system complete in itself and requiring only a small number of signals from either the computing or the work performing sections.

Other devices have been described in the art, for instance in Patents 2,761,620 and 2,793,806 to Lindesmith, which permit to load an uncoded sequence of pulses into a mechanical calculating machine. These pulses are counted and then fed as decimal numbers to a mechanical calculating machine and printing section, which both work relatively slowly compared with high speed electronic computers.

It is an object of my invention to provide a command and information transfer system complete in itself which is useful for receiving and giving commands between a great variety of recording devices for storing coded information and another variety of apparatus suited for performing work on the basis of such recorded information, and requires only a small number of command signals from each of the aforesaid two types of machines between which it is interposed.

It is another object of my invention to provide a command and information transfer system which serves for receiving and giving commands and coded information between the recording section of a high speed computing device and a printing apparatus which system enables the latter to print with a single set of types at a printing velocity of up to 1200 lines per minute.

It is yet another object of my invention to provide a command and information transfer system arranged interposed between a high speed computing device and a high speed printing machine, which system fully automatically buffers the activity of both the computer and the printer, so that, if the printer lags in performance behind the computer, storage of information from the latter will be delayed, while, if the computer lags behind the printer, the operation of the latter will be automatically interrupted until new information is available from the computer.

The command transfer system according to my invention may, for instance, be used with any of the computing machines listed in HSCD supra on pages 214 and 215.

A computing machine of that type comprises a program control section which emits commands and track selection pulses indicating that information has been completed and is ready to be printed. The recording unit of such a machine (see HSCD, pages 302–305) may comprise a magnetic carrier, such as a magnetic recording drum, which emits simultaneously and continuously clock pulses as well as track starting pulses, together with message pulses conveying information whenever the latter is available.

Track starting pulses which are emitted continuously from the magnetic drum of the computer, indicate where, i.e. at which "address" on the magnetic drum the particular information begins that has been selected with the aid of the afore-mentioned track selection pulse.

In order to attain the above stated objects, my invention provides a command and information transfer system which consists of three main sections or units:
(1) a command control unit;
(2) a decoding unit with preceding insertion or loading means; and
(3) a storage section comprising at least one, and preferably several storage registers, the storage elements of which are arranged in lines and columns and correspondingly preceding loading means for the lines and for the columns of the register or registers.

The control unit is adapted for connection to the computing machine, and the storage section is adapted for connection to the work performing machine according to the invention. At least one command line also connects the control unit with the work performing machine.

The control unit may be connected to the computing machine in such a manner that a single track of the recording section of the computing machine is being read out, or it may be so connected that several tracks of the computing machine can be read out successively. In the latter case, the control unit according to the invention comprises a track selector unit. It is an important feature of the command and information transfer system according to my invention, to which I shall refer hereinafter for the sake of brevity as "transfer system" that only a small number of pulses are required from the computing machine as well as from the work performing machine to interpose the transfer system between the two machines in a fully operative manner. No connections need be established between the computing machine and the work performing machine.

Interposition and removal of the transfer system from between the computer and the work performing machine are thus made extremely simple.

Four lines are required leading to the transfer system for receiving signals from the computer. These lines transmit to the transfer system:

(a) clock pulses, designated hereinafter by the letter "a";

(b) "ready" pulses indicating that the calculation carried out in the computer is complete and that information is ready to be decoded, stored and transferred to the work performing machine by the transfer system according to the invention; these "ready" pulses are characterized hereinafter by the use of the letter "b";

(c) track starting pulses as defined above, which are characterized hereinafter by the use of letter "c"; and (d) word or information pulses, which are characterized hereinafter by the letter "d."

If the transfer system is connected to the computer in such a manner that information can be read from a plurality of tracks in the programming section of the computing machine, there are further required "track selection pulses" characterized by the letter "t" which are pulses indicating on which of the many tracks of, for instance, a magnetic drum recording means the information to be printed is stored in coded form in the computing machine. There may be several hundred such tracks on a magnetic recording drum.

The complete connection of the transfer system according to the invention with the work performing machine requires connecting lines for (e) a pulse indicating that a sequence of working steps, for instance the printing of a text from a storage register, has been completed and that the work performing machine is ready to start a new operation; pulse $g$.

(f) a group of lines for reading out decoded information from one of the storage registers and converting the same into working steps of the work performing machine. The number of such lines will correspond to the number of columns of the storage register to be read out and correspondingly provided with read out lines, shown as diagonal lines hereinafter so as to distinguish them clearly from the input "lines" and input "columns" of the register or registers.

Furthermore, the connection between the transfer system according to the invention and the work performing machine may, preferably, comprise lines for (g) a command pulse from the work performing machine to the control unit of the transfer system, indicating that the work performing machine has assumed its starting position; also pulse $g$.

(h) a command pulse from the control unit of the transfer system to the work performing machine to start performing the work, for instance printing of the information from a storage register of the machine; pulses $f_{21}$ to $f_{24}$; and (i) a command pulse from the work performing machine to the storage section of the transfer system, whereby readout of information from a storage register and performance of work according to that information by the work performing machine is initiated; pulses $k$.

In the preferred use of the command transfer set with a high speed printing apparatus as described in my Patent 2,874,634, supra, the decoded information to be printed is taken up by a scanning device controlled by the printing apparatus and described in detail in conjunction therewith.

According to one mode of functioning of the command transfer system of my invention, the information pulses derived from the magnetic drum of the computing machine, as well as the track selection pulses derived from the latter are received continuously by the track selector unit of the command system. Separate commands for printing information, briefly referred to hereinafter as "printing orders," which are issued by the program control section of the computing machine, are directed to the track-scanning control unit, briefly referred to hereinafter as "control unit," which latter unit also receives, concurrently, return commands or messages from the controlled printing apparatus stating that the printer is operative and ready to start printing information. The track selector unit is adapted to select from the bulk of information available on the various tracks of the magnetic drum, that particular track of information, the information pulse of which is to be printed according to a printing order received from the program control section of the computing machine.

If the control unit of the command transfer system receives simultaneously a printing order from the computing machine, and a return message from the printing apparatus, then, and only then, will the command system permit one of the track starting pulses which it receives continuously from the magnetic drum of the computer, to pass and direct this track starting pulse on the one hand to the loading means of the decoder unit, and, on the other hand, to the loading means of the storage unit.

Independently from the above-described function, the track selector unit of the command transfer system according to the invention selects a determined track, whose corresponding information pulse is equally directed to the loading means of the decoder unit, which track is selected depending upon the track selection pulse received by the track selector from the programming section of the computing machine.

The decoder unit of the command transfer system comprises a number of ring counters. Whenever a track starting pulse is allowed to pass the "control unit" of the command transfer system, and arrives at a ring counter of the decoder, the latter begins binary-(or the like)-to-decimal decoding. At the same time, the same track starting pulse, when arriving at the loading means for the storage register columns prepares the insertion or "loading" of information into the columns of a register of the storage section. The decoded decimal-digit pulses arrive at the storage section simultaneously with the storage column insertion pulses. The latter pulses are emitted by the loading means for the storage columns, which means are controlled by the loading means for the decoder. Due to simultaneous arrival of the decoded decadic pulses, on the one hand, and of the storage columns insertion pulses on the other hand, at the storage section, the information thus transferred is stored at the crosspoint of both conduits, i.e. at the proper address.

The storage section preferably comprises two storage units or registers, one of which is being filled up, while the other full storage register is emptied by printing the information stored therein by means of a printing apparatus preferably via a connecting or buffer unit interposed between the storage section and the printing apparatus.

Once the storage register which was being loaded, is full, the loading means for storage columns will emit concurrently a signal to the control unit and to the track selector of the command transfer system as well as to the programming section of the computing machine.

This same signal may also be used for giving to the printing apparatus the command to start printing.

If, on the other hand, the printing apparatus has emptied one of the storage registers by printing all the information contained therein, then it will send a return message back to the control unit to notify the latter that this register of the storage section is again available for loading with new information.

The command transfer system according to my invention may be used with all machines adapted for recording coded information. The recording may preferably take the form of magnetic drum storage, but may equally be a punched card system, a punched paper tape, a magnetic tape or magnetic wire or magnetic core register.

Machines which are adapted to perform work on the basis of such stored information transferred to them by the command transfer system according to my invention comprise calculating machines, typewriters, printing type setting machines for printing plants and machine tools in automation processes as well as teletype apparatus.

While, in particular, the machines described in the patents to Lindesmith supra are built for processing simple sequences of pulses which are counted and then fed as decimal numbers, for instance to a printing machine, the command and information transfer system according to my invention is adapted for the insertion of binary-coded information derived from the storage unit of an electronic high speed computer, to decode the same, and to effect its exploitation, by transferring the decoded information either to a printer, or to another kind of automotive performing machine.

Other features and advantages of the transfer system according to the invention will become apparent from the description thereof in connection with the accompanying drawings, in which FIGURE 1 is a block diagram illustrating a first embodiment of the command and information transfer system according to the invention;

FIGURE 2 shows a pulse diagram illustrating the functioning of the transfer system shown in subsequent FIGURES 3 to 9;

FIGURES 3 and 4 show a wiring of a preferred embodiment of the control unit of the command and information transfer system;

FIGURE 5 shows a preferred embodiment of the wiring diagram of the loading device for the decoder of the command transfer system;

FIGURE 6 illustrates a preferred embodiment of the decoder itself;

FIGURE 7 illustrates a preferred wiring diagram representing the loading device for the storage section which comprises a subsequently connected register column amplifier;

FIGURE 8 shows, in a first embodiment a wiring diagram of the storage unit of the transfer system according to the invention, comprising the read-in and read-out systems of a single storage register, and also illustrates a possible connection of the storage unit to a work-performing machine;

FIGURE 8B is a detailed wiring diagram of the power amplification and actuation system forming part of the read-out system of the storage register shown in FIGURE 8;

FIGURE 9 shows the read-in system of another, preferred embodiment of the storage unit of the transfer system according to the invention, which comprises two matrix registers instead of the one register illustrated in FIGURE 8;

Figure 10A:
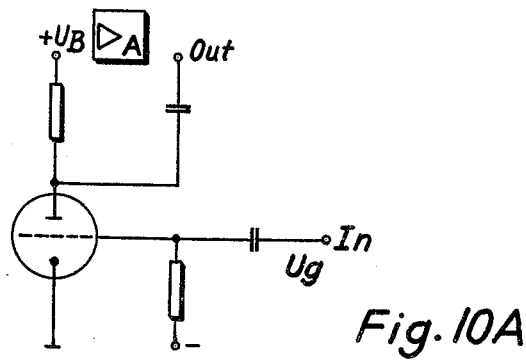
FIGURE 10 illustrates a block diagram of another embodiment of the command and information transfer system according to the invention.
Figure 10:
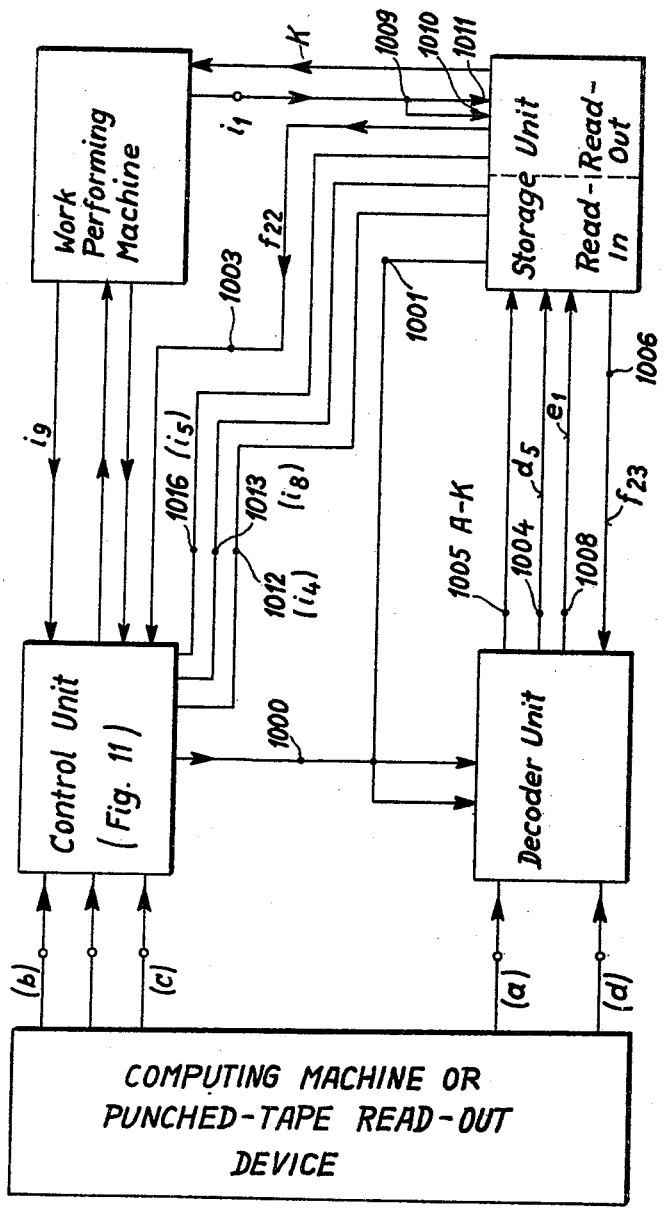
Figure 24:
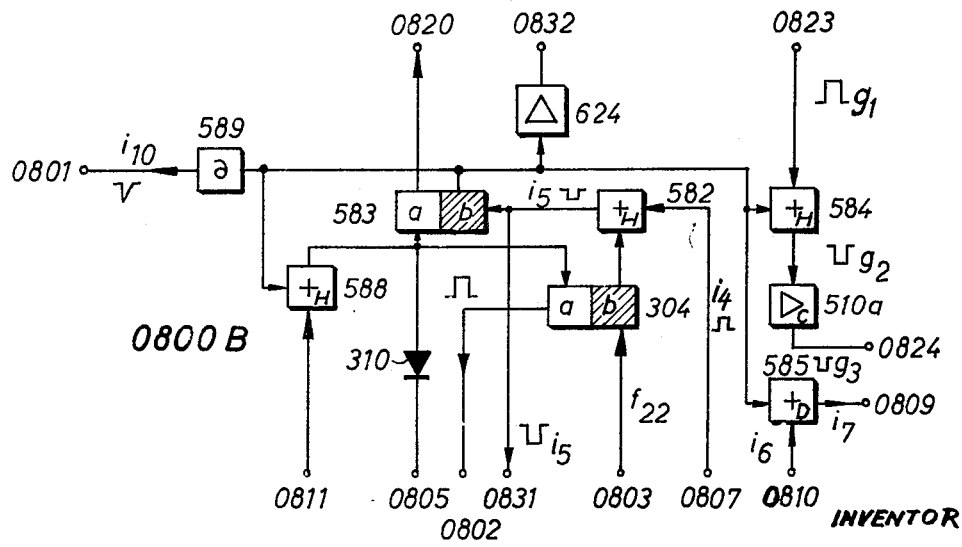
Figure 18:
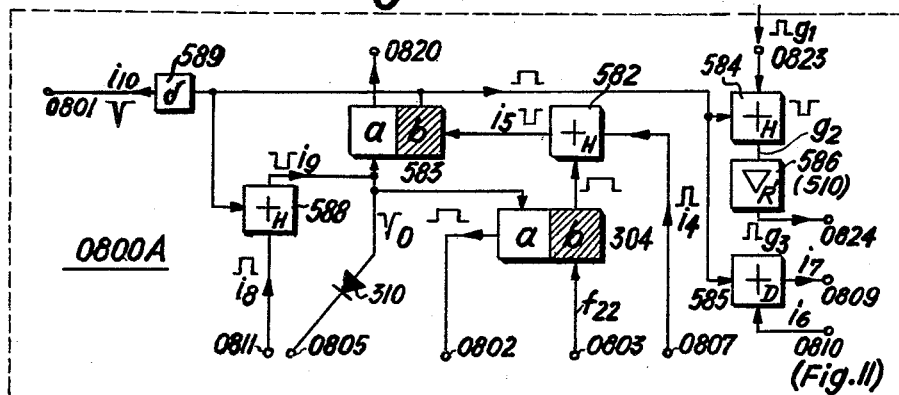
Figure 19:
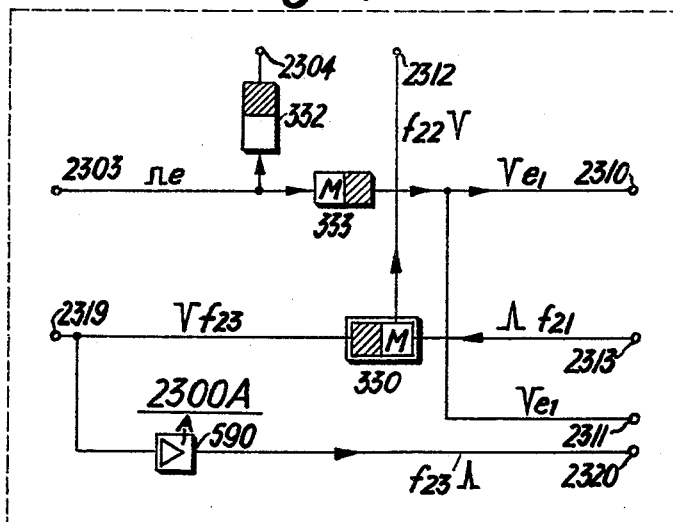
Figure 20A:
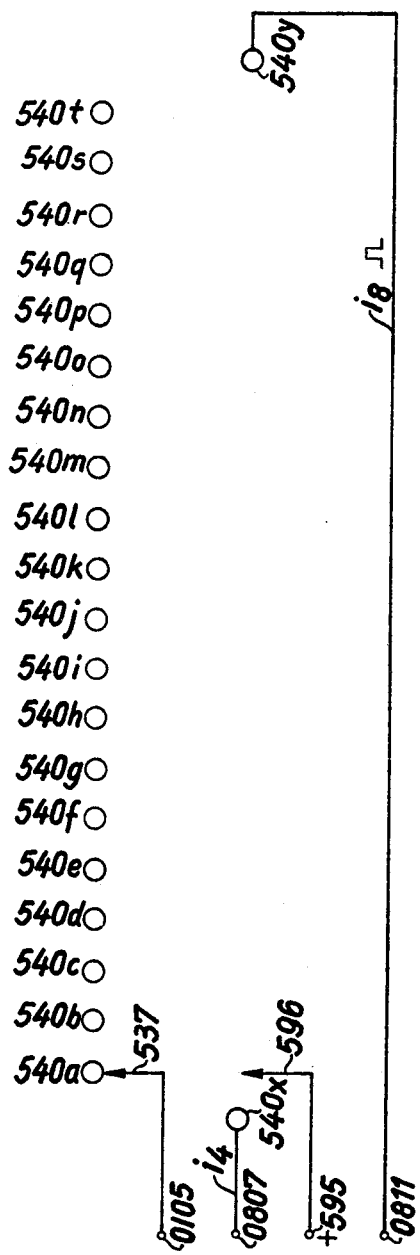
Figure 21:
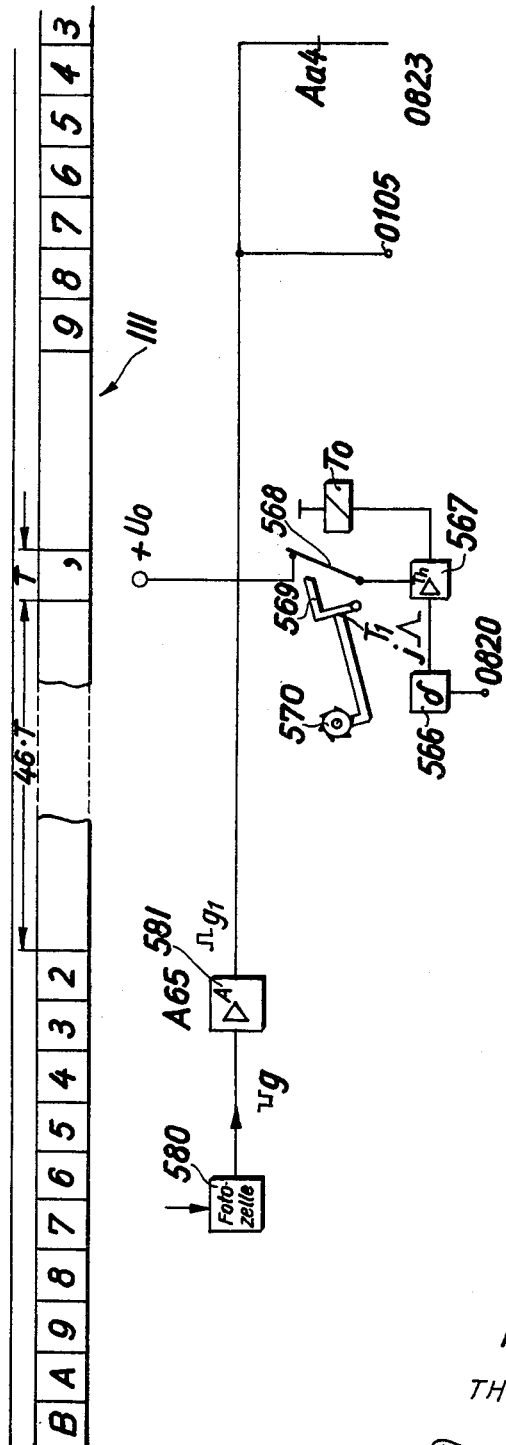
Figure 25:
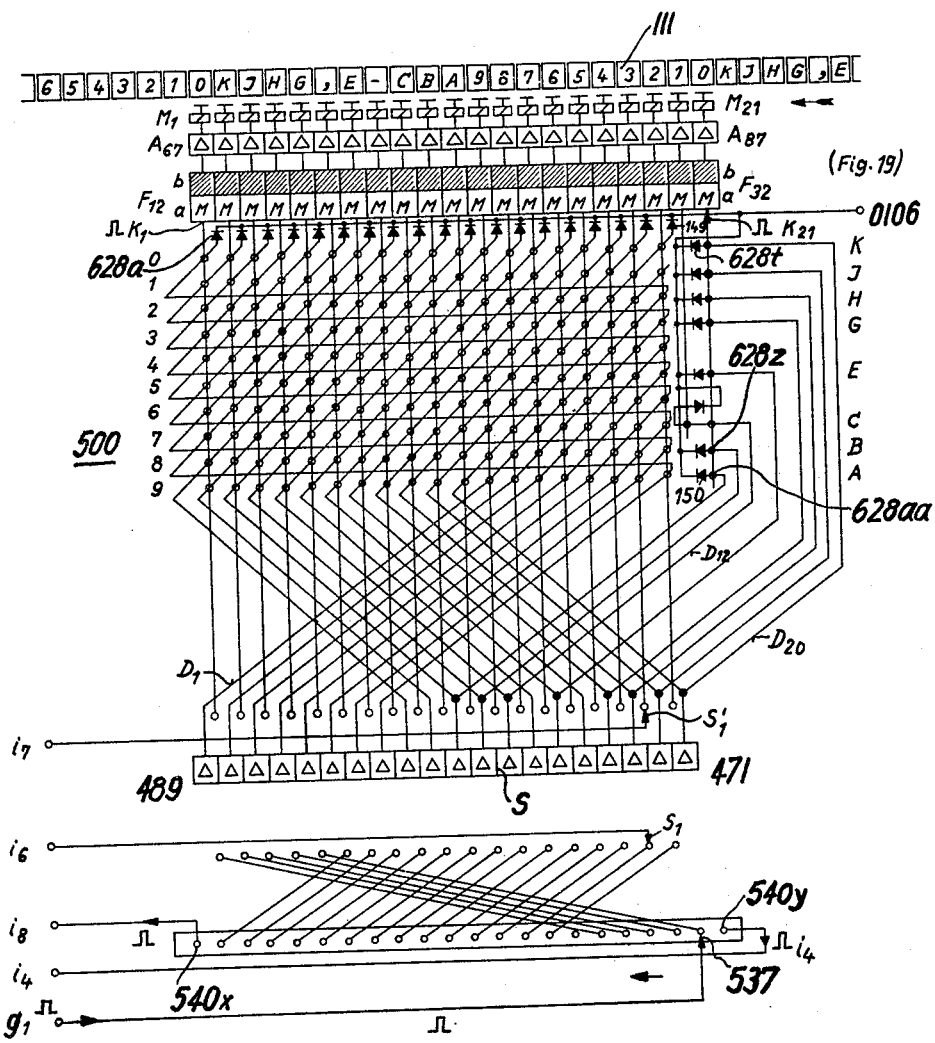
Figure 26:
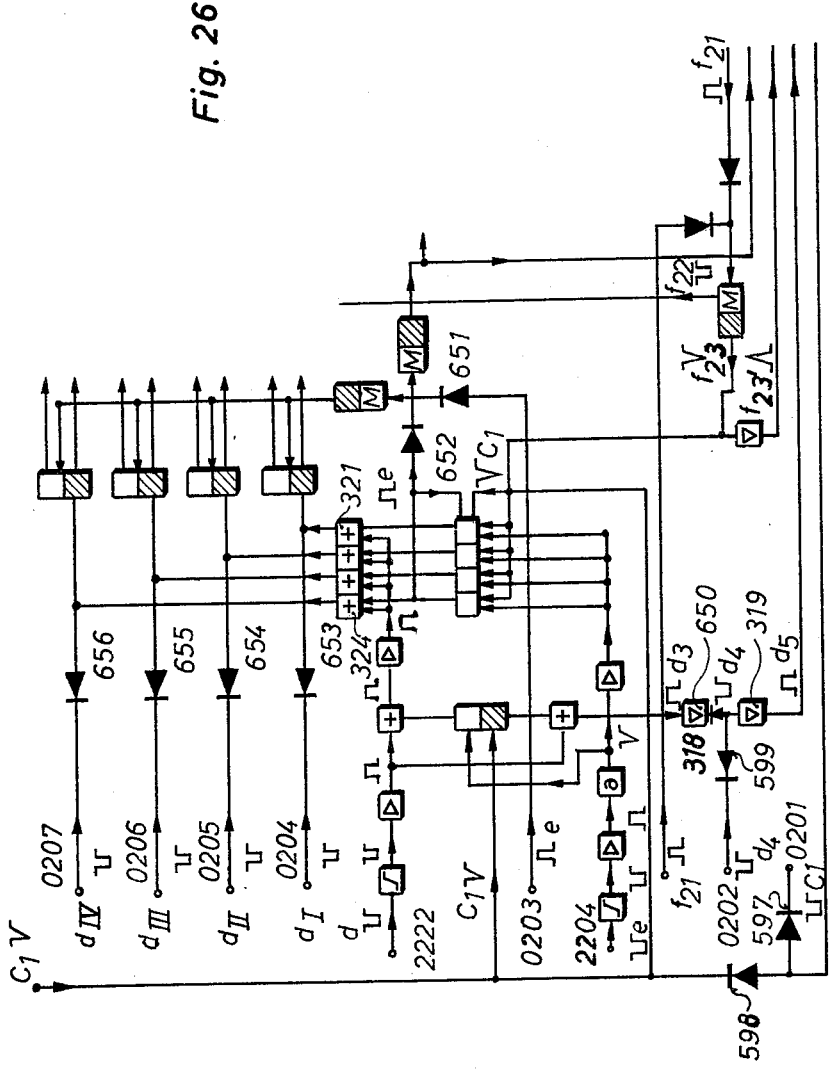
Figure 28B:
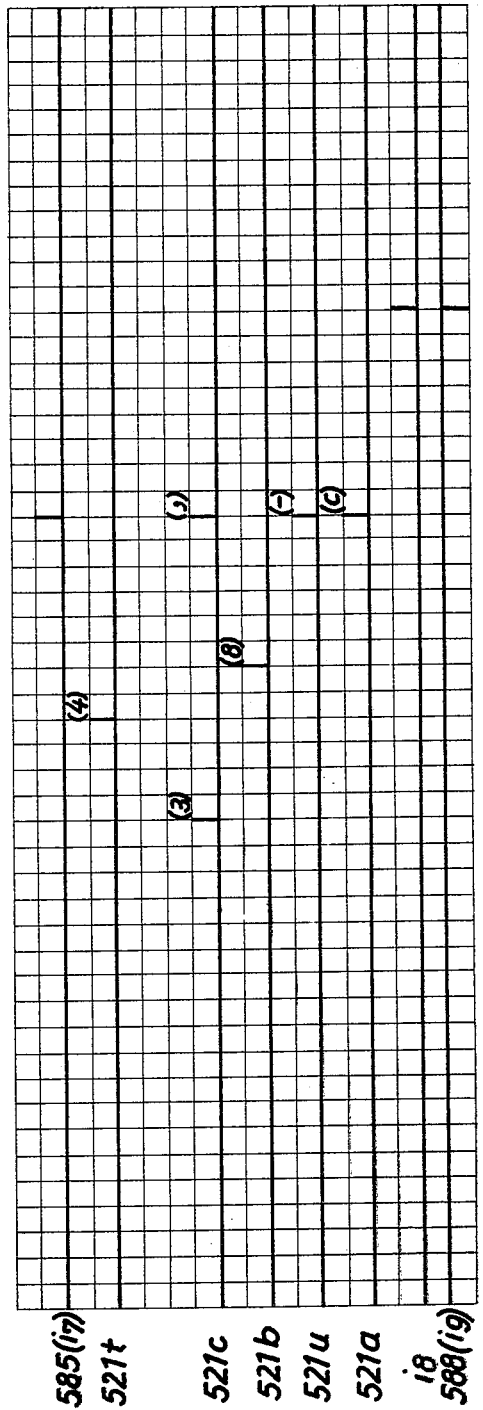

FIGURES 10A to 10D, 10F to 10H', 10J to 10N, and 10P and 10Q illustrate in detail the wiring of various electrical circuits which have been shown by block diagram in the other figures of the drawings;

FIGURE 11 illustrates a part of the control unit of the embodiment of the transfer system illustrated in FIGURE 10;

FIGURE 12 illustrates another part of the control unit comprising a ring counter for loading the decoding unit of the embodiment of the transfer system illustrated in FIGURE 10;

FIGURE 12A illustrates the wiring of the ring counter shown schematically in FIGURE 12;

FIGURE 13 illustrates the decoder unit of the transfer system illustrated in FIGURE 10;

FIGURE 14 illustrates the read-in part of a storage unit of the embodiment of a transfer system illustrated in FIGURE 10, which storage unit comprises a single magnetic core register and a column insertion counter therefore;

FIGURE 14A illustrates the wiring of the column-insertion counter shown schematically in FIGURE 14;

FIGURE 15 illustrates the read-out part of the storage unit illustrated in FIGURE 13;

FIGURE 16 illustrates a "comma"-insertion device associated with the storage unit shown in FIGURES 13 to 14A;

FIGURE 17 shows a linking unit destined for use between the control unit shown in FIGURE 11 or the transfer system according to the invention, on the one hand, and a work-performing machine having discontinuously, linearly movable transport means for either tools or work pieces;

FIGURES 18 and 19 illustrate boxes destined for replacing corresponding boxes in the control unit illustrated in FIGURES 11 and 12, if the transfer system according to the invention shown in FIGURE 10 is to be used with a work-performing machine having a continuously, endlessly movable transport means for either tools or work pieces;

FIGURE 20 shows the "comma"-insertion device and part of the read-out system of the storage unit according to the invention adapted for use with a work-performing machine having continuously movable transport means;

FIGURE 20A shows "comma" insertion means similar to those shown in FIGURE 20, but with electrical potential derived from a different source;

FIGURE 21 illustrates a different embodiment of a linking unit similar to that shown in FIGURE 17, but destined for use with a work-performing machine having continuously, endlessly movable transportation means;

FIGURE 22 shows a different embodiment of the read-out part of a storage unit similar to that illustrated in FIGURE 15, wherein the storage unit comprises a cold cathode thyratron register of the type described in my patent application Serial No. 771,430, now abandoned;

FIGURE 23 shows a somewhat different arrangement of a read-in and read-out system of the storage unit illustrated in FIGURES 14, 15, or 22, in which arrangement the counter serves for read-in as well as read-out;

FIGURE 24 illustrates a box replacing the corresponding box in FIGURES 11 or 18, respectively, in a control unit to be used with a storage unit comprising the arrangement of FIGURE 23;

FIGURE 25 illustrates a read-out system of the storage unit adapted for use with the arrangement of the storage unit illustrated in FIGURE 23;

FIGURE 26 is a partial view of a somewhat different arrangement of the control unit part shown in FIGURE 12, which arrangement is adapted for connection for a punched tape read-out device instead of to the memory section of a computing machine;

FIGURES 27(a) and (b) are a pulse diagram illustrating the decoding and storing operations in the embodiment of the transfer system illustrated in FIGURES 10 to 14, with the adapted arrangements shown in FIGURES 18, 19, 21, and 22;

FIGURES 28(a) and (b) illustrate a pulse plan for the same embodiment of a transfer system operated according to pulse plan 27(a) and (b), but showing the read-out and exploitation of the stored information.

Referring now to the drawings more in detail and first more particularly to the embodiments of the transfer system illustrated in FIGURES 1 to 9A, the unit of the transfer system directly connected to a computing machine is the control unit of the transfer system.

Control Unit

This unit which is illustrated in detail in FIGURES 3 and 4 of the drawings, comprises the following connections to the program section of the computer:

A lead-in connection 10 (FIGURE 4) is provided for the clock pulses $a$ arriving from the program section of the computing machine.

Lead-in 10 is connected to the first grid of a pentode amplifier tube 76 and from the anode of the latter to the first grid of a second amplifier pentode 77, from the anode of which a line leads via connecting point 12 to the loading device of the decoder (FIGURE 5).

A lead-in connection 13 for the track starting pulses $c$ arriving from the program section of the computing machine leads to the first grid of amplifier pentode tube 64, from the anode of that tube to the first grid of amplifier pentode tube 65 and from the anode of the latter via a capacitor 15 to the first grid of heptode 53.

The anode of heptode 53 is connected via capacitor 16 to the grid of triode 54, and the anode of the latter through branch line 17, and capacitor 17a to terminal 170 of the loading device (FIGURE 5) of the decoder unit, and through branch line 18 and capacitor 18a to terminal 180 of the loading device (FIGURE 7) of the storage unit of the transfer system.

Figure 1:
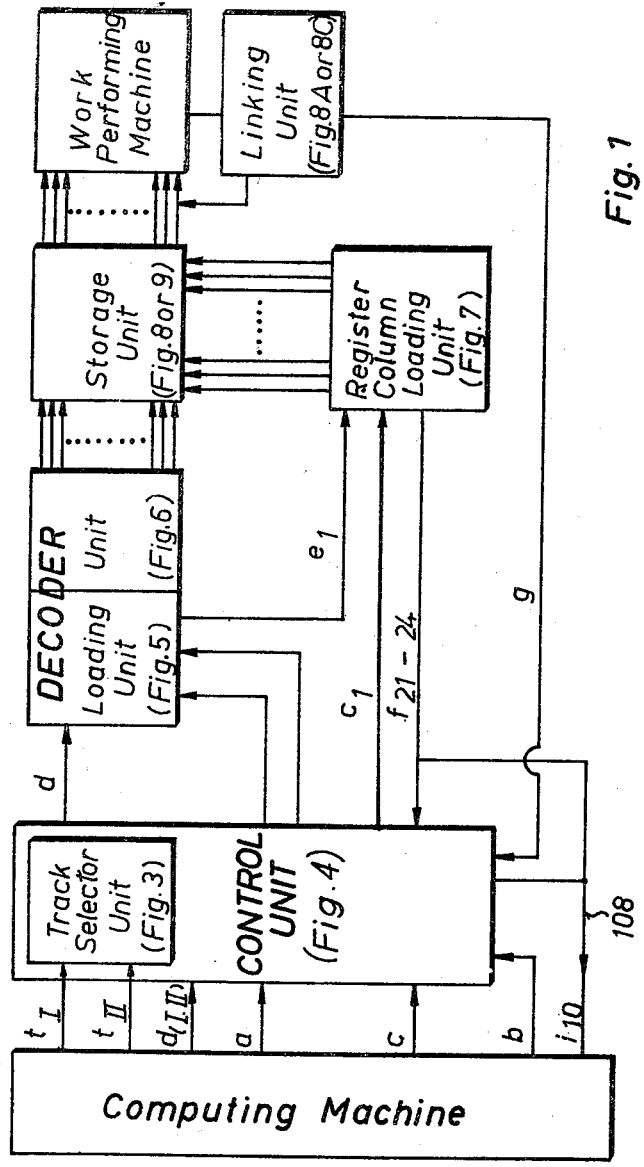
Figure 8A:
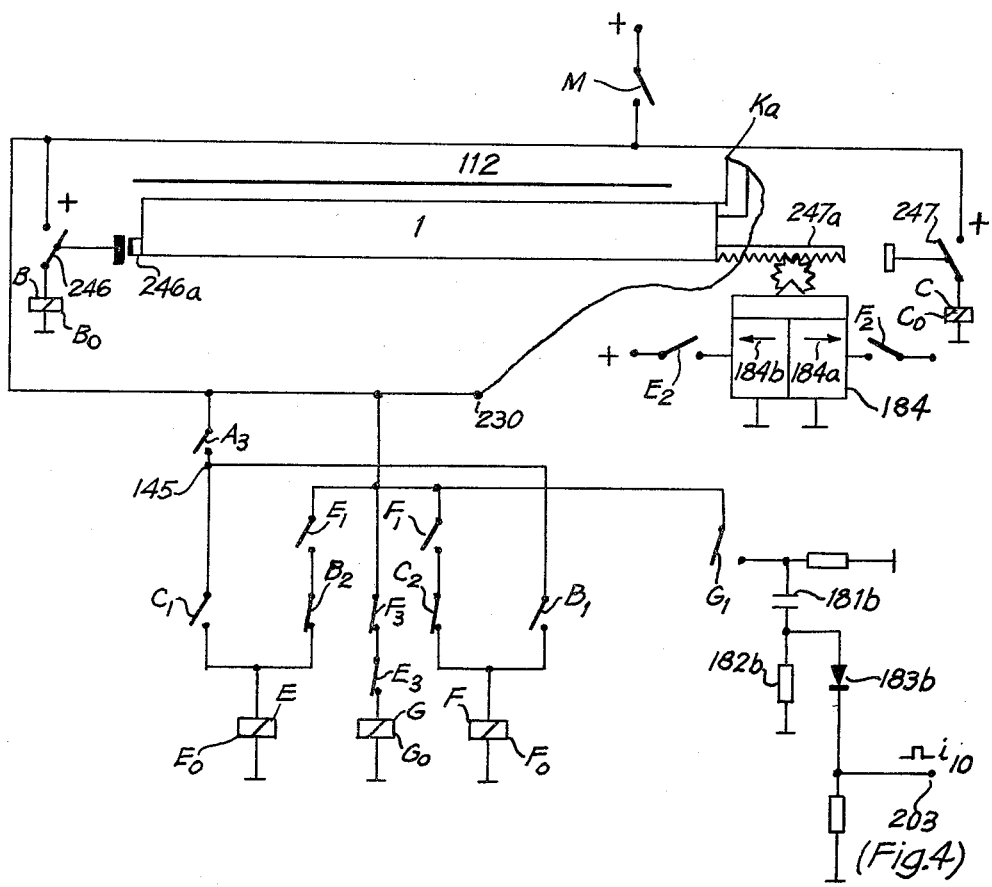
FIGURE 8A shows in greater detail a first embodiment of a linking unit between a work-performing machine and the embodiment of the storage unit shown in FIGURE 8.
Figure 8C:
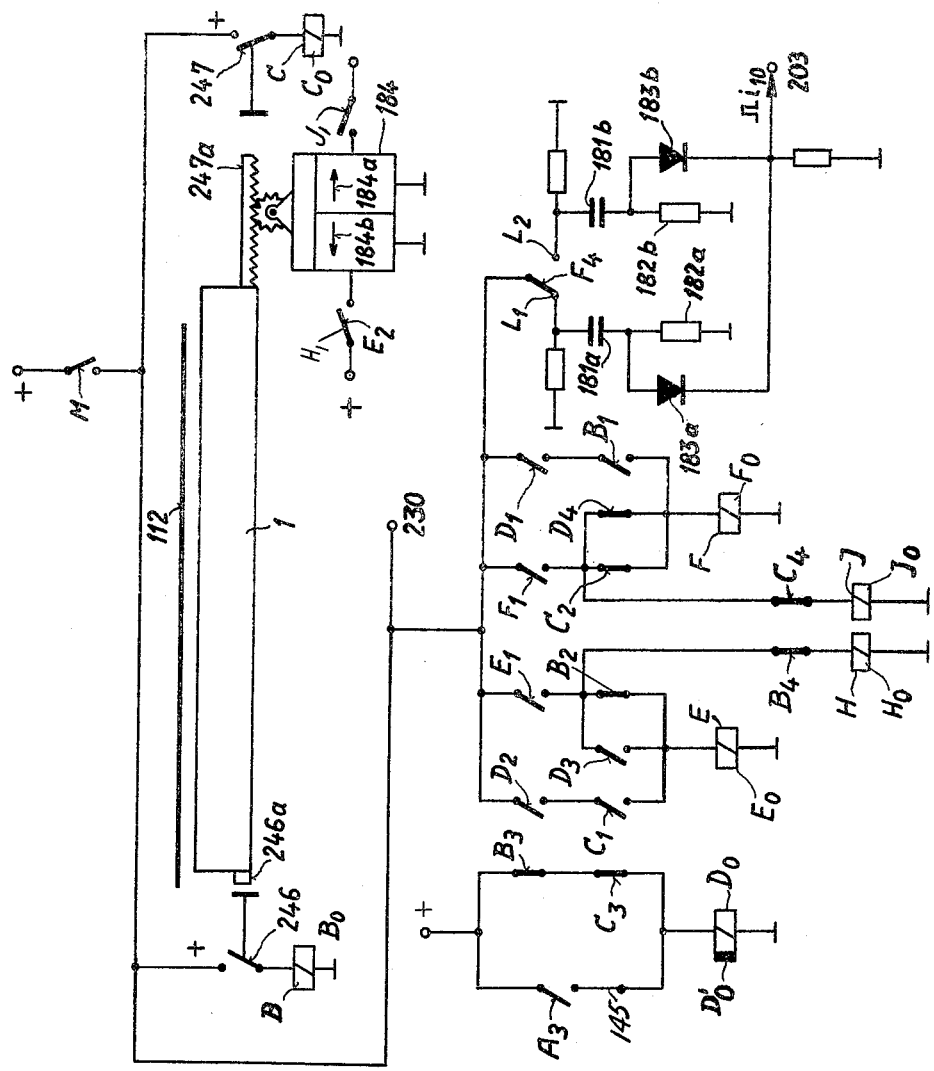
FIGURE 8C shows in detail a preferred embodiment of a linking unit between a work-performing machine and another embodiment of the storage unit, which embodiment is shown in FIGURE 9.

The third grid of heptode 53, on the other hand, is connected through branch line 100 via diode 52 to point 101 from where it is connected via capacitor 202 to terminal 203 of the linking unit to the work-performing machine shown in FIGURES 8A or 8C. This unit constitutes the electronic section of the printing apparatus disclosed in my co-pending patent application Serial No. 640,102 now Letters Patent 2,874,634 supra and is described in detail therein.

By way of this linking unit the control unit receives from the work-performing machine, for instance a printing apparatus, the command pulse $i_{10}$ transmitting the return message that printing from a storage register has been terminated, and, for instance, the printing apparatus is ready to print a new text line, or a machine tool is ready to start a new work cycle.

Point 101 is connected with point 103 through a flip-flop circuit 51 comprising triodes 51a and 51b and diode 51c, while point 102 is connected with point 103 via diode 56, point 204 and flip-flop circuit 55 comprising triodes 55a and 55b as well as diode 55c. Point 103 is connected via capacitor 104 with terminal 124 of the loading device for the storage unit shown in FIGURE 7. Diodes 52 and 56 together with resistor 109 form a logical "and" circuit as described, for instance, in HSCD supra, page 270. Point 204 is further connected by a line via diode 105 and capacitor 106 with the computing machine to receive from the latter command pulses $b$ stating "Calculation terminated; store result!"

From point 103 a further connecting line 108a leads to terminal 119 in FIGURE 3 and, finally, a line 108 from point 107, between diode 55c of flip-flop service 55 and point 103, connects the control unit with the computing machine. The latter line 108 serves for transferring command orders $f_{21, 22}$ stating: "Storage terminated!" from terminal 124 of the loading device for register column to the computing machine.

Upon occurrence of a track selector pulse $t$, for example $t_1$, flip-flop 57 is triggered so as to render to 57a conductive whereby the anode of tube 57b is rendered sufficiently positive to positively bias line 117 thus gating tube 59. Information pulses $d'$ may now pass through gating tube 59. Tube 63 remains grid-biased to ground potential and no pulse is permitted to pass therethrough. The reset pulse denoted with $f_{21, 22}$ appearing at terminal 119 sets the flip-flop 57 back to its normal state whereby the positive bias of line 17 is terminated. Conversely, if track selector pulse $t_2$ had triggered flip-flop 61, the information pulses $d''$ were permitted to pass through gated open tube 63 while no $d'$-pulse would be permitted to pass through gating tube 59. Flip-flop 61 is also reset by an $f_{21, 22}$ pulse appearing at terminal 119.

Track Selector Unit

In the embodiment of the transfer system now being described, the control unit comprises a track selector unit which is also directly connected with the computing machine. This unit which is illustrated in detail in FIGURE 3 receives information pulses $d$ from the recording section and track selection pulses $t$ from the program section of the computer.

FIGURE 3 illustrates the arrangement for information pulses $d'$ from track I and information pulses $d''$ from track II, as well as track selection pulses $t_I$ carrying the command for scanning track I and $t_{II}$ commanding the scanning of track II. The input line for pulse $d'$ is connected to the first grid of amplifying pentode 58 and leads from the anode of the latter via capacitor 110 to the first grid of heptode 59 whose anode is connected with point 110a where it is joined by a line from the anode of heptode 63 whose first grid is in connection with the input line for information pulses $d''$ via pentode 62 and capacitor 112, tubes 62 and 63 being wired in the same manner as tubes 58 and 59. Point 110a is connected via capacitor 113 to the first grid of tube 60 whose anode is connected via an output line to the input terminal 114, in FIGURE 5, of the loading device for the decoder.

The input line for track selection pulses $t_I$ leads via capacitor 115 and diode 116 to the flip-flop circuit 57, and via branch line 117 to the control (third) grid of heptode 59, while the other diode 118 of flip-flop circuit 57, which latter comprises triodes 57a and 57b, is connected via a line 108a to terminal 119 (in FIGURE 4), and, as stated above, to output terminal 124 of the loading device for the storage unit, which is to be described hereinafter in greater detail in connection with FIGURE 7 of the drawings.

In the same manner, the input line for track selection pulse $t_{II}$ leads via capacitor 120, diode 121 and branch line 122 to the control grid of heptode 63, and, on the other hand, to flip-flop circuit 61 comprising triodes 61a and 61b, which flip-flop is connected with terminal 119 via diode 123. The line via terminal 119 (FIGURE 4) serves for carrying command pulse $f_n$ from terminal 124 of the loading device for storage columns to the track selector unit. The other branch lines leading from point 124 to the control unit on the one hand, and to the program section of the computer directly on the other hand, have been described above.

As will be easily understood from the above description of the control unit shown in FIGURES 3 and 4, information (or "word") pulses $d$ are delivered from the track selector section via terminal 114 (FIGURES 3 and 5); clock pulses $a$ via terminal 12, and track starting pulses $c$ via terminal 170 from the main part of the control unit to the loading means of the decoder unit of the transfer system, which will now be described in connection with FIGURE 5.

Loading Means for Decoder

This loading means, which is illustrated in FIGURE 5, comprises a ring counter arrangement 66 consisting of four ring counter stages 66A, 66B, 66C, and 66D. Each ring counter stage is of the type described in HSCD supra, page 22, and contains thyratrons 66a, 66b, 66c, and 66d. The grid of the first thyratron 66a is connected via resistor 124a and point 125a with line 17 via terminal 170 (FIGURE 4). Point 125a on line 17 which carries track starting pulses $c$ arriving from the control unit, is further connected via line 126 and resistor 127d with the cathode of thyratron 66d, and also via capacitor 128a to terminal 12

(FIGURE 4) delivering clock pulses $a$ to the loading device. The anodes of thyratron $66a$–$66d$ are connected via resistor 161 and via thermal 182 (FIGURE 7) to an armature $A_2$, whose function together with a co-ordinated switch armature $A_1$ and a switch relay coil A of the loading device for the storage unit (FIGURE 7) will be described further below.

The cathodes of thyratrons $66a$–$66d$ are further connected in parallel to the control (third) grids of heptodes $71a$–$71d$, while the first grids of these heptodes are connected via capacitor $114a$ to terminal 114 for receiving via the latter information pulses $d$ from the track selector unit shown in FIGURE 3.

Each of heptodes $71a$–$71d$ forming gate group 71 is connected to an amplifier tube $72a$–$72d$ forming the amplifier group 72, which leads, in turn, via input terminals $171_I$, $171_{II}$, $171_{III}$, $171_{IV}$, (FIGURE 6) to flip-flops 24, 25, 26, and 27 of the decoder unit illustrated in FIGURE 6.

Positive information pulses $d_I$ to $d_{IV}$ pass through these input terminals $171_I$ to $171_{IV}$ from the decoder loading device into the decoder.

A coincidence of clock pulse $a$ and of a track starting pulse $c$ fires thyratron $66a$, whereby the grid of thyratron $66b$ is biased positively to have this thyratron fired upon the appearance of the next clock pulse $a$. The ring counter proceeds to successively fire the interconnected thyratrons and to extinguish them upon the firing of the next thyratron. This operation proceeds in synchronism with the appearance of the train of clock pulses $a$.

Ring counter 66 serves as a periodic trigger circuit for the gate group 71 in that the cathode any of the thyratrons $66a$ to $66d$ positively grid biases any of its associated heptodes $71a$ to $71d$, respectively. Any thus biased heptodes transmits an information $d$ if any to any of the channels I to IV, associated to these heptodes, respectively and characterized by terminals $171_I$ to $171_{IV}$, respectively. The thus transmitted information pulses are amplified by the amplifier tubes $72a$ to $72d$ associated to channels I to IV, respectively.

If, for example, the following information pulse train is to be decoded: 0100, such signal will be represented in that one information pulse $d$ is permitted to pass through channel II i.e. through terminal $171_{II}$, while no pulse appears at terminals $171_I$, $171_{III}$, and $171_{IV}$.

Decoder Unit

The decoder unit illustrated in FIGURES 5 and 6, comprises flip-flops 24 to 27, each of which is connected on one side (triodes $24a$, $25a$, $26a$, $27a$) with the input terminals $171_I$ to $171_{IV}$ while the opposite triodes $24b$, $25b$, $26b$, and $27b$ of flip-flops 24 to 27 are connected by means of a resetting pulse line 130 via diodes $80a$ to $80d$ to terminal 130 (FIGURE 5).

Line $130a$ transmitting pulses $e_3$ for resetting flip-flops 24 to 27 to their initial state in which triodes $24b$, $25b$, $26b$, and $27b$ are conductive, leads from the cathode of the last thyratron $66d$ of the ring counter 66D shown in FIGURE 5, via capacitor 131, pentode 67, delay line 68, cross point 132, delay line 69 (delay lines are described, for instance, in HSCD supra, pages 341 to 354), capacitor 133 and terminal 130 to the aforesaid diodes $80a$ to $80d$ in FIGURE 6.

Point 132 is further connected through a line via terminal 142 (FIGURE 7) carrying register column loading pulses $e_1$ to the loading device for the register columns of the storage unit, and through a line $135a$ via capacitor 136, tube 70, terminal 135, and capacitor 137 to the grid of tube 28 of the decoder. The latter line $135a$ carries decoder control pulses $e'$.

From the anode of flip-flop tube $24b$ branch line $140a$ leads through "and" circuit 32 comprising diodes 29 and 30 and resistor $32a$ via point $141a$, and then via "and" circuit 33, comprising diodes $29a$ and $31a$ and resistor $33a$, to the anode of flip-flop tube $24a$.

In a similar manner branch line $140b$ connects the anode of tube $25a$ through four "and" circuits 34 to 37 to the anode of tube $25b$ of flip-flop 25.

Line $140c$ connects six "and" circuits 38 to 43 to tubes $26a$ and $26b$ of flip-flop 26, and line $140d$ connects ten "and" circuits $141_0$, $141_1$, $141_2$, $141_3$, $141_4$, $141_5$, $141_6$, $141_7$, $141_8$, and $141_9$ with the tubes $27a$ and $27b$ of flip-flop 27.

The output lines of "and" circuits $141_0$ to $141_9$ are each connected to a register line amplifier $78a$ to $78j$. A single amplifying element of this type is illustrated in FIGURE 10F and comprises a capacitor 141, a pentode 78 and a pulse transformer 79. Each of the pulse transformers of amplifiers $78a$ to $78j$ is connected via read-in terminals $155a$ to $155j$ (FIGURE 8) to the lines of magnetic core matrix register in the storage unit described hereinafter with the aid of FIGURE 8. The same terminals $155a$ to $155j$ are also to be found in FIGURE 9, showing another embodiment of the storage unit. These output lines carry register line (or horizontal loop) loading pulses.

It shall be assumed that during any given cycle of operation of the ring counter 66 the following code signal appears at the input terminals of the decoder; 0100. This signal has then the effect that the flip-flop 25 is set into a stage of conduction wherein $25a$ conducts. Thus, in terms of on-off conductivity of the flip-flops of the decoder, the signal 0100 is represented by the following combination of conductivity: tubes $24b$, $25a$, $25b$, $27b$ are conductive. A decoder trigger pulse E appears at terminal 135 after counter 66 has completed a cycle. This pulse E was transmitted from thyratron $66d$, via tube 67, delay line 68, capacitor 136, tube 70 and line $135a$ (FIG. 5). Pulse E is further transmitted through tube 28 and thereafter appears at junction $141c$. The appearance of the pulse E triggers the decoder in that for example in the instant case the "and" circuits 33, 36, 42, and $141_7$ produce a positive pulse and a signal appears on terminal $155b$.

After a further delay produced by delay line 69 (FIG. 5) a pulse $e_3$ appears at terminal 30 and in line $130a$ causing flip-flop 25 to flip back to its normal state thus placing the decoder into resting position and closing again the "and" circuits.

If, for example the coded pulse sequence of pulses $d$ is 1010, then ring counter 66 cooperating with gate group 71 has opened channels $171_I$ and $171_{III}$. This operation in turn places the flip-flops of the decoder shown in FIG. 6 in the following state of conduction; conductive are tubes $24a$, $25b$, $26a$ and $27b$. After ring counter 66 has completed this particular cycle, a delayed trigger pulse appears again at terminal 135 and at junction $141c$ now passing through the following and circuits: 32, 35, 39 and $141_7$ thus energizing amplifier $78h$. Accordingly, this decoded signal appears now at terminal $155h$. A delayed pulse also derived from thyratron $66d$ through the complete delay line 68 and 69 appears at terminal 130 and in line $130a$ resetting the flip-flops 24 to 27 to their normal state.

Before, however, going into further details concerning the storage unit, there shall be described the loading device for the storage register columns, which device is illustrated in FIGURE 7.

Loading Device for Register Columns

This loading device comprises a ring counter consisting of counter elements 73 to $73u$ of which only counter elements 73, $73a$, and $73u$ have been illustrated in detail. Counter elements $73b$ to $73t$ inclusive are built in the same manner as counter element $73a$. The number of these counter elements or stages naturally corresponds to the number of register columns in the matrix register or registers used in the storage unit illustrated in FIGURES 8 or 9.

Each ring counter element (whose circuit is described in HSCD supra, page 22) services one storage column of the matrix register to be described hereinafter.

In the embodiment shown in FIGURE 7 each counter element comprises a thyratron.

The grid of the first thyratron (counter element 73) is connected through lines 18 via terminal 180 to the control unit (FIGURE 4) and receives track starting pulses $c$ therefrom.

The grids of all other thyratrons of counter elements 73a to 73u are connected via terminal 142 to delay line 68 in FIGURE 5, whereby they receive register column loading pulses $e_1$.

Negative potential line 143 leads to the cathodes of all thyratrons of counters 73 to 73u, but in the connecting branch to the cathode of the counter 73u-thyratron, there is interposed the above mentioned coil A of relay A ($A_1$, $A_2$, $A_3$) actuating relay armature $A_1$ controlling current flow in the positive potential line 146a connected to the anodes of thyratrons 73 to 73u, and further actuating relay armature $A_2$ in line 146b leading to the anodes of thyratrons 66a to 66d in FIGURE 5 via terminal 182. From the exit point 147z to the loading device for register columns, a line carries the above mentioned message pulses $f_{21, 22}$ stating "Storage completed!" via terminal 124 to the flip-flops 51 and 55 in FIGURE 4 showing the control unit, and via terminal 119 to the flip-flops 57 and 61 in FIGURE 3 showing the track selector unit.

Relay coil A further actuates a third armature $A_3$ which forms part of the linking unit from the storage unit to the work-performing machine, and whose function will be explained hereinafter when describing FIGURES 8A and 8C of the drawings.

Armature $A_3$ is connected to the linking unit shown in FIGURES 8A or 8C via terminal 145, and is also shown in the latter figures.

The cathode of each thyratron of counter elements 73a to 73u is connected to an amplifier 74a to 74u. Only amplifier 74a is shown in detail, amplifiers 74b to 74u being identical therewith, and comprises a pentode 78, diode 141, and pulse transformer 79 as illustrated in FIGURE 10F.

The pulse transformers of these amplifiers 74a to 74u are connected each to a terminal 148a to 148u of the columns of a matrix register in the storage unit shown in FIGURE 8, or to the corresponding terminals 148a to 148u in FIGURE 9, illustrating a different embodiment of the storage unit in the transfer system according to the invention.

*Storage Unit*

A first embodiment of the storage unit is illustrated in FIGURE 8, and comprises a single magnetic core matrix register 154. Magnetic core matrix registers are described, for instance, in HSCD supra, pages 40 to 43. Each matrix comprises two hundred and ten magnetic cores each one indicated schematically by a ring, arranged in twenty one columns and ten lines the location of every magnetic core in the register is schematically illregister by the intersection of a register line and a register column encircled by the ring. In the register 154 illustrated in FIGURE 8 there are provided lines $154_0$ to $154_9$ and columns 154a to 154u forming the read-in part of the register. The register lines end in input terminals 155a to 155j described hereinbefore in connection with FIGURE 6. The register columns lead via a group of double pole single throw switches 150a to 150u (one of which is illustrated in detail in FIGURE 9B), on the one hand to terminals 148a to 148u described above in connection with FIGURE 7, and, on the other hand, to terminals 149a to 149u, respectively, which connect the storage unit, as part of the read-out system of the latter, to the actuating members of work-performing machine.

Figure 10C:
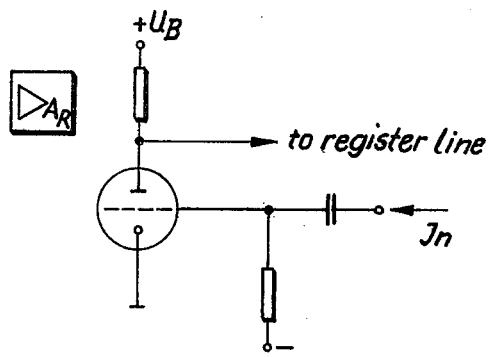
Figure 10B:
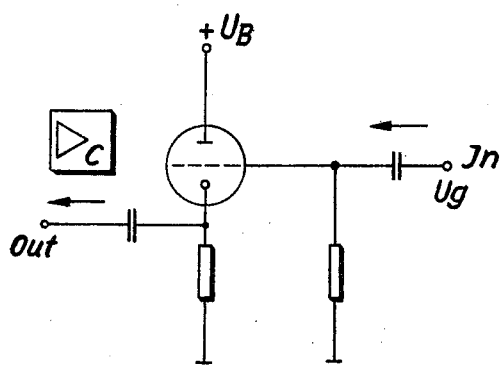

The linking unit from the storage unit comprises the aforesaid terminals 149a to 149u, amplifiers of the type illustrated in FIGURE 10B, and designated by reference numerals 20a to 20u, connected to the aforesaid terminals; actuating electro-magnets 21a to 21u each of which, upon being energized, actuates one of mechanically acting members, for instance hammers or the like, 20A to 20U of the work-performing machine, which acting members cooperate with a transporting member 1 linearly movable in the directions of the arrow shown thereon.

Linearly movable member 1 bears, or has attached thereto, or movable in unison therewith, a scanning member 23, which scans, in successive order, and depending on the direction of movement of member 1, contact terminals 23a to 23j, each of which is connected via lines 157a to 157j, respectively, to three diagonal loops 156a to 156j, 156k to 156t, and 156u to 156dd, respectively, all of which diagonal loops form part of the read-out system of matrix register 154.

These parts as well as those described hereinafter as pertaining to the connecting unit are described in more detail in my Patent 2,874,634.

*Cooperation Between Storage Means and Work-Performing Machine*

While the basic wiring diagram for connecting a work-performing machine, for instance of a type having twenty-one digits or work-performing positions mounted on a linearly displaceable digit carrier 1, to the matrix register 154 as illustrated in FIGURE 8, further details of the connection between the storage unit and the work-performing machine are shown in FIGURES 8, 8A, and 8B. The twenty-one-position work-performing machine comprising the horizontally displaceable digit carrier 1, which is, for instance, a type carrier of a printing machine containing three type sets bearing the characters 0 to 9 in a row, is shown in its end position to the right in FIGURE 8, from where it can be moved step by step toward the left. In the shown end position each of the first twenty-one work positions, or digit types in the case of a printing machine, face actuating members such as hammers 20A to 20U, each of which is associated with hammer actuating magnets 20a to 20u. Each of these magnets can be excited, as shown in detail in FIGURE 8B, by way of a respective current gate 21a to 21u, each of which gates is combined with an amplifier 22a to 22u. The agitation of one magnet, or of several of the magnets simultaneously is only possible if the relay switch $F_v$ actuating armatures is shifted to a position in which it connects the vertical loops 154a to 154u of the matrix register 154 to the input sides connected to terminals 149a to 149u of amplifiers 22a to 22u.

The contactor K is rigidly connected to carrier 1 and is provided with a lead via input terminal 230 from a source of positive potential, and a contact point or slide contact K which slides along a contact rail 23 bearing diagonal terminals 23a to 23j to which there are connected the above-mentioned diagonal loops 157a to 157j of the matrix register 154.

In the two end positions of carrier 1, slide contact $K_a$ is out of contact with diagonal contact terminals 23a to 23j, i.e. the length of travel of the carrier 1 and the slide contact $K_a$ is so dimensioned that slide contact $K_a$ is located in end position either somewhat to the left or somewhat to the right of contact rail 23 while the starting position in which the first work step is performed, during travel to the left, is illustrated in FIGURE 8.

Let us assume that carrier 1 of the work-performing machine (in FIGURE 8) is in the position illustrated in that figure of the drawings.

Scanning contactor K is then with its contact point $K_a$ making contact with contact terminal 23j, i.e. the potential applied via contactor K effects a current flow in the diagonal loops 157j and, therefore, in 156j and 156t. If this diagonal loop is connected to any magnetic intersection in which a digit is stored, i.e. which is in a reversible state of saturation, a voltage is induced in the corresponding one of vertical loops 154a to 154u and work will be performed at the corresponding position of the work-performing machine.

Instead of using mechanical contact means for scanning the contact terminals of the diagonal loops (either FIGURE 8 or FIGURE 9), it is also possible to use electronic or photoelectric scanning means all of which are well known in the art of scanning devices.

A ring counter of the kind illustrated in FIG. 7 and described for instance in HSCD, supra, pages 21 and 22 may equally be used for loading scanning pulses into the diagonal loops 157a to 157j, if the shifting, i.e. triggering and extinction of the various stages of the ring counter, is effected by a pulse sequence which is synchronized with the movement of the carrier of the work-performing machine relative to a stationary part of the latter. This pulse sequence thus takes the place of the register column loading pulses $e_1$ triggering the ring counter stages in the aforesaid FIGURE 7 of my copending application supra.

The Linking Unit

FIGURES 7 and 8A illustrate the control relay system for the printing apparatus according to the invention, to which reference is made in my copending application supra.

The relays used in this system are preferably electromechanical relays of the kind described, for instance, in HSCD supra, pages 35 to 37.

The loading device for register column illustrated in FIGURE 7 contains an electromechanical relay A, which comprises an energizable coil $A_0$ and a number of armatures $A_1$, $A_2$, and $A_3$, the ring counter arrangement RC which comprises a plurality of thyratrons ignitable in successive order and is already described above. Upon ignition of the last thyratron 73u in ring counter RC, which corresponds to the end of the storage process in the matrix register 154 (FIGURE 8), the coil $A_0$ of relay A is energized. Consequently, armatures $A_1$ and $A_2$ are attracted. Thereby armature $A_1$ breaks contact and extinguishes the thyratrons in ring counter arrangement RC. At the same time it causes the emmission of a command pulse $f_{21,22}$ "Storage completed!"

Any loading device for the columns of a storage register must be capable of emitting such a pulse $f_{21,22}$ reporting that storage of a line of information is complete, i.e. that the register is full.

In the linking unit illustrated in FIGURE 8A there are shown a plurality of further relays B, C, E, F, and G. Each of these relays comprises an energizable coil $B_0$, $C_0$, $E_0$, $F_0$, and $G_0$, and several armatures. Thus, coil $B_0$ when energized actuates armatures $B_1$ and $B_2$, coil $C_0$ actuates armatures $C_1$ and $C_2$, coil $E_0$ actuates armatures $E_1$, $E_2$, and $E_3$, coil $F_0$ attracts or releases armatures $F_1$, $F_2$, $F_3$ and coil $G_0$ when energized attracts armature $G_1$ and switches simultaneously the entire set of armatures $G_v$ (in FIGURE 8) to establish contact between the input lines from terminals 148a to 148u with register columns 154a to 154u, or, when deenergized, $G_0$ releases simultaneously the entire set of armatures $G_v$ to establish contact between register columns 154a to 154u with terminals 149a to 149u of the linking unit to the work-performing machine.

Also, when $G_0$ is deenergized it releases armature $G_1$. When armature $G_1$ is closed the subsequent arrangement of capacitance 181, resistance 182 and diode 183 generates a positive pulse $i_{10}$ which is transmitted via terminal 203 (FIGURE 4) to the control unit of the transfer system.

In FIGURE 8A, there is further shown schematically the carrier 1 of the work-performing machine and means for emitting message pulse $i_{10}$ which resorts to the transfer system according to the invention that the work-performing machine is "ready to start working!"

Carrier 1 is provided with a contactor 246a adapted for operating a switch 246, for instance, of a known mechanical switch type, and with a rack 247a operating a switch 247 similar in type to switch 246. A servo-motor 184 acts upon rack 247a in a manner to be described further below and thereby causes the carrier 1 to move either to the right or to the left as indicated by arrows 184a and 184b, depending on which of the two relays E or F causes its armature $E_2$ or $F_2$ to close the circuit supplying power to motor 184.

In the position illustrated in FIGURE 8A, carrier 1 is in its left hand end position ready to start working along a working line by moving to the right. The contactor 246a of the carrier 1 is holding switch 246 in closed position.

If now the main switch M for turning the printing apparatus on and off is actuated, for instance, by hand, to close contact to the power line (not shown) to which it is connected, current will flow through switches M and 246 and through coil $B_0$ energizing the latter.

At the same time, coil $G_0$ is energized via closed armatures $E_3$ and $F_3$, armature $G_1$ is closed and thereby a pulse $i_{10}$ is transmitted to the control unit. Furthermore, armature set $G_v$ is shifted to establish connection between columns 154a to 154u of matrix register 154 with input terminals 148a to 148u so that information can be loaded into the register.

The message conveyed by the aforesaid pulse $i_{10}$ states that the work-performing machine is turned on through main switch M and that carrier 1 is in an end position from which it can move to start a sequence of linearly aligned working steps.

At the same time pulse $i_{10}$ informs the control unit that register 154 is free for storing information.

The same message pulse $i_{10}$ would also be sent out, if carrier 1 was in its right hand end position closing switch 247.

Arrival of a pulse $i_{10}$ at the control unit of the transfer system will cause the system to prepare, in a manner described above, storage of a new text line of information in the register 154, which may just have been emptied by "reading out" a previous information stored therein.

As coil $B_0$ is energized upon turning on main switch M and due to the fact that carrier 1 is in its left hand end position holding contact 246 closed, it actuates armature $B_1$, closing the same, but opens armature $B_2$.

Although pulse $i_{10}$ has been sent out, work performance will not start unless another pulse, namely the abovementioned pulse $f_{21,22}$ is received.

This pulse $f_{21,22}$ arrives only when storage in register 154 is terminated. When this is the case, coil $A_0$ (FIGURE 7) of relay A is energized briefly, and while armature $A_1$ is thereby briefly opened to cut off the ring counter assembly RC and other functions may be performed as described hereinbefore, energization of coil $A_0$ also attracts armature $A_3$ which thus makes contact and brings about the energization of coil $F_0$ of relay F, armature $B_1$ being closed.

Energization of coil $F_0$ closes armature $F_1$ thereby sustaining coil $F_0$ energized via closed armature $C_2$, even when armature $A_3$ opens briefly thereafter. Furthermore, armature $F_2$ is closed, setting motor 184 in motion in the direction of arrow 184a thereby moving carrier 1 to the right in FIGURE 8A. Simultaneously, armature $F_3$ is opened, whereby coil $G_0$ is deenergized and switches $G_v$ are shifted to connect register columns 154a to 154u with the work-performing machine via terminals 149a to 149u (FIG. 8). At the same time armature $G_1$ opens. As the carrier travels to the right, slide contact $K_a$ comes into contact with the first terminal 23a on contact rail 23 and thereby starts scanning the diagonals 157a to 157j of register 154, and work is performed by operating elements, for instance hammers 20A to 20U on the basis of the information read-out from the register 154 until carrier 1 reaches its right hand end position.

Since, by closing main switch M current is also applied to terminal 230 (FIGURE 8) and slide contact $K_a$, a scanning current $I_k$ is sent via slide contact point $K_a$ through the diagonal loops 157a to 157j which causes the read-out of the information stored in register 154 since the vertical loops 154a to 154u of register 154 are already connected to the operating element of the work performing machine, for instance hammers 20A to 20U, as just described.

As carrier 1 leaves its left hand end position contact 246 is interrupted and relay $B_0$ deenergizes, armature $B_1$ opens and $B_2$ closes. However, the energization of coil $F_0$ is sustained via closed armatures $F_1$ and $C_2$.

Shortly prior to carrier 1 reaching its right hand end position, slide contact $K_a$ interrupts contact with the last contact terminal 23j on contact rail 23.

When carrier 1 completes its movement to the right and thus terminates performing a linear work sequence on the basis of read-out information from register 154, its rack 247a closes contact 247 and thereby energizes coil $C_0$ of relay C.

Thereby contact 246 is interrupted and relay B deenergized. Before, however, considering the consequences of the deenergization of coil $B_0$, there shall be described the further function of relay F.

When carrier 1 completes its movement to the right and thus terminates performing work in one linear sequence on the basis of read-out information from the register 154, its rack 247a closes contact 247 and thereby energizes coil $C_0$ of relay C.

Consequently, armature $C_1$ is closed and armature $C_2$ opens. Thereby, relay coil $F_0$ is deenergized, $F_1$ and $F_2$ open and contact $F_3$ closes reenergizing coil $G_0$ and thereby shifting switch set $G_v$ back to establish connection between the columns 154a to 154u of register 154 and input terminals 148a to 148u. The register is now connected to receive new information from the transfer system according to the invention.

Simultaneously, armature $G_1$ closes and generates a new pulse $i_{10}$.

Opening of armature $F_2$ cuts off motor 184 and brings carrier 1 to a standstill.

Now, storage of new information takes place as described hereinbefore and, as soon as storage is terminated a new pulse $f_{21,22}$ is generated and relay coil $A_0$ is energized, thereby closing, among others, armature $A_3$. Thereby coil $E_0$ is energized via closed armature $C_1$ and closes armature $E_1$ sustaining itself via closed armature $B_2$; furthermore, armature $E_2$ is closed, thereby providing current flow to motor 184 which operates in the direction indicated by arrow 184b and moves carrier 1 toward its left hand end position illustrated in FIGURE 8A. Finally, energization of coil $E_0$ also opens armature $E_3$ and deenergizes coil $G_0$, thereby returning switches $G_v$ to a position in which they establish contact between register columns 154a to 154u and the work-performing machine. Armature $G_1$ again opens.

The work-performing machine then carries out another sequence of working steps during the movement of the carrier 1 to the left on the basis of new information read-out from register 154.

As carrier 1 arrives in its left hand end position, its contactor 246a closes switch 246 and energizes coil $B_0$. Thereby, armature $B_2$ opens and deenergizes coil $E_0$, so that armatures $E_1$ and $E_2$ open, motor 184 is stopped and carrier 1 comes to a standstill. Furthermore, armature $E_3$ closes, energizing coil $G_0$ and thereby reconnecting the register to the information transfer system in the manner described above. Also, energization of coil $G_0$ closes armature $G_1$ and a new pulse $i_{10}$ is generated.

When the next following storage operation is completed, coil $A_0$ is energized as described above, armature $A_3$ closes and the work cycle of the linking unit illustrated in FIGURE 8A begins anew.

*Storage Unit With Two Registers for Alternate Operation*

Figure 9A:
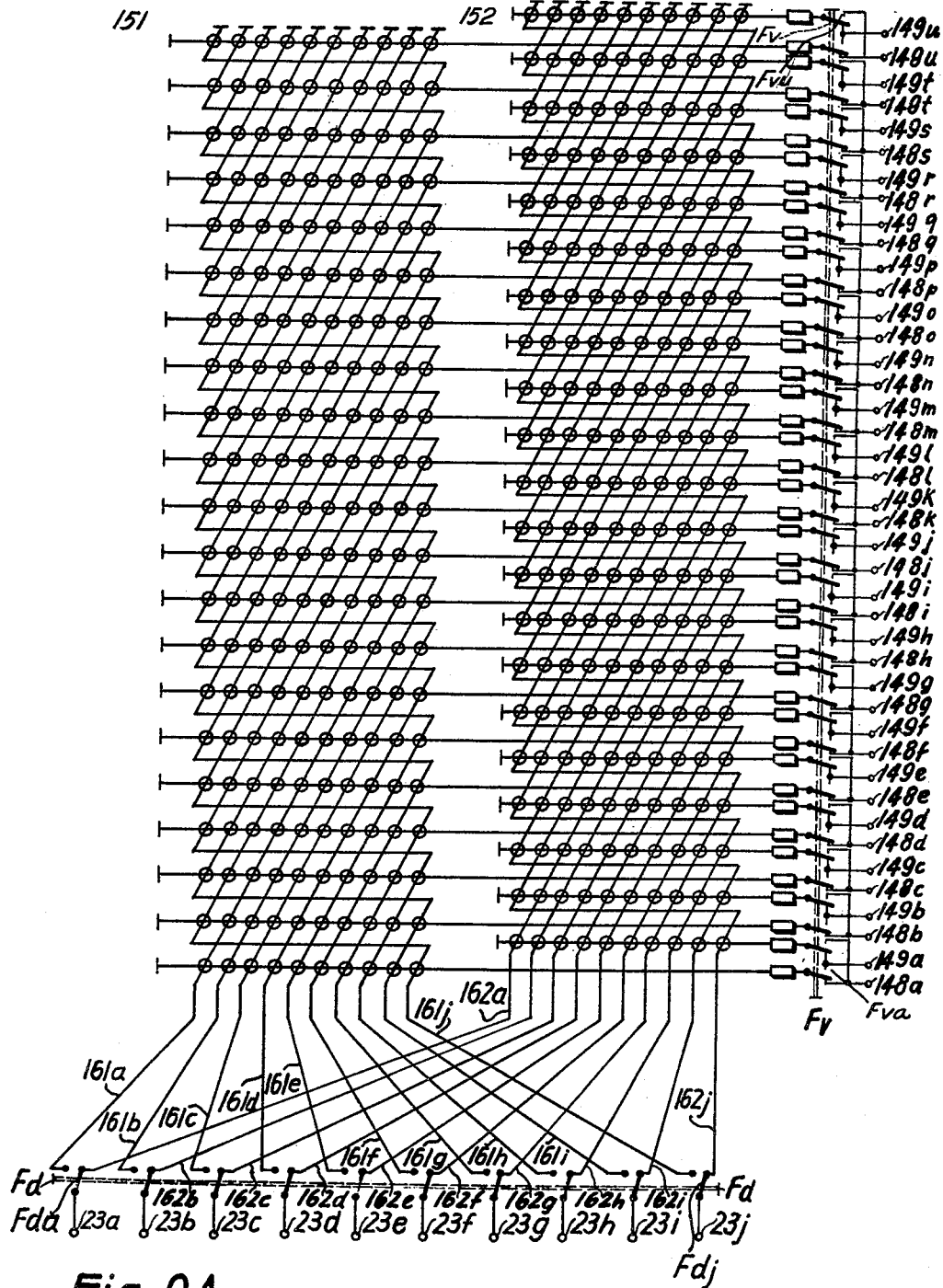
FIGURE 9A illustrates the read-out system of the embodiment of the storage unit shown in FIGURE 9.

In FIGURES 9 and 9A of the drawings there is shown another embodiment of the storage unit of the transfer system according to the invention, in which embodiment the storage unit comprises two magnetic core matrix registers 151 and 152, these matrix registers each included two hundred ten magnetizable ring cores arranged in ten lines and twenty one columns. Matrix register 151 comprises lines $151_0$ to $151_9$ and register 152 lines $152_0$ to $152_9$, each pair of corresponding lines, for instance $151_0$ and $152_0$ being connected to the opposite poles of a single throw double-pole switch of simultaneously operable relay armatures $Fh_0$ to $Fh_9$ of relay F, each of which armatures is permanently connected to the corresponding one of input terminals 155a to 155j.

Register 151 further comprises vertical columns 151a to 151u, and register 152 columns 152a to 152u, each pair of the corresponding columns of the two registers, for instance column 151a and column 152a being connected to the respective one of a group of double-pole switches Fva to Fvu, the armatures of which switches are all mechanically connected for simultaneous operation as relay coil $F_0$ mentioned above is energized or deenergized.

Figure 9B:
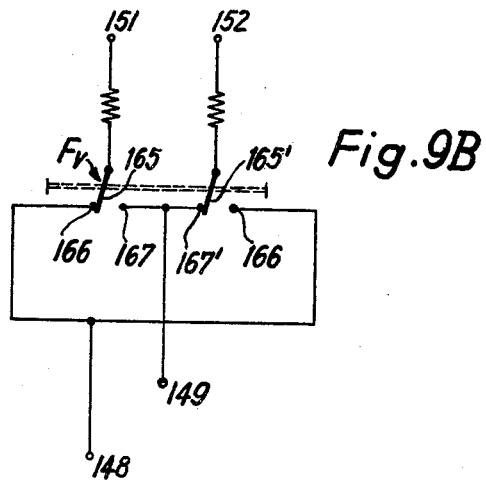
FIGURE 9B shows in detail switching means used in the read-out system of the embodiment of the storage unit shown in FIGURE 9.

One of these switches is illustrated in FIGURE 9B, by way of example, and comprises double throw armatures 165 and 165', of which armature 165 contacts pole 166 concurrently with 165' contacting pole 167', while, after switching due to a corresponding change of status of coil $F_0$, armature 165 contacts pole 167 simultaneously with armature 165' contacting pole 166'.

Poles 166 and 166' are connected in parallel to terminal 148, being one of terminals 148a to 148u to which the loading device for register columns shown in FIGURE 7 is connected.

Poles 167 and 167' are connected in parallel to output terminal 149, being one of terminals 149a to 149u to which the work-performing machine is connected as shown in FIGURE 8.

FIGURE 9A illustrates the read-out part of the storage unit illustrated in FIGURE 9 which comprises diagonal lines 161a to 161j of register 151 and diagonal lines 162a to 162j of register 152. Each pair of corresponding diagonal read-out lines from the two registers, for instance diagonals 161a and 162a and in opposite poles of the same one of diagonal switches F to Fdj the armatures of which are simultaneously operable by energization or deenergization of coil $F_0$. Each of these armatures is permanently connected to output terminals 23a to 23j constituting contacts scanned by displaceable contact $K_a$ mentioned hereinbefore.

This storage unit as illustrated in FIGURES 9, 9A, and 9B is shown in these FIGURES in a position in which the lines and columns of register 151 are connected to terminals 155a to 155j and 148a to 148u, respectively, so that decoded information can be stored in this register, while the lines of register 152 are disconnected, the columns of register 152 are connected to output terminals 149a and the diagonals 162a to 162u of register 152 are connected to output terminals 23a to 23j so that information can be read out and cause the performance of work by a corresponding actuation of working elements 20A to 20U under simultaneous translation of carrier 1 of the work-performing machine.

Upon changing the state of coil $F_0$ in FIGURE 8C, the positions of armatures $Fh_0$ to $Fh_9$, Fva to Fvu, and Fda to Fdj are reversed, information is being stored in register 152 and information is being read out and converted into performance of work from register 151.

The control of the status of coil $F_0$ is effected in the same manner as described hereinbefore in connection with FIGURE 8C, as described hereinafter.

The linking unit illustrated in FIGURE 8C is adapted for linking a work-performing machine to a transfer system according to the invention fitted out with a storage unit comprising the two registers 151 and 152.

In FIGURE 8C there are shown a plurality of further relays B, C, D, E, F, H, and J. Each of these relays comprises an energizable coil $B_0$, $C_0$, $D_0$, $E_0$, $F_0$, $H_0$, and $J_0$, and one or more armatures. Thus, coil $B_0$ when energized actuates armature $B_1$, $B_2$, $B_3$, and $B_4$; coil $C_0$ actuates armatures $C_1$, $C_2$, $C_3$ and $C_4$; coil $E_0$ actuates armature $E_1$; and coil $F_0$ attracts or releases armatures $F_1$ and $F_4$, and the multiple armatures $Fv$ for switching connecting lines simultaneously from the vertical loops of storage register 151 to the vertical loops of register 152 (FIGURE 9) and back, as well as multiple armatures $Fh$ establishing alternately connection to the horizontal loops of either register, and armatures $Fd$ connecting, alternately contactor terminals 23a to 23j mentioned above with the diagonal loops of either register 151 or register 152.

Furthermore, coil $D_0$ which is provided with a delay winding $D'_0$, actuates armatures $D_1$, $D_2$, $D_3$, and $D_4$; coil $H_0$ actuates armature $H_1$; and coil $J_0$ actuates armature $J_1$.

In FIGURE 8C there is further shown schematically the carrier 1 of the work-performing machine and means for emitting message pulse $i_{10}$ which reports to the transfer system according to the invention that the work-performing machine is "ready to start working!"

These means comprise capacitors 181a and 181b, resistors 182a and 182b, and diodes 183a and 183b. The operation of these means as armature $F_4$ is switched from contact with terminal $L_1$ to contact with terminal $L_2$ and back, will be explained hereinafter.

Carrier 1 is provided with a contactor 246a adapted for operating a switch 246, for instance, of a known mechanical switch type, and with a contact rail 247a operating a switch 247 similar in type to switch 246. A servo-motor 184 acts upon rack 247a in a manner to be described further below and thereby causes the carrier 1 to move either to the right or to the left as indicated by arrows 184a and 184b, depending on which of the two relays E or F causes its armature $E_2$ or $F_2$ to close the circuit supplying power to motor 184.

In the position illustrated in FIGURE 8C, carrier 1 is in its left hand end position ready to start working along a working line by moving to the right. The contactor 246a of the carrier 1 is holding switch 246 in closed position.

If now the main switch M for turning the printing apparatus on and off is actuated, for instance, by hand, to close contact to the power line (not shown) to which it is connected, current will flow through switches M and 246 and through coil $B_0$ energizing the latter.

At the same time, since armature $F_4$ is in its left hand contact position resting on terminal $L_1$, capacitor 181a is charged as soon as main switch M is turned on, and, due to the potential drop across resistor 182a, a positive pulse $i_{10}$ is sent out via diode 183a and terminal 203 (FIGURE 8A/FIGURE 4) to control unit (FIGURE 4) of the transfer system according to the invention.

The message conveyed by the aforesaid pulse $i_{10}$ states that the printing apparatus is turned on through main switch M and that carrier 1 is in an end position from which it can move to start a sequence of linearly aligned working steps.

The same message pulse $i_{10}$ would also be sent out, if carrier 1 were in its right hand end position closing switch 247, and if armature $F_4$ would then be in its right hand rest position contacting terminal $L_2$.

Arrival of a pulse $i_{10}$ at the control unit of the transfer system will cause the system to prepare, in a manner described above, storage of a new text line of information in the register which has just been emptied by "reading out" a previous information stored therein.

Let us now assume that, while the printing apparatus is still printing information stored in the register 152 shown in FIGURE 9A, i.e. while the multiple armatures $Fd$ connect simultaneously all scanning terminals 23a to 23j with the diagonal loops of that register, and all armatures $Fv$ connect the vertical loops via terminals 149a to 149u to the printing apparatus (FIGURE 6) in the manner illustrated in FIGURE 9A, storage is taking place in register 151.

This is illustrated in FIGURE 9 by a corresponding position of the left hand armatures of each armature pair of armatures $Fv$, connecting terminals 148a to 148u simultaneously to the vertical loops, and by the position of armatures $Fh$ connecting all terminals 155a to 155j to the horizontal loops, of the same register 151.

As coil $B_0$ is energized upon turning on main switch M and due to the fact that carrier 1 is in its left hand end position holding contact 246 closed, it actuates armature $B_1$, closing the same, but opens armatures $B_2$, $B_3$, and $B_4$.

Although pulse $i_{10}$ has been sent out, work performance will not start unless another pulse, namely the above-mentioned pulse $f_{21, 22}$ is received.

This pulse $f_{21, 22}$ arrives only, when storage in register 151 is terminated. When this is the case, coil $A_0$ (FIGURE 7) of relay A is energized briefly, and while armature $A_1$ is thereby briefly opened to cut off the ring counter assembly RC and other functions may be performed as described hereinbefore, energization of coil $A_0$ also attracts armature $A_3$ which thus makes contact and brings about the energization of coil $D_0$ of relay D, armature $D_1$ being closed.

Actuation of relay D leads to the opening of armatures $D_3$ and $D_4$ and to closing of armatures $D_1$ and $D_2$. While closing the latter armature has no effect on relays E or H, since armature $C_1$ is open, the closing of $D_1$ leads to energization of coil $F_0$ of relay F.

Thereby, armature coil $J_0$ of relay J is energized, since armature $F_1$ is closed, while armature $F_4$ is thrown from contact with terminal $L_1$ to contact with terminal $L_2$.

The aforesaid pulse $i_{10}$ is thus generated which announces that, simultaneously, relay F has shifted armatures $Fv$, $Fh$, and $Fd$ in the manner described above. Only following this shifting step can new storage from one register and printing from the other register begin.

The aforesaid energization of relay J causes armature $J_1$ to close and to set motor 184a in motion which motor moves carrier 1 to the right in FIGURE 8C.

Thereby contact 246 is interrupted and relay B deenergized. Before, however, considering the consequences of the deenergization of coil $B_0$, there shall be described the further functions of relay F.

When this relay F is energized, it attracts armature $F_1$ as just described, but also shifts all armatures $Fd$ (FIGURE 9A) so that the scanning contactors 23a to 23j are now connected to the diagonal loops of register 151, which loops are then scanned during the ensuing movement to the right of type set carrier 1. The scanning current $Jk$ is sent via slide contact point $Ka$ through the diagonal loops 161a to 161j, which causes the read-out of the information stored in register 151 since the vertical loops 151a to 151u of that register have already been connected to terminals 149a to 149u (FIGS. 9 and 8).

Furthermore, energization of relay F has also shifted armatures $Fh$ to connect the terminals 155a to 155j to the horizontal loops of storage register 152 (FIG. 9).

Consequently, the work process now comprises work performance on the basis of information read-out from register 151 and storage of new information in register 152.

Returning now to relay B, deenergization of coil $B_0$ causes armature $B_1$ to open, while $B_2$, $B_3$, and $B_4$ close, i.e. return to their initial position. Owing to the delay winding $D'_0$, relay D remains energized for a short while, even after relay A has become self-deenergized and armature $A_3$ has opened. Then, however, as relay D falls off, $D_1$ and $D_2$ open, while $D_3$ and $D_4$ close.

Nevertheless, relays F and J remain energized via armatures $F_1$, $C_2$, $D_4$, and $C_4$, and motor 184a continues to move carrier 1 to the right.

When carrier 1 completes its movement to the right and thus terminates performing work in one linear sequence on the basis of read-out information from the register 151 to which the shift of relay F acting on armatures Fv, Fh, and Fd has it connected, its rack 247a closes contact 247 and thereby energizes coil $C_0$ of relay C.

Consequently, armature $C_1$ is closed and armatures $C_2$, $C_3$, and $C_4$ opened. However, relay F is still maintained energized, as long as relay D is inactive, $D_4$ and $F_1$ remaining closed. Thus, while printing from one register comes to an end, storage in the other register will still continue.

Oppositely, if storage in a register is terminated, the aforesaid pulse $f_{21, 22}$ announces this fact and relays A and subsequently D are activated. Nevertheless, this will have no influence on the printing from the other register, for, while $D_4$ is opened, $C_2$ remains closed and consequently relay F remains energized via $F_1$ and $C_2$, and armatures Fv, Fh, and Fd retain registers 151 and 152 (FIGURES 9 and 9A) as connected.

It is thus immaterial which of both pulses $f_{21, 22}$ and $i_{10}$ arrives first, both must have been received so that a shift from register 151 to 152 or vice versa can be effected through relay F operating armatures Fv, Fh, and Fd can be effected.

If, however, carrier 1 has reached its right hand position, and relay C is activated causing the changes just described, and then storage is determinated and relays A and D are activated, energization of $D_0$ causes closing of $D_1$ and $D_2$, and opening $D_3$ and $D_4$, and, since $B_1$, $C_2$ and $D_4$ are all open, coils $F_0$ and $J_0$ will be deenergized, armature $J_1$ is released, and power is cut off from the side 184a of motor 184 driving carrier 1 to the right. At the same time, closing of $D_2$ and $C_1$ causes energization of coil $E_0$ of relay E closing armature $E_1$, and of coil $H_0$ via $B_4$, activating relay H and causing armature $H_1$ of the same to close and cause motor 184 to drive carrier 1 to the left.

Deenergization of relay F has also brought about a shift of armatures Fv, Fh, and Fd, so that printing now takes place from register 152 while new information is stored in register 151.

As soon as the motor 184 starts moving carrier 1 away from its right hand position to the left, switch 247 opens and coil $C_0$ of relay C is deenergized. Consequently, armature $C_1$ opens and $C_2$, $C_3$, and $C_4$ close. Due to delay winding $D_0$, relay D falls off slowly and $D_1$ and $D_2$ open, while $D_3$ and $D_4$ close. Nevertheless, coils $E_0$ and $H_0$ remain energized via $E_1$, $B_2$, and $B_4$, and motor 184 continues to move carrier 1 to the left.

Only upon arrival of the carrier 1 at its left hand end position, does contactor 246a close switch 246, thus energizing coil $B_0$ of relay B and making the control system of the printing apparatus ready for performing yet another line of work upon receipt of another pulse $f_{21, 22}$.

The steps of the work-performing and storing operations are then repeated in the same manner as described above.

After having described in detail the structure and the operation of every element and every unit used in the embodiment of the present invention illustrated in FIGS. 1 through 9a, the operation of this transfer system shall be described briefly in the following, particularly with reference to FIG. 2 and the double storage register system.

Figure 2:
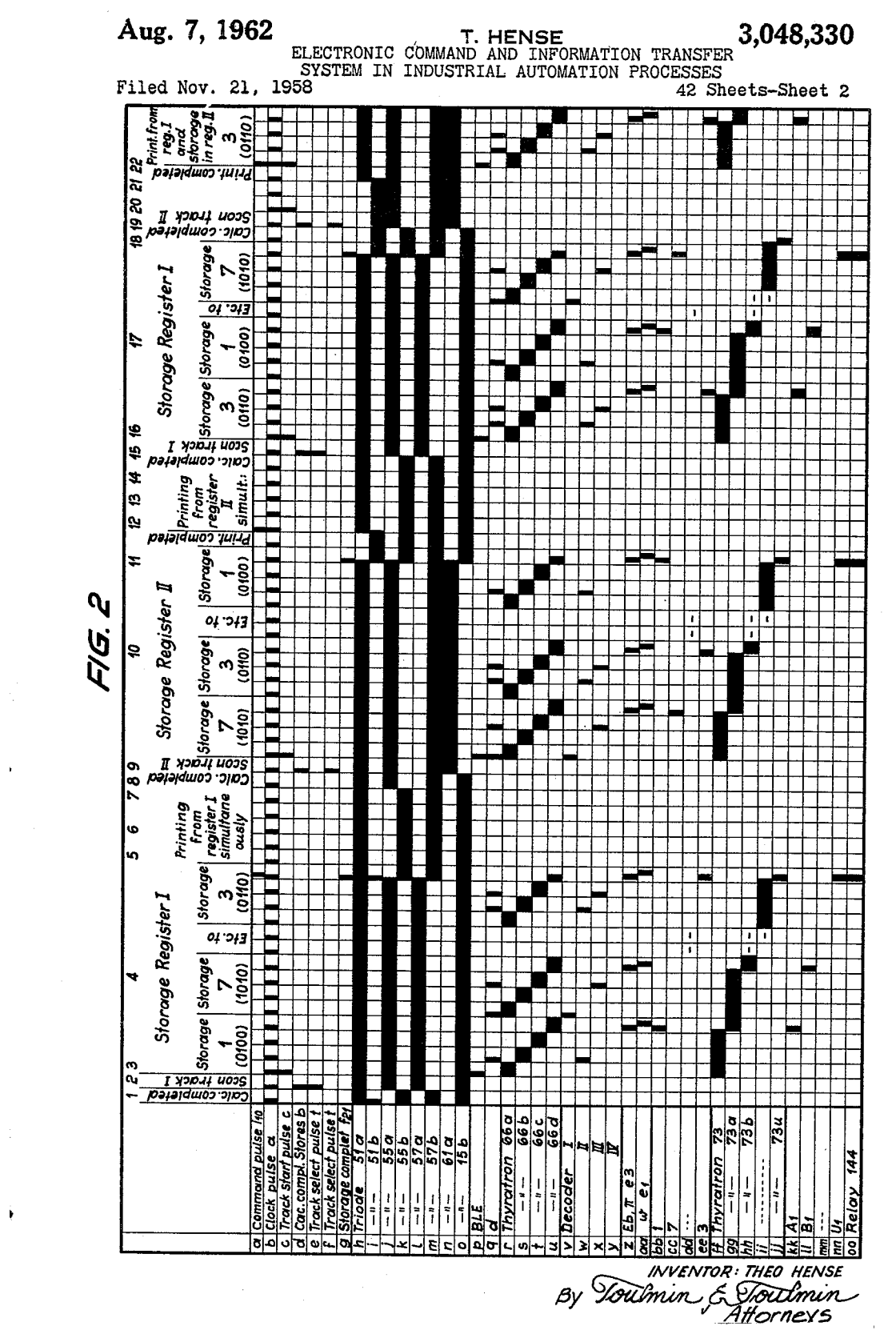

In FIG. 2 in the left hand column the various pulses and circuit elements are identified. On top of the FIG. 2 is denoted the time sequence of the operation of the transfer system. In this diagram of FIG. 2 it is marked in black whenever an element indicated in the left hand column is activated or whenever a pulse identified in this left hand column is produced.

At the moment of the completion of the calculation with no information in any of the storage registers, the transfer system is in the following operative state which can be denoted as initial state: In FIG. 4, gate 53 is blocked because the logic and circuit consisting of the elements 52, 56 and 109 is blocked, because in flip-flop 55 tube 55b is conductive, rendering negative the potential at junction 204. Flip-flop 51 has been prepared to have tube 51a conductive by a prior pulse $i_{10}$ initiated by the termination of a prior printing process, thus diode 52 is blocked. In the track selector unit (FIG. 3) flip-flops 57 and 61 both have their right hand side tubes conductive. In the decoder loading circuit, the thyratrons of ring counter 66 (FIG. 5) are non-conductive and the gate group 71 is blocked. The tubes denoted with the subscript "b" of the flip-flops 24 to 27 of the decoder (FIG. 6) are conductive, and none of the "and" circuits of the decoder are open. The thyratrons of the counter illustrated in FIG. 7 are non-conductive. Relay A thereof is closed and a positive anode voltage is applied to the ring counter 66 and the counter illustrated in FIG. 7. The output channels of the register loading circuits are connected to the column of the storage matrix 151 as indicated in FIG. 9; accordingly, the lines of the storage matrix 151 are connected to the output circuit of the decoder (terminals 155a to 155j) as also illustrated in FIG. 9. The read-out circuit of the other storage matrix, 152, is connected to the printing apparatus.

Upon completion of the calculation, a pulse $b$ appears, and flip-flop 55 is flipped to have tube 55a conductive. Terminal 204 thus becomes positive and opens the "and" circuit as well as gate 53. Simultaneously to the appearance of pulse $b$, a track selector pulse $t_1$ flips the flip-flop 57 to render tube 57b conductive thus opening gating tube 59.

Concurrently with the next clock pulse $a$, a track starting pulse $c$ passes through gate 53 which has been opened. This pulse $c$ then is fed to terminal 124a as a gating pulse for thyratron 66a of ring counter 66. Due to the fact that track pulse $c$ appears simultaneously with the clock pulse $a$ it is immaterial whether pulse $c$ itself is sufficiently large to fire thyratron 66a. Decisive is only that clock pulse $a$ as applied to the thyratrons of the ring counter 66 are insufficient to fire them when applied by themselves without prior or simultaneous gating action.

Pulse $c$ after having passed through gate 53 is also fed into the loading circuit for the storage register counter (FIG. 7), particularly to thyratron 73 thereof which is fired and thus prepares the first stage 73a thereof.

Due to the fact that upon occurrence of pulse $c$ thyratron 66a is fired, a simultaneously appearing information pulse, for example a pulse $d_1$ could have also passed through the track selector unit (gate tube 59) and to the gate group 71, in particularly 71a thereof which is gated open by the now conductive thyratron 66a. However, in the present example no information pulse appears; thus nothing further happens until the next clock pulse $a$ fires thyratron 66b which has been prepared, i.e. was gated by thyratrons 66a. Upon thyratron 66b becoming conductive, thyratron 66a extinguishes and gate 71a is closed while 71b is opened. In the present example now a pulse $d$ appears and passes through gate 71b the pulse is then amplified and fed to channel II having terminal $171_{II}$. The following two clock pulses complete one cycle of ring counter 66 but no further information pulse $d$ appears during this cycle. With tube 66d being fired, a delayed pulse $e_1$ and a concurrent pulse E are produced. Pulse E triggers tube 28 which in turn triggers the decoder as outlined above and a signal appears at terminal 155b, because the coded, and now decoded signal represents the digit 1. This particular code signal 0100 as decoded in this first cycle has been described fully with reference to the decoder unit in the specification above.

Concurrent pulse $e_1$ fires thyratron 73a (FIG. 7) thus extinguishing thyratron 73 and energizing output circuit 74a—79; a positive signal appears at terminal 148a.

With signals present at terminals 148a and 155b the magnetization of the core below the one at the upper left hand corner of register 151 is reversed, representing a stored signal.

Before the appearance of the next clock pulse $a$, another delayed pulse $e_3$ is derived from ring counter 66 via the delay line 69, which pulse $e_3$ resets the decoder. In the instant case the flip-flop 25 is flipped back to its normal state thus deenergizing the output channel of the decoder associated with terminal 155b. The step of storing the first decoded signal is thus completed.

The next clock pulse $a$ starts a new cycle of ring counter 66 to which cycle information pulses $d$ are passed through channels I and III. With thyratron 66d fired again indicating termination of this cycle this delayed pulse pair E and $e_1$ is produced. Pulse E again triggers the decoder thus initiating activation of the channel associated with terminal 155h. Pulse $e_1$ fires thyratron 73b (FIG. 7) causing 73a to extinguish. Now the channel associated with channel 148b becomes energized and the magnetization of the core of register 151 positioned at the cross point of the line connected to terminal 155h and of the column connected to terminal 138b is reversed whereby a second decoded signal, in this case the digit 7, is stored in this register 151.

The continuation of the process is apparent when during one final cycle of ring counter 66 thyratron 66d is fired and the delayed pulse $e_1$ is derived therefrom to trigger thyratron 73u the last possible storage step for register 151 is then initiated. Upon thyratron 73u being fired relay A temporarily interrupts the anode current supply of ring counter 66 and the counter shown in FIG. 7. Now ring counter 66 can only be reactivated when a new starting pulse $c$ is permitted to pass through gate 53.

When thyratron 73u is fired a positive pulse $f_{21,22}$ is produced performing the following functions.

(1) This pulse $f_{21,22}$ resets the track selector unit, and, in this case, sets back flip-flop 57 thus blocking gate 59.

(2) Both flip-flops 51 and 55 are flipped back to their initial states thus rendering negative both input terminals 101 and 204 of the "and" circuit controlling the gate 53 which gate 53, of course, becomes blocked thereby.

(3) Pulse $f_{21,22}$ is also fed back to the computer (line 108, FIG. 4).

The relay A which extinguishes the thyratrons of the various counters also initiates the printing process (FIG. 8C) as outlined in details above. The following actions are also initiated: register 151 is separated from input terminal 155a to 155j and 148a to 148u and this register 151 is then reconnected to the read-out having terminals 23a to 23j and 149a to 149u. Lines and columns of register 152 are connected to input terminals 155a to 155j of the decoder output and 148a to 148u of the storage loading circuit, respectively. Printing is started in stepwise emptying the information stored in register 151 as outlined above. Due to the fact that the register 152 was empty, a pulse $i_{10}$ is produced upon register 152 being connected to the output circuit of the decoder, including the loading device of FIG. 7 as stated. Pulse $i_{10}$ sets back the flip-flop 51 thus preparing one side of the "and" circuit controlling gate 53, terminal 101 now being positive.

During the following period of time nothing further happens and gate 53 remains blocked, but the printer continues to empty register 51. When now another pulse $b$ appears, indicating that another calculation has been terminated, flip-flop 55 flips back rendering junction 204 also positive and gate 53 is open again.

Simultaneously appearing track selector pulse $t_2$ trigger flip-flop 61 thus opening gate 63 for further pulses $d$. The following track starting pulse $c$ may pass through the open gate 53 and fires thyratron 66a of ring counter 66 simultaneously with the appearance with the next clock pulse $a$. Thus ring counter 66 is started again.

Any information pulse $d$ may now pass also through the gate group 71 associated to ring counter 66 and this pulse then is passed into any of the channels I to IV of the output circuit of the ring counter 66 to start the decoding process. The decoding and storing of signals to register 152 proceeds similar to the decoding and storing process when register 151 was connected to the decoder output.

Upon completion of the storage of the decoded signal of track II into the register 152, again a pulse $f_{21,22}$ is developed as outlined above. This pulse $f_{21,22}$ closes gate 53 to be blocked again, and resets the track selector unit. Also, the counters are interrupted by relay A which also prepared the linkage unit (FIG. 8c) for the production of pulse $i_{10}$ which is produced upon completion of printing the information out of register 151. After completion of printing the connections of register 151 and 152 are again reversed. Pulse $i_{10}$ has again flipped back the flip-flop 51, thus rendering terminal 101 positive, blocking diode 52. The next pulse $b$ reopens gate 53; the next track selector pulse $t$, here again $t_1$, opens gate 59, and the next track starting pulse $c$ initiates decoding and the second storing of register 151 during which time the printer empties register 152.

The following embodiments of the transfer system according to the invention illustrated in FIGURES 10 to 10Q permit a more rapid transfer of commands and information from a high speed computing machine to a work-performing machine. Due to the faster transfer, and a faster response of the further embodiments of the transfer system according to my invention to the momentary requirements of the work-performing machine, a still faster synchronization of the functions of both machines can be achieved.

FIGURE 10 illustrates schematically the basic units and main interconnections betwen these units in the now following embodiments of the transfer system according to my invention.

Again, the main units are a command control unit, a decoding unit, and a storage unit. However, the arrangement and types of electrical elements in each unit and the manner of connecting the different units with each other, with the computing machine and with the work performing machine is more effective while being at the same time simpler and cheaper. For instance, the storage unit need only comprise a single register, while achieving the same or an even higher transfer speed than with the first described embodiment in which the storage unit comprises two storage registers (FIGURES 9, 9A).

Another important, advantageous feature of the embodiments of the transfer system described hereinafter is the provision of means for inserting an interpunctuation symbol in the form of a comma or, in Anglo-Saxon countries a point separating digits representing integers from digits representing decimal fractions. This symbol shall be referred to hereinafter as a "comma" which is the equivalent of a decimal point. It is particularly advantageous that the "comma" insertion is adjustable so that it is possible to determine before hand the number of digits representing decimal fractions, i.e. to the right of the "comma" in a printed information.

An adjustable "comma" insertion is not only useful in the case of printing information in a printing machine, but may also be useful in other work-performing machines, for instance in cutting fine grooves into small shafts, where the shaft is to be displaced, upon receipt of the "comma" signal, so that a new group of grooves is cut at another zone of the shaft.

As another example in a petroleum refining installation, temperature and pH may be measured at intervals, and the information transmitted to a work-performing device controlling the fractionated distillation. The "comma" instertion can be used in this instance for separating during each measurement the pH values from the temperature values.

The various advantages of the embodiments of the transfer system described hereinafter will become more obvious from the description thereof, and principally from the description of the embodiment illustrated in FIGURES 11 to 14.

The figures contain a number of block symbols which represent electrical arrangements shown in detail in FIGURES 10A to 10Q.

FIGURE 10A shows the symbol, used in this application, and the actual, conventional wiring diagram for the phase inverting and voltage amplifying anode amplifier.

FIGURE 10B shows the symbol, used in this application, as well as the actual, conventional wiring diagram of a load amplifying cathode follower.

Figure 10D:
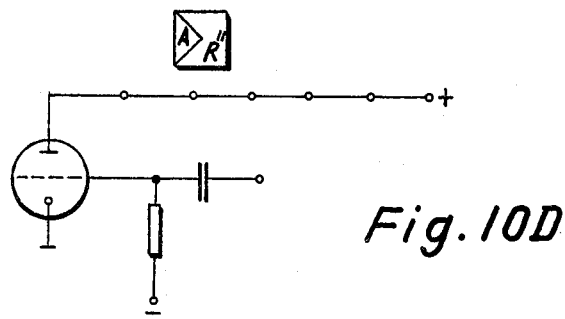
Figure 10F:
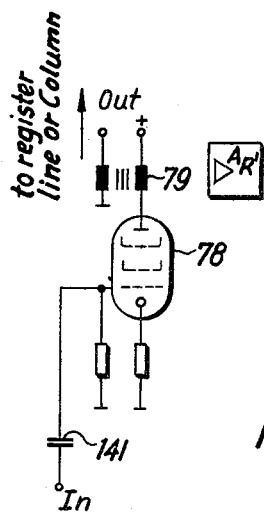

FIGURE 10C, FIGURE 10D, and FIGURE 10F illustrate three somewhat different wiring diagrams and the corresponding symbols used in this application, of conventional voltage amplifiers (FIGURE 10C) and load amplifiers (FIGURES 10D, 10F) for direct insertion of pulses into the lines or columns of storage registers. The amplifiers illustrated in FIGURES 10D and 10F, are particularly suited for the insertion of pulses into magnetic core registers.

Figure 10G:
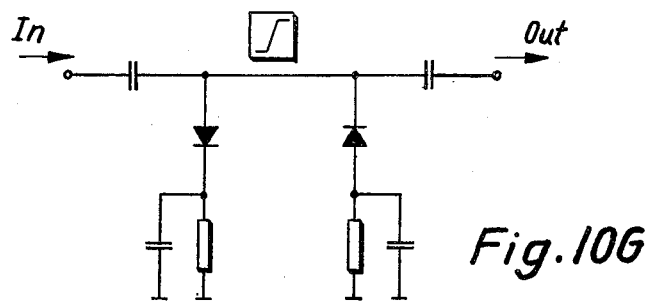

FIGURE 10G shows the symbol, and the corresponding conventional wiring diagram of a voltage limiter.

Figure 10H:
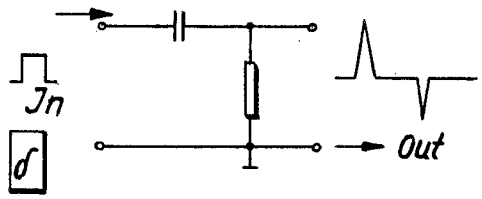
Figure 10H:
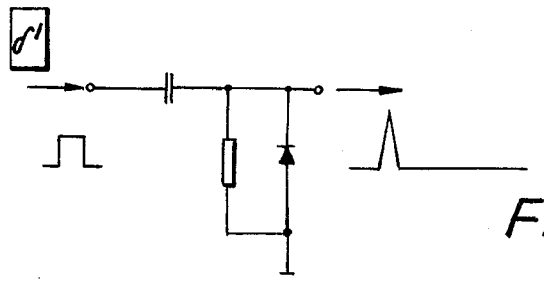

FIGURES 10H and 10H' show symbols and conventional wiring diagrams of two types or differentiators.

Figure 10J:
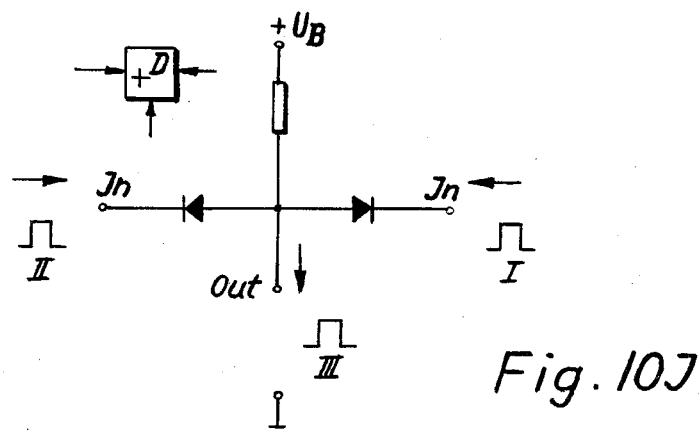

FIGURE 10J shows the symbol, used in this application, and a conventional diagram of a diode "and" circuit, in which a pulse III only appears at the output terminal if pulses I and II appear simultaneously at the two input terminals. "And" circuits of this type are described, for instance, in HSCD, page 41.

Figure 10K:
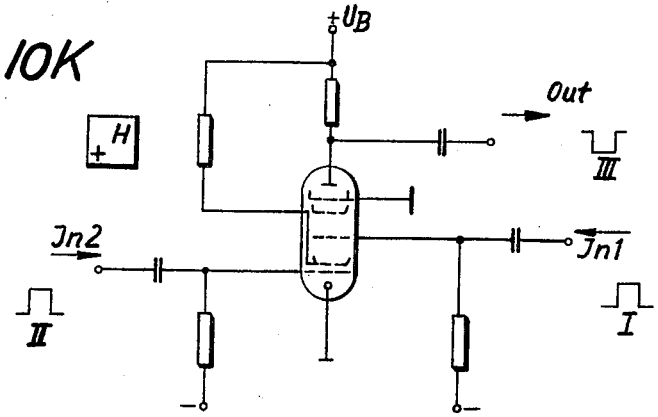

FIGURE 10K illustrates the symbol used herein and a conventional diagram of a heptode "and" circuit differing from the "and" circuit shown in FIGURE 10J in that the output pulse is phase inverted.

Figure 10L:
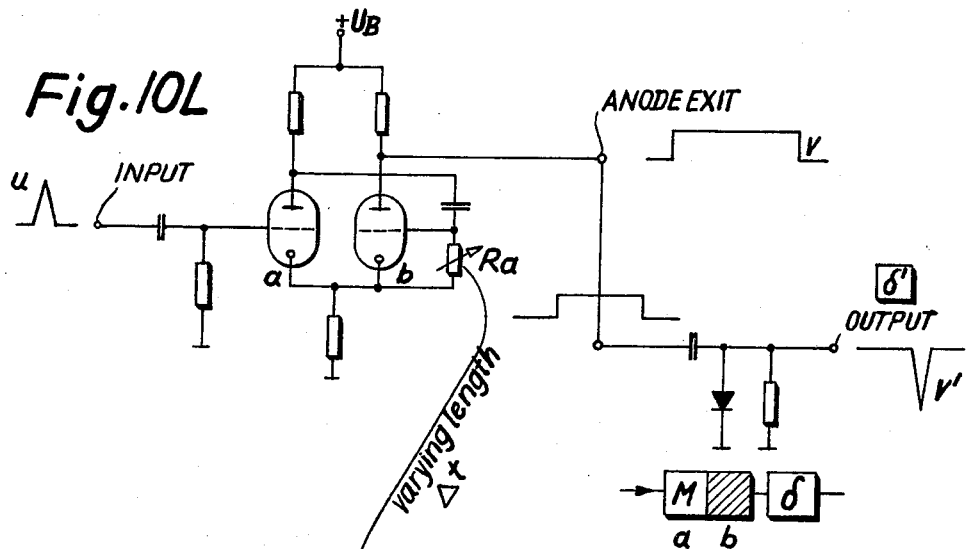
Figure 10L:
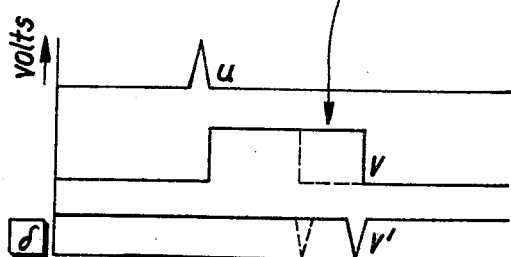

FIGURE 10L illustrates the symbol and a conventional diagram of a monostable flip-flip, and FIGURE 10L' illustrates graphically the voltage curves of the pulses at the input terminal (pulse $u$) to anode exit (pulse $v$) and the output terminal (pulse $v'$) at the output of a subsequently connected differentiator; the hatched side of the flip-flop, in this case flip-flop side "$b$" is current conductive for instance, when the flip-flop is in its monostable initial position, i.e. if no pulse $u$ is applied thereto. By adjusting rheostat $R_a$, the length of time of pulse $a$ can be varied.

Figure 10M:
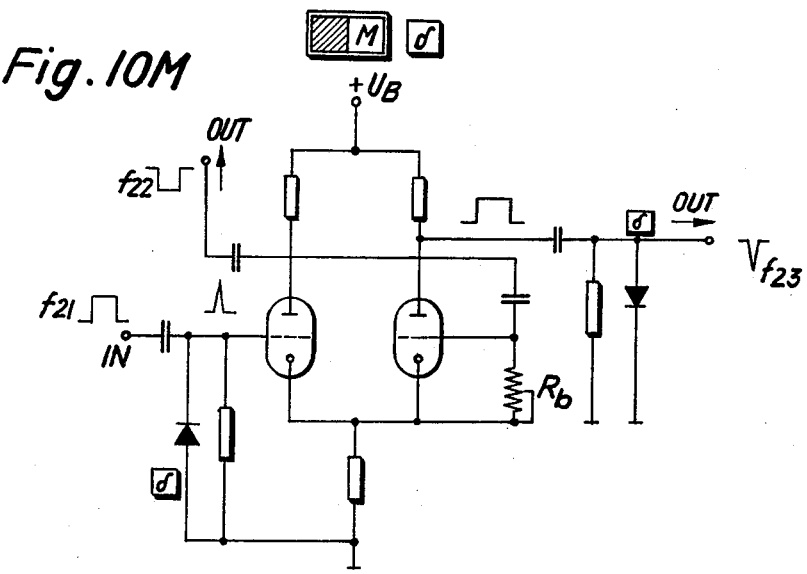

FIGURE 10M illustrates a monostable flip-flop with differentiator, in which a positive rectangular pulse $f_{21}$ is converted into one negative rectangular pulse $f_{22}$, and another negative differentiated pulse $f_{23}$. The length of pulse $f_{22}$ and the rise time of pulse $f_{23}$ against the rising slope of pulse $f_{21}$ are adjusted by means of a variable resistor $R_b$.

Figure 10N:
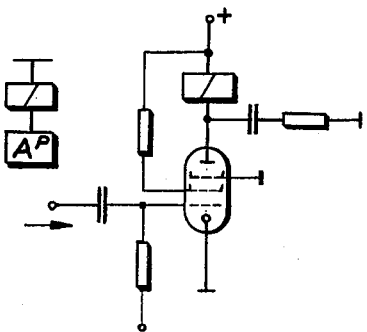

FIGURE 10N illustrates the symbol used in this application and a conventional wiring diagram of a power amplifier used in connection with the operating members of the work-performing machine to be connected to the transfer system according to my invention.

Figure 10P:
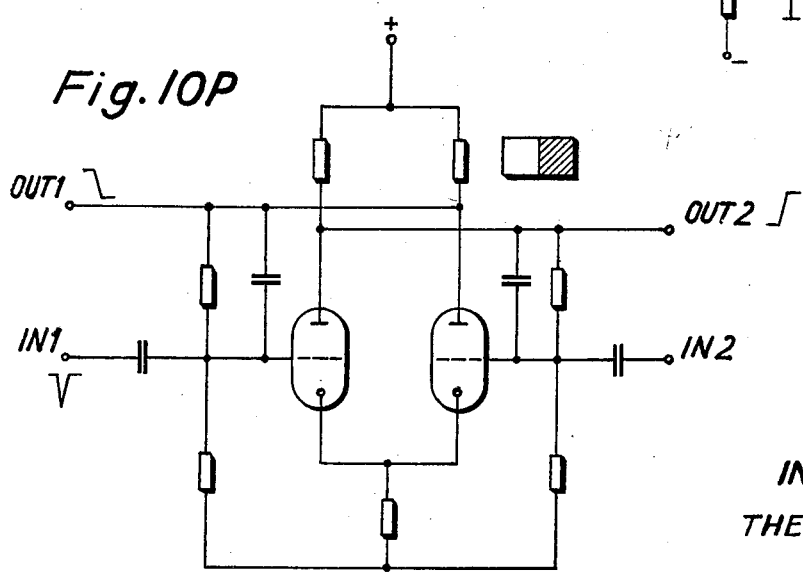
Figure 10:
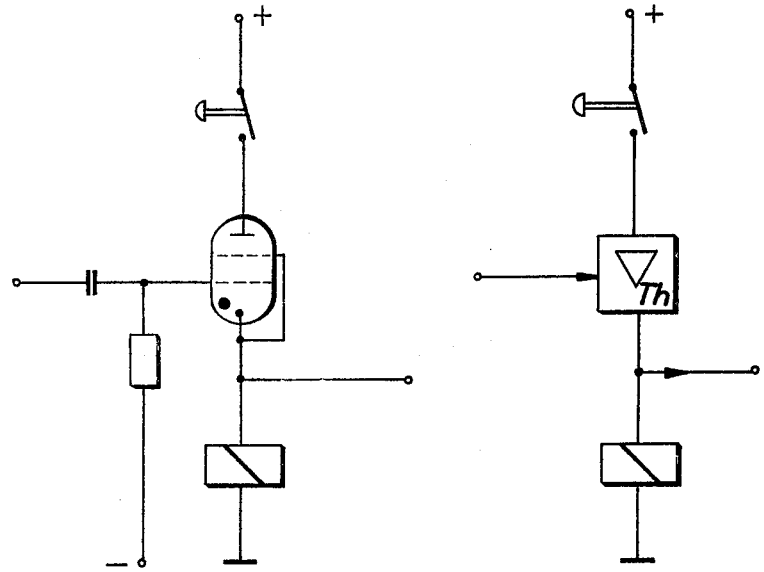

FIGURE 10P illustrates a conventional bistable flip-flop having two input and two output terminals.

FIGURE 10Q illustrates a power amplifier suitable for use with thyratron storage registers and a tool actuating magnet such as used in the storage unit illustrated in FIGURE 22 to be described hereinafter, and the symbol used for this arrangement.

The entire transfer system as illustrated in FIGURES 11 to 14 is subdivided, for easier assembly and eventual exchange of groups of electronic elements into a number of group bearing chassis. The terminals of each chassis from which connecting lines lead to the terminals of other chassis are characterized by four digit numbers, of which the two first digits indicate the number of the chassis, while the third and fourth digit indicate the number of the terminals on that chassis.

This embodiment of the transfer system must be connected to the computing machine through terminals 0801, 2204, 2208, 2219, and 2222.

Through output terminal 0801 the control unit of the transfer system transfers from a linking unit of the work-performing machine to the computing machine a negative pulse $i_{10}$ which informs the computing machine that the storage register of the transfer system is free. Through input terminal 2204 the control unit continuously receives from the computing machine negative clock pulses $a$. Through input terminal 2208 the control unit of the transfer system receives from the computing machine a negative pulse $b$ stating that the computing machine has terminated a calculation which is now available in coded form and can now be exploited by a work-performing machine, for instance it can be printed by a printing machine. Through input terminal 2219 the control unit receives from the computing machine a negative track starting pulse $c$ which indicates the location of the beginning of the available information on the recording means of the computing machine. Through input terminal 2222 the available information can be received in the control unit from the computing machine in the form of negative word pulses $d$.

On the other hand the control unit of the transfer system must be connected to an electronic linking unit which is usually provided in the work-performing machine and will be described further below. This connection takes place through terminals 0804, 0808, and 0823. Through input terminal 0804 the control unit of the transfer system receives from the aforesaid linking unit the aforementioned negative pulse $i_{10}$. Through input terminal 0823 the control unit receives from the same linking unit negative pulses $i_1$ which provide for an exact synchronization of the performance of work by the work-performing machine, for instance the printing of a text line by a printing machine with a mechanical read-out device cooperating with the storage unit of the transfer system and also described further below.

0808 is an output terminal through which a positive pulse $f_{24}$ is delivered from the control unit of the transfer system to the linking unit which pulse states that storage is completed and initiates the performance of work by the work-performing machine.

The major portion of the control unit according to the invention can preferably be mounted on two exchangeable blocks 0800 and 2300 which blocks can be replaced by slightly different blocks in order to adapt the transfer system according to the invention to a work-performing machine having a continuous work cycle instead of a discontinuous one. This exchange will be described in detail further below.

The control unit which is shown in FIGURES 11 and 12 comprises a line from input terminal 2219 for introducing the track starting pulse $c$ as a negative pulse via differentiator 300 from which the differentiated positive pulse $c'$ is conducted to heptode "and" circuit 301.

From "and" circuit 301 a line leads via terminal 2203 (FIGURE 12) and 2218 (FIGURE 14) to the register column loading device.

From input terminal 2208 in FIGURE 11 negative pulse $b$ stating that the computer has terminated a calculation which can be exploited for the performance of work is introduced into a bistable flip-flop 302 which flip-flop is connected to terminal 2312 (FIGURE 12).

The output side of flip-flop 302 is connected to diode "and" circuit 303. The other input side of diode "and" circuit 303 is connected to one side of bistable flip-flop 304. The other side of flip-flop 304 receives pulse $i_{10}$ from the linking unit via terminal 0804 and a diode 305.

Furthermore, from a source of negative potential 0101 a resetting pulse can be generated by actuating, for instance by hand, resetting key 306 whereby a negative resetting pulse $o$ is sent through differentiator 307 and via branch point 308, on the one hand, via diode 309 to one input side of flip-flop 302 and, on the other hand, via diode 310 to an input side of flip-flop 304.

Through terminal 2222 (FIG. 12) information pulses $d$ coming from the computer, are introduced into the control unit and conducted via a limiter 311, an anode amplifier 312 in parallel to diode "and" circuits 313 and 314.

Furthermore, through terminal 2204, clock pulses $a$ are simultaneously fed from the computer into the control unit and are conducted via limiter 315, anode amplifier 316 and differentiator 316a to one side of bistable flip-flop 317. The other side of flip-flop 317 receives the above-mentioned differentiated track starting pulse $c_1$ via terminal 2203 (FIGURES 11 and 12). The output terminal of the latter side of flip-flop 317 is connected to one input terminal of "and" circuit 314 while the output terminal of the other side of flip-flop 317 is connected to "and" circuit 313.

The output terminal of "and" circuit 314 is connected via terminal 1102 (FIG. 14) and a pair of amplifiers, consisting of anode amplifier 318 and register column loading amplifier 319 of the type illustrated in FIGURE 10F to the magnetic core 500y of storage register 500, which core is destined for the storage of a "minus" sign.

The output side of diode "and" circuit 313 is connected via cathode follower 320 to the four heptode "and" circuits 321, 322, 323, and 324 arranged in parallel to form part of the decoder loading device. The other input terminals of these "and" circuits 321 to 324 receive pulses from the output terminals 3251, 3252, 3253, and 3254 of the stages 325a, 325b, 325c, and 325d of ring counter 325.

A detailed conventional wiring diagram of ring counter 325 is shown in FIGURE 12A. This ring counter receives clock pulses $a_3$ from the anode amplifier 316 (FIG. 12) via cathode follower 326 and input terminal 0102, reset pulses $f_{23}$ via terminal 2319 from monostable flip-flop 330 which flip-flop receives trigger pulses $f_{21}$ via terminal 2313 and emits pulses $f_{22}$ via terminal 2312 which pulses are introduced into flip-flop 302 (FIG. 11) and, via terminal 0803, flip-flop 304.

Furthermore, the ring counter 325 (FIG. 12) is started by means of a pulse $c_1$ applied from terminal 0103 via differentiator 331. The last stage 325d of the ring counter 325 emits after each cycle a positive pulse $e$ via terminal 3254. This pulse $e$ is reintroduced into the first stage 325a of ring counter 325 and starts a new cycle, while another branch of pulse $e$ is applied via terminal 2303 to the input sides of two monostable flip-flops 332 and 333. The output terminal of flip-flop 332 is connected via terminal 2304 to the loading flip-flops 401, 402, 403, and 404 of the decoder 400 shown in FIGURE 13 which will be explained further below, conducting reset pulse $e_3$ thereinto. The output terminal of flip-flop 333 is connected, on the one hand, via terminal 2310 and anode amplifier 334 (FIG. 13) to the output heptode "and" circuits 410 to 419 of decoder 400, introducing a positive opening pulse $e_2$ thereinto.

On the other hand, pulse $e_1$ is applied to the register column loading device of the storage unit via terminal 2311 shown in FIGURE 14.

In block 2300 (FIG. 12) monostable flip-flop 330 further receives trigger pulses $f_{21}$ from the register column loading device via input terminal 2313, and emits a pulse $f_{24}$ which is led via terminal 2301, terminal 0821 (FIG. 11), cathode follower 335, and terminal 0808 to the linking unit of the work-performing machine (see FIG. 17).

From the output of flip-flop 330 a branched pulse $f_{23'}$ is connected to the register column loading device via anode amplifier 590 and terminal 2320.

The decoder 400 illustrated in FIGURE 13 receives coded information pulses from "and" circuits 321 to 324 (FIG. 12) via terminals 2525, 2521, 2513, and 2508 which pulses are introduced into the afore-mentioned flip-flops 401, 402, 403, and 404. The diode "and" circuits 420 to 441 are energized from flip-flops 401, 402, 403, and 404, respectively, via anode amplifiers 442 to 449.

The decoded information is transmitted from "and" circuits 410 to 419 via terminals 2901, 2903, 2905, 2907, 2910, 2912, 2919, 2921, 2923, and 2925 and from there via register line loading amplifiers 450 to 459 (FIG. 14) to the line loops $500_0$ to $500_9$ of a magnetic core matrix register 500. The amplifiers 450 to 459 correspond to the type illustrated in FIGURE 10F.

The register column loading device which is a part of the storage unit illustrated in FIGURE 14 comprises a counter S consisting of stages $S_1$ to $S_{21}$. The wiring diagram of stages $S_1$, $S_2$, and $S_{21}$ of this ring counter S is illustrated in FIGURE 14A.

From terminal 2218 the track starting pulse $c_1$ is introduced into the preparing stage $S_1$. From terminal 2311 switching pulses $e_1$ are introduced, via differentiator 460 into all current stages $S_1$ to $S_{21}$. From terminal 2320 reset pulse $f_{23'}$ is also introduced into all stages of counter S. The output terminals of stages $S_2$ to $S_{21}$ which are numbered 1007, 1011, 1013, 1018, 1022, 1024, 1204, 1207 1211, 1213, 1218, 1222, 1224, 1404, 1407, 1411, 1413, 1418, 1422, and 1424, respectively, are each connected with a series connection pair of amplifiers 470 to 489. Each pair consists of an anode amplifier and a subsequently connected register column loading amplifier of the type illustrated in FIGURE 10F. To the latter amplifiers there are connected the register columns 500a to 500t.

From the output side of the last stage $S_{21}$ of counter S, positive pulse $f_{21}$, stating that storage is completed in register 500, is emitted via terminals 2313 to flip-flop 330 (FIGURE 12).

While the read-in part of matrix register 500 is illustrated in FIGURE 14, the read-out part is shown in FIGURES 15 and 16.

This read-out part of matrix register 500 comprises column loops 501a to 501t and diagonal loops 502a to 502t, which column and diagonal loops lead through the same magnetic cores as column loops 500a to 500t and line loops $500_0$ to $500_9$. Diagonal loops 502u to $502z^1$ have common terminals with diagonal loops 502k to 502t.

The diagonal loops 502a to 502y are connected to terminals 503a to 503t.

Column loops 501b to 501t are connected at their one end to terminals 539a to 539s and via diodes 503b to 503t to ground. The opposite ends of register read-out columns 501a to 501t are connected via the respective input terminals to monostable flip-flops 510a to 510u. Flip-flop 510u being connected to a special read-out column 501u for the "minus" sign.

The output terminals of the aforesaid monostable flip-flops 510a to 510u are connected to power amplifiers 520a to 520u and electromagnets 521a to 521u. Details of the arrangement of a power amplifier and electromagnet are shown in FIGURE 10N.

Each electro-magnet is adapted for actuating an operating member of the work-performing machine, for instance a hammer in a printing machine, which operating member, in turn, actuates a tool such as a type carrying rod in a moveable type carrier. A tool carrier such as a printing type carrier is designated in FIGURE 15 by reference numeral 111.

Synchronization of the back and forth linear movement of carrier 111 and the read-out operation from register 500 is effected by the linking unit illustrated in FIGURES 11, 16, and 17. In FIGURE 17 the carrier 111 already indicated schematically in FIGURE 15, is again shown and is provided with a perforated mask 111a which mask is mounted on carrier 111 for movement therewith. Behind the perforated wall of mask 111a there are disposed two lamps 534 and 535 which are stationary in the machine frame (not shown).

The light from lamps 534 and 535 is directed through the openings in mask 111a otward two photoelectric cells 530, 531. The currents generated in these cells are conducted via cathode followers 532 and 533, respectively, to the poles 515 and 516 of a single throw double-pole switch the armature $Q_1$ of which is shifted by relay Q. The pulses from armature $Q_1$ are negative pulses $g_1$ which are conducted to terminal 0823 and from there via the aforesaid amplifier 510 (FIG. 11) of the type illustrated in FIGURE 10F and further through terminal 0824, in the form of positive pulses $g_2$ to a slide contact 536 (FIG. 15) which scans terminals 503a to 503t listed above of diagonal loops 502a to 502t of the read-out system of matrix register 500, shown in FIGURE 15; slide contact 536 being rigidly connected by mechanical means shown in my Patent 2,936,704 to carrier 111 of the work-performing machine so as to move synchronously therewith.

Another branch of pulse $g_1$ is conducted via terminal 0105 (FIG. 17) to another slide contact 537 (FIG. 16) which is also connected by mechanical means shown in my Patent 2,936,704.

Slide contact 537 scans contact terminals 540a to 540s of the "comma" insertion device 540. The latter comprises contact terminals 541a to 541s wired to the aforesaid terminals 540a to 540s and two slide contacts 542 and 543 which are adjustable, for instance by hand, synchronously with each other and independently of the movement of the carrier 111.

Slide contact 542 can be adjusted to a position contacting one of contact terminals 541a to 541s, while slide contact 543 is thereby simultaneously adjusted to make contact with a corresponding contact terminal of terminals 539a to 539s.

Slide contact 542 is electrically connected to slide contact 543 via terminal 0810, anode amplifier 544 (FIG. 11), and terminal 0809.

The linking unit further comprises two switch arms 550 and 551 (FIGURE 17). These arms are operated by noses 552 and 553, respectively, when abutting against the opposite end faces of carrier 111.

Contact between an end face of carrier 111 moving towards its one end position opens one of switches 550 or 551 and thereby interrupts current flow from a source of positive potential to the respective one of thyratron amplifiers 554 and 555. These thyratrons are controlled by positive pulse $f_{24}$ from the monostable flip-flop 330 (FIGURE 12) via terminal 0808 and diodes 556 and 557 (FIG. 17), respectively. The output of thyratron amplifier 554 controls the clutch 558 which, when engaged, causes a motor (not shown) to move carrier 111 toward the left and into contact with switch nose 552. The output of thyratron amplifier 555 controls clutch 559, which, when engaged, causes the aforesaid motor to move carrier 111 toward the right until its right hand end face engages switch nose 553 and breaks circuit by opening switch 551. The output side of amplifier 555 further controls energization of relay coil $Q_0$. Furthermore, the positive output potential of both thyratron amplifiers 554 and 555 is applied via diodes 560 or 561, respectively, on the one hand to differentiator 562 from where the negative pulse $i_{10}$ (entering from the circuit network shown in FIG. 17) is emitted through terminal 0804 (FIG. 11) and further to the computing machine via terminal 0801 (FIG. 11), and to the control unit of the transfer system via diode 305, as has been described above. On the other hand, the positive output potential from thyratron amplifiers 554 and 555 is applied to anode amplifier 563 and from there firstly through power amplifier 564 to brake magnet 565 which brakes the movement of carrier 111 when the latter approaches one of its end positions; and secondly via differentiator 566 and thyratron amplifier 567 to a solenoid coil $T_0$ effecting the line-by-line advance of the paper in a printing machine, or a corresponding displacement of the work piece or work pieces at right angle of carrier 111 in another type of work-performing machine. The anode potential is supplied to thyratron amplifier 567 from the source of positive potential via switch 568 and is interrupted when this switch opens whenever a nose 569 of armature $T_1$ lifts switch 568 due to being attracted by solenoid coil $T_0$. This breaks pulse simultaneously with the paper line advance schematically indicated by the pawl and ratchet wheel arrangement 570.

The detailed wiring of thyratron amplifiers 554, 555, and 568 provided with an electromagnetic coil and a contact switch is shown in FIGURE 10Q.

OPERATION OF THE EMBODIMENT OF THE COMMAND AND TRANSFER SYSTEM ILLUSTRATED IN FIGURES 11 TO 17

I. PREPARATION OF THE TRANSFER SYSTEM

After turning on the main power switch of the transfer system according to the invention and the power switches of the computing machine and the work-performing machine connected by the transfer system, all flip-flops are set to an initial determined state and the register is cleared from any misinformation stored therein by depression of the clearance key 306 (FIG. 11). Thereby, pulse $o$ sets flip-flops 302 and 304 to their initial operational state. The positive potentials from output sides 304a and 302a open "and" circuit 303 and the positive potential from the latter prepares "and" circuit 301. The first arriving track starting pulse $c$ now passes through "and" circuit 301 and arrives as negative pulse $c_1$ (1) at the stage 325a of ring counter 325 switching on the ring counter (FIG. 12), (2) sets flip-flop 317 (FIG. 12) and (3) arrives at stage $S_1$ of counter S via terminal 2218, thereby switching on the preparing stage $S_1$ of the counter (FIG. 14).

Clock pulses which continuously arrive from the computer are applied via terminal 2204 (FIG. 12) in parallel to the four stages of ring counter 325, and each clock pulse switches the ring counter 325 to the next following stage. From the last stage pulse $e$ emitted after every fourth clock pulse, firstly prepares the first stage 325a for continued counting and secondly sets flip-flops 332 and 333. Information pulses are not yet available during this first step of operation of the transfer system. From flip-flop 333 a slightly delayed pulse $e_1$ is applied, firstly, via terminal 2311 in parallel to all stages of counter S (FIG. 14), each pulse $e_1$ switching counter S to the next following stage. Secondly, pulse $e_1$ applied via terminal 2310 simultaneously in parallel to the output "and" circuits 410 to 419 of decoder 400 (FIG. 13).

From flip-flop 332 a pulse $e_3$ is emitted, which pulse is somewhat more delayed relative to pulse $e$ than delayed pulse $e_1$ due to a corresponding adjustment of rheostat variable resistor $R_a$ of the flip-flop 332 (see FIGURE 10L). Pulse $e_3$ resets flip-flops 401 to 404 (FIG. 13) of the decoder loading device 400 to the stage in which the sides 401a to 404a of these flip-flops are opened, so that the sides 401a to 404a can deliver positive potential.

After pulse $e_1$ has arrived via terminal 2311 at counter S (FIG. 14) and switched the stages of this counter till the last stage $S_{21}$ is reached, a positive pulse $f_{21}$ is emitted from the output side of this last stage $S_{21}$ via terminal 2313 to flip-flop 330 (FIG. 12). Side 330b of this flip-flop 330 immediately emits a negative pulse $f_{22}$ via terminal 2312 to sides 302b and 304b of flip-flops 302 and 304 (FIG. 11) respectively, and resets these flip-flops to block sides 302a and 304a and consequently "and" circuits 303 and 301. A subsequently arriving track starting pulse $c$ is now prevented from passing through "and" circuit 301. From side 330a of flip-flop 330 a first delayed pulse $f_{23}$ resets the four stages of counter 325. A branch pulse $f_{23}$, resets the stages of counter S (FIG. 14). Delayed pulse $f_{24}$ also emitted from flip-flop side 330a passes through terminals 2301, 0821, and 0808 (FIG. 11) to th linking unit (FIGURE 17) and is applied to the control grids of thyratron amplifiers 554 and 555, igniting the thyratrons 555 due to the fact that switch 551 is closed. At the same time thyratron amplifier 555 energizes clutch coil 559, the corresponding clutch is engaged and the carrier motor (not shown) moves carrier 111 to the right, since the positive potential from amplifier 555 is at the same time, inverted by amplifier 563 and the resulting negative potential blocks power amplifier 564, so that the brake magnet 565 is deenergized and releases the brake. Simultaneously, relay coil $Q_0$ is energized and switches armature $Q_1$ to make contact with pole 516 so that a pulse sequence is emitted from photoelectric cell 531 as the windows of mask 111a pass lamp 535. The resulting sequence of pulses $g_1$ is emitted, on the one hand through terminals 0823 and 0824 to slide contact 536 (FIG. 15). This slide contact moves to the right due to its mechanical connection to carrier 111 and in unison with the latter, contacting successively contact terminals 503a to 503t and introducing each time a pulse $g_1$ from photoelectric cell 531 into the corresponding diagonal line of register 500.

These pulses cause any irregular information still stired in register 500 to be read out through columns 539a to 539s via the monostable flip-flops 510a to 510t and the power amplifiers 520a to 520u to the operating members 521a to 521u.

When carrier 111 arrives at the right hand end position in FIGURE 17, contact 536 has scanned the entire register and emptied the same.

When carrier 111 arrives at the right hand end position, it opens switch 551 and interrupts current flow to thyratron 555, whereby the clutch 559 is disengaged, brake 565 is engaged, carrier 111 is brought to a standstill and relay $Q_0$ is deenergized, whereby armature $Q_1$ returns to its rest position in contact with pole 515.

As carrier 111 left its left hand end position, switch 550 had closed automatically, applying positive potential to thyratron amplifier 554, for the time being without any further consequences.

Furthermore, the voltage drop due to the cut off of amplifier 555 causes a negative pulse $i_{10}$ to be applied to sides 302a and the negative side 304a of flip-flop 304 (FIGURE 11), thereby preparing "and" circuit 303, whereby the transfer sysem is ready to receive information upon subsequent arrival of a pulse b from the computing machine. At the same time, pulse $i_{10}$ transmits via terminal 0801 to the computing machine the message that the entire transfer system is ready for receiving information.

II. TRANSFER OF INFORMATION

The transfer system is now ready to transfer information. As soon as a pulse b stating that a calculation has been terminated and the corresponding information is available, arrives from the computing machine via terminal 2208 (FIGURE 11) at flip-flop 302, flip-flop 302 is reversed and the pulse from side 302a thereof opens "and" circuit 303, and consequently "and" circuit 301 is prepared as described above. Now, a first track starting pulse following after pulse b which pulse c indicates the beginning of information passes "and" circuit 301 as pulse $c_1$ and triggers the first stage 325a of ring counter 325 (FIGURE 12).

At the same time information pulses enter via terminal 2222. A first information pulse d can arrive at "and" circuits 313 and 314 simultaneously with the first clock pulse a. Pulse $c_1$ has set flip-flop 317 to prepare "and" circuit 314 so that an eventually arriving first information pulse d can pass "and" circuit 314 and be transferred via terminal 1102 to magnet core 500y (FIGURE 14) of register 500 and be stored therein as a "minus" sign.

Irrespective of whether an information pulse arrives concurrently with the first clock pulse after track starting pulse c, the rising slope of this first clock pulse a resets flip-flop 317 so that the next following information pulse cannot pass through "and" circuit 314 to register core 500y but is caused to pass through "and" circuit 313 to the parallel "and" circuits 321 to 324 which together with ring counter 325 act as a series parallel converter for the remaining three pulses of the first four pulses arriving after track starting pulse c the coded information which can be contained in these three pulses may represent interpunctuation marks, mathematical signs and the like.

The next following complete group of four information pulses will then represent the first coded number.

Consequently, the first decoded information obtained from the first three pulse coded group is stored via stage $S_2$ of counter S (FIGURE 14) in column 500a and represents the aforesaid interpunctution or other symbols. The subsequently following decoded information, also decoded in decoder 400 (FIGURE 13), is stored in the further stages $S_3$ to $S_{21}$ of register 500 and represent numbers. Compared with the decoder illustrated in FIGURE 6, decoder 400 is adapted for decoding coded groups of three pulses by providing therein the above-mentioned "and" circuits 424 and 441 and diodes 432a, 424a, 440a, and 441a.

Information is now loaded into register 500, ring counter S being switched to a next following stage with every decoded information obtained from a four pulse coded group via decoder 400 under the effect of pulse $e_1$.

After the entire information has been stored in register 500, pulse $f_{21}$ is emitted from the last stage via terminal 2313, resets the control unit in the manner described above and starts the motion of carrier 111 as has also been described, however, in the direction from its right hand end position attained during the preparation stage, toward the left in FIGURE 17.

During the read-out operation, a slide contact 536 (FIG. 15) makes mechanical contact successively with contact terminals 503a to 503t. This mechanical contact is not sufficiently exact in time to guarantee a sharply spaced work performance, for instance an exactly spaced printing of a sequence of symbols.

Therefore, a read-out pulse $g_1$ is only caused to flow through slide contact 536 and diagonal loops 502a to 502t a short instance after a mechanical contact has been made and in such a manner that the time intervals between successive read-out pulses $g_1$ are exactly constant. This pulse is generated each time a photoelectric cell, in the present instance photoelectric cell 530 (FIGURE 17), receives light from one of the lamps, lamp 534 during movement of the carrier 111 toward the left, as in the present case.

Since the mechanical operating members 521a to 521u (FIGURE 15) require a little time before effecting the actual operation, for instance of printing a symbol, pulse $g_1$ must pass through diagonals 502a to 502t correspondingly earlier to effect exact work performance. This is achieved by disposing the photoelectric cells 530 and 531 (FIGURE 17) slightly displaced toward the left and the right relative to the exact positioning of the printing symbols or the like tools on the carrier 111.

Furthermore, the pulses read out from the register would be too short to satisfactorily bring about the performance of work by the operating members 521a to 521u. Therefore, these read-out pulses are lengthened and amplified in monostable flip-flops 510a to 510t and amplifiers 520a to 520u.

"Commas" can be inserted by providing a special "comma" insertion device 540 (FIGURE 16).

Slide contacts 542 and 543 are previously set, for instance by hand, to a selected pair of contact terminals, for instance at 541m and 539b, respectively. Slide contact 537 moves toward the left synchronously with carrier 111 and makes contact with contact terminals 540s, 540r, 540q, and so forth, pulse $g_1$ being applied after each contact without any further effects, until slide contact 537 makes contact with contact terminal 540m. The pulse $g_1$ arriving a short instant thereafter passes through contact terminal 540m, slide contact 542, amplifier 544 and slide contact 543 via contact terminal 539b into column 501c (FIGURE 15) and causes a "comma" to be printed or a corresponding other work step to be performed. It is to be noted that the "comma" does not occupy a full position but is placed laterally toward the right side of the number after which it is to be inserted. Correspondingly, a hammer printing the "comma" must be actuated twice during the printing of a full text line, once to print the "comma" and the second time to print the number before, i.e. to the left of the "comma."

When the carrier 111 arrives at the left hand end position after performing an entire linearly arranged set of work steps, such as the printing of a text line, all steps described hereinbefore at the time of arrival of carrier 111 in right hand end position, are repeated in the corresponding electrical elements. In addition, the resulting rising slope of the interrupted negative potential from anode amplifier 563 (FIGURE 17) may be converted to a positive differentiated pulse which may effect the displacement of a work piece or work pieces in a direction at right angle to the direction of movement of carrier 111. This may, for instance, be the line-by-line displacement of the paper in a printing machine. The details of this line-by-line advance have been discussed hereinbefore and are also described in detail in my Patent 2,936,704.

At the end of this linear work operation, by carrier 111, pulse $i_{10}$ announces the readiness of the entire transfer system for further storage and exploitation of new information.

The embodiments of the transfer system according to the invention which have been described hereinbefore in connection with FIGURES 1 to 17, are particularly suited for use with work performing machines in which a work piece and a set of operational members carry out a linear movement relative to each other, so that a carrier member carrying either the work piece or a set of the aforesaid operating members, must carry out a discontinuous linear movement back and forth along a determined path of travel and must stop at two opposite end positions to reverse its movement.

In constrast thereto, an even faster performance of work can be achieved with work performing machines in which the aforesaid carrier member effects a continuous movement in a constant sense and without intermediate stops.

Such work performing machines, when working on the basis of information from high speed computing devices require a still better synchronization of operations of the two machines, the computer on the one hand and the work-performing machine on the other hand. Such better synchronization can be attained particularly successfully with the embodiment of the command and information transfer system according to my invention, which shall be described hereinafter.

The majority of parts of this embodiment are identical of those of the embodiment illustrated in FIGURES 11 to 17. However, certain differences in the arrangement of the new embodiment are illustrated in FIGURES 18 to 21.

Work-performing machines having a carrier for continuous, endless movement are provided with different mechanical and electronic linking units forming a part of these machines, which linking units require certain adaptations in the transfer system according to my invention.

It is a particular advantage of the transfer system arranged as illustrated in FIGURES 11 to 17, that the same can easily be adapted to use with a work-performing machine, the carrier of which effects an endless, continuous motion, by simply exchanging two groups of elements, preferably mounted on boxes 0800 and 2300, four slightly different groups of elements preferably mounted on boxes 0800A and 2300A. The latter two boxes are illustrated in FIGURES 18 and 19, respectively.

The linking unit of a work-performing machine having a carrier of an endless motion is illustrated in FIGURES 20 and 21. This linking unit forms part of the work-performing machine and is, for instance, embodied in the printing apparatus described in my Patent 2,936,704.

The mechanical part of the linking unit of these work-performing machines is very similar to that illustrated in FIGURE 16 in the case of a work-performing machine with discontinuous carrier. The only difference is that a pre- and a post-contact terminal 540x and 540y, respectively, are added to the set of contact terminals 540a to 540s in the "comma" insertion device. If read-out slide contact 537 makes contact with pre-contact 540x positive pulse $g_1$ from photoelectric cell 580 (FIGURE 21) via anode amplifier 581 and terminal 0105 passes via contact terminal 540x and terminal 0807 in box 0800A (FIGURE 18) to heptode "and" circuit 582. This "and" circuit is prepared by positive potential from side 304b of flip-flop 304. The output side of "and" circuit 582 yields negative pulse $i_5$ which is applied to side 583b of flip-flop 583. From the output of side 583b positive potential is applied to the heptode "and" circuit 584 and diode "and" circuit 585 preparing these "and" circuits. Pulses $g_1$ from photoelectric cell 580 can now pass through "and" circuit 584 and are fed, after amplification, in an amplifier 586 of the type illustrated in FIGURE 10F as scanning pulses $g_3$ into the diagonal loops of register 500 via slide contact 536 (FIGURE 20). Pulses $g_1$ pass the "comma" insertion device as pulses $i_6$ and arrive via slide contact 542 and terminal 0810 in "and" circuit 585 and pass through the same and as pulses $i_7$ via terminal 0809 through slide contact 543. The "comma" insertion and read-out are effected in the same manner as described with regard to FIGURES 11 to 17. The output of side 583b of flip-flop 583 (FIGURE 18) is also connected to an "and" circuit 588 and, on the other hand, via differentiator 589 and terminal 0801 to the computing machine emitting pulse $i_{10}$ thereto. The other input of "and" circuit 588 is connected via terminal 0811 to the post-contact terminal 540y (FIGURE 20) of the "comma" insertion device. When slide contact 537 makes contact with terminal 540y pulse $g_1$ from the photoelectric cell 580 passes as positive pulse $i_8$ into "and" circuit 588 (FIGURE 18) and leaves the latter as negative pulse $i_9$ to be introduced on the one hand into side 583a and side 304a, thereby resetting flip-flops 583 and 304 to enable these flip-flops to receive new information.

As illustrated in FIGURE 20A, an independent source of positive potential 595 may also be used instead of the photoelectric cell for generating a pulse which must then be applied via a separate slide contact 596 to contact terminals 540x and 540y to generate pulses $i_4$ and $i_8$, respectively, which pulses indicate the beginning and the end of the exploitation step, for instance the printing of a text line. Furthermore, from terminal 0805 (FIGURE 18) clearance pulse $o$ can be inserted into the aforesaid sides 583a and 304a via diode 310, thereby also preparing these flip-flops for receipt of information whenever clearance key 306 (FIGURE 11) is depressed. This arrangement can only be used with printers requiring no "comma" insertion.

From the output of side 583a of flip-flop 583, and via terminal 0820 and differentiator 566 (FIG. 21), a positive pulse $j$ is applied to the control grid of thyratron amplifier 567 described hereinbefore, whenever flip-flop 583 is reset. This pulse $j$ has the same effects on the arrangement for paper line advances or a similar mechanical operation, as described in connection with the linking unit of the preceding embodiment, as illustrated in FIGURE 17.

After the clearance key 306 has been depressed and flip-flops 302 (FIG. 11) 304, and 583 (FIG. 18) have been set to the appropriate state for starting operation, the register is filled as described in relation to the embodiment illustrated in FIGURES 11 to 17. As described above, pulse $f_{22}$ originating from flip-flop 330 (FIG. 19) resets flip-flops 302 (FIG. 11) and 304 (FIG. 18) and prevents further decoding of information as described above. Furthermore, "and" circuit 582 is prepared and as soon as slide contact 537 (FIG. 20) makes contact with terminal 540x, pulse $g_1$ from the photoelectric cell 580 passes as pulse $i_4$ to "and" circuit 582 (FIG. 18) and onward as pulse $i_5$ and switches flip-flop 583 to its opposite state. The output of side 583b applies the positive potential to "and" circuits 584 and 585 as described and pulse $g_1$ and pass as read-out pulse $g_2$ via slide contact 0824 into the diagonal loops of register 500 and read-out takes place as described with regard to the embodiment of FIGURES 11 to 17.

In the same manner as in the previous embodiment, a "comma" is read out as soon as slide contact 537 reaches contact terminal 540m, in view of the fact that slide contact 542 has previously been set to make contact with terminal 541m. The read-out pulse $g_1$ passes as pulse $i_6$ to the "and" circuit 585 already prepared by the positive potential from flip-flop 583, and onward as pulse $i_7$ through slide contact 543 into register column 501c.

When the entire register is emptied and the information contained thereof has been exploited by the work performing machine, slide contact 537 makes contact with post-contact terminal 540y and pulse $g_1$ arrives as pulse $i_8$ via terminal 0811 at the "and" circuit 588 (FIGURE 18) prepared as described above from flip-flop 583, and passes "and" circuit 588 as negative pulse $i_9$. This pulse now resets flip-flops 583 and 304. A pulse $b$ can now reverse flip-flop 302 and the raised positive potential from side 302a of the latter can pass through "and" circuit 303 and prepare "and" circuit 301.

A new track starting pulse can now pass "and" circuit 301.

Also, when resetting flip-flop 583 (FIG. 18), a pulse $i_{10}$ is generated from flip-flop side 583b and differentiator 589, which pulse $i_{10}$ informs the computing machine that the transfer system is ready for transferring further information. At the same time, from the output of flip-flop side 583a and differentiator 566 (FIG. 21), the above-mentioned pulse $j$ is emitted and effects the above described line-by-line displacement of a work piece or the like.

In a further embodiment of the transfer system according to the invention, the magnetic core matrix register is replaced by a thyratron register of the type described in my copending patent application Serial No. 771,430 (now abandoned).

The use of thyratrons instead of magnetic cores in register 600 the read-out system of which is illustrated in FIGURE 22 requires that amplifiers 450 to 459 (FIG. 14) of the register line loading device and the second amplifiers of the amplifier pair set 470 to 489, as well as amplifier 319 are replaced by anode amplifiers of the type illustrated in FIGURE 10C.

In the read-out system for thyratron register 600, the diagonal read-out wires 602a to 602t end in contact terminals 639a to 639t and are grounded via an electrically conductive contact bar 620 which is grounded via slide contact 621.

Bar 620, which may also be disk-shaped, if terminals 639a to 639t are arranged in a circle, must move in synchronism with carrier 1 or 111. A bar-shape is preferred if the carrier moves discontinuously, i.e. linearly. A disk-shape is preferred if the carrier effects an endless movement.

Furthermore, each of the diagonal wires 602a to 602t is connected via one of diodes 622a to 622t with the output of anode amplifier 586A receiving from the latter positive read-out pulse $g_3$. This pulse cannot pass through the diodes of the set 622 with the exception of diode 622a which happens to be out of contact with ground. Pulse $g_3$ passes through this diode 622a and raises the potential in diagonal wire 602a thereby effecting read-out of stored information in register 600 in the manner described in my copending patent application Serial No. 771,430 (now abandoned).

In all other respects the operation of the entire transfer system is identical with that of the embodiment illustrated in FIGURES 18 to 21.

In another embodiment of the transfer system according to the invention, which is illustrated in FIGURES 23 to 25, the metallic contacting disk or bar 620 becomes superfluous by utilizing counter S not only for the insertion of information into the storage register but also for reading out the stored information. For this purpose, it is necessary to provide a switching relay W (FIGURE 23), the coil $W_0$ of which relay is energized by a positive potential obtained from side 583b of flip-flop 583 illustrated in FIGURE 24, via an amplifier 624. This arrangement of relay coil $W_0$ is shown in FIGURE 23. FIGURE 24, which is a partial view of FIGURE 11, shows box 0800B replacing box 0800 in the latter figure.

Whenever relay coil $W_0$ is energized, it switches armature $W_1$ from contact with pole 625 to contact with pole 626. Contact 625 is connected to the grounded ends of loading columns 500a to 500t via diodes 627a to 627t. Normally, with coil $W_0$ deenergized armature $W_1$ contacts pole 625 and all register loading columns are grounded. Pole 626 is connected via terminal 0106 and diodes 628a to 628z and 628aa to the diagonal loops of the read-out system of register 500. When coil $W_0$ is energized and causes armature $W_1$ to contact pole 626, all diagonal loops of register 500 are grounded and can be used for read-out from the register.

Furthermore, this arrangement is characterized by the fact that both flip-flop 333 (FIGURE 19), controlling output pulses $e_1$ and anode amplifier 590 for amplifying pulses $f_{23'}$, as well as pulses $g_3$ and $i_5$ which control the read-out process and are derived from "and" circuits 584 and 582, respectively, are applied to counter S; this pulse is via terminal 0831. Amplifier 510 (FIGURES 23, 24) must then be replaced by a cathode follower 510a. In order to ensure a satisfactory electrical separation of the voltages controlling read-in and read-out, diodes 591 to 594 are provided in the loops of pulses $c_1$, $i_5$, $e_1$, and $i_2$.

In the same manner, column loops 500a to 500t of the read-in part of register 500 are provided with diodes 627a to 627t, as shown in FIGURE 23 and the diagonal loops of the read-out part are provided with diodes 628a to 628aa, as shown in FIGURE 25, so that all of these loops are electrically separated from each other. Thereby, an undesired mutual disturbance of these lines which are connected to the same amplifiers 471 to 489 is prevented.

This embodiment of the transfer system operates in the following manner. If, for instance, the read-out and exploitation of the information stored in register 500 has just been terminated, slide contact 537 has just reached the last contact terminal 540y (FIGURE 25), so that pulse $g_1$ from the photoelectric cell arrives as pulse $i_8$ at "and" circuit 588 in FIGURE 24.

As mentioned hereinbefore, pulse $i_9$ appears at the output terminal of "and" circuit 588 and states that the exploitation of the stored information is terminated, i.e. for instance that the text line has been printed. Pulse $i_9$ then resets flip-flops 304 and 583. Thereby "and" circuit 584 is blocked and pulse $g_3$ does no longer arrive at counter S. At the same time, "and" circuit 582 is also blocked and pulse $i_5$ can also not arrive at counter S.

By reversing flip-flop 583 to the illustrated starting state, relay coil $W_0$ in FIGURE 24 is deenergized, whereby armature $W_1$ (FIGURE 23) is switched to pole 625 to connect counter S to the read-in part of register 500. Thereafter, the storage of new information takes place as described hereinbefore, since counter S starts operation and loads the register columns.

After storage is terminated, pulse $f_{21}$ is emitted from the output of the last stage $S_{21}$ of counter S. This pulse arrives as pulse $f_{22}$ to flip-flop 304 (FIG. 24) and switches this flip-flop in such a manner that the latter applies a positive potential to "and" circuit 582 and thus preparing the latter.

Pulse $i_4$ can then pass through "and" circuit 582 and switches flip-flop 583. Consequently, flip-flop 583 applies positive potential to "and" circuit 584, and pulses $g_1$ from the photoelectric cell 580 can pass "and" circuit 584 as pulses $g_2$ and amplifier 510a as pulses $g_3$. Furthermore, pulse $i_5$ arrives at the same time at stage $S_1$ of counter S and prepares the counter for operation.

Pulses $g_3$ may now arrive at counter S and switch the counter stage by stage. After flip-flop 583 has been reversed by pulse $i_5$, the positive potential from output side 583b of flip-flop 583 is applied to relay coil $W_0$ via cathode follower 624 and energizes coil $W_0$. Thereby, armature $W_1$ is switched to contact pole 626, connecting the latter pole to ground.

Consequently, the currents from amplifiers 471 to 489 (FIG. 25) now flow through the diagonal loops and diodes 628a to 628aa via point 0106 and armature $W_1$ to ground. The read-out currents sent from amplifiers 471 to 489 through the diagonal loops cause a remagnetization of those magnet cores which contain stored data.

It must be borne in mind that the read-out of data values can only begin when slide contact 537 makes contact with terminal 540y since only then the required pulse $i_4$ is emitted and can initiate the above described occurrences.

The direction of travel of both the continuously moving carrier 111 and the slide contacts moving synchronously therewith is indicated by arrows in FIGURES 20 and 25.

In the last described embodiment illustrated in FIGURES 23 to 25, the direction in which counter S is switched determines the direction in which the carrier 111 and the slide contact moving synchronously therewith, which must be the same as that of counter S.

In all embodiments of the transfer system described hereinbefore, the coded information to be transferred was received from a computing machine, for instance in the form of tetrades in three-excess-code and in series. However, the transfer system according to the invention can be equally connected to a storage device providing coded information in form of parallel tetrades, preferably also in three-excess-code.

An embodiment of a portion of the control unit which is particularly adapted for being connected selectively, at will, either to a computing machine delivering series tetrades, or to a punched tape read-out unit delivering parallel tetrades of coded information.

In order to use the transfer system with a punched tape read-out device, it is necessary that the latter is capable of delivering a pulse similar to the track starting pulse of a computing machine. This pulse $c_1$ must arrive prior to any coded information. If the punched tape read-out device is capable of delivering "minus" signs, a special pulse $d_4$ must be available from the read-out device.

Furthermore, the punched tape read-out device must be provided with means for delivering a pulse $e$ with every tetrade of parallelly delivered coded information pulses $d_I$, $d_{II}$, $d_{III}$, and $d_{IV}$.

If the information is so short that all twenty columns of register 500 would not be filled so that no pulse $f_{21}$ would be emitted and consequently no command for printing would arrive from the register, then the punched tape read-out device must be capable of delivering an independent pulse $f_{21}$ for starting printing or a similar exploitation of the stored information.

In FIGURE 26, the pulse $c_1$ is delivered from the punched tape read-out device via a terminal 0201 and diode 597 to the preparing stage $S_1$ of counter S (FIGURE 14). A further diode 598 prevents pulse $c_1$ from terminal 0201 to effect other occurrences in the transfer system.

Pulse $d_4$ for storing a "minus" sign is introduced into the transfer system via terminal 0202 and diode 599 to a point intermediate amplifiers 318 and 319. Diode 650 of amplifier 318 prevents pulse $d_4$ from causing undesirable occurrences in the transfer system.

From terminal 0203 the transfer system receives from the punched tape read-out device pulses $e$ synchronously with parallel information pulses $d_I$ to $d_{IV}$, which are introduced via terminals 0204 to 0207. Pulse $e$ is introduced into monostable flip-flops 332 and 333 via diode 651, but is prevented by diode 652 from entering the ring counter arrangement 325 which ring counter is inoperative due to the fact that no computing machine is connected to the transfer system.

Diodes 653 to 656 are provided in the input lines from terminals 0204 to 0207 to prevent short circuiting of pulses $d_I$ to $d_{IV}$ through "and" circuits 321 to 324, when the machine is connected to a computing machine and operates as described hereinbefore in connection with FIGURES 18 to 21, but is also connected to the punched read-out device without using receiving information therefrom.

Of course, when the transfer system transfers information from the punched tape read-out device entrances 2204, 2208, 2219, and 2222 must be disconnected. The output line of pulse $i_{10}$ must be connected to the punched tape read-out device.

III. EXAMPLE OF OPERATION

A preferred embodiment of the transfer system according to the invention, which is illustrated in FIGURES 11 and 12 as well as 18 and 19 (control unit), 13 (decoder), 14 (read-in part of storage unit), 21 (linking unit to work-performing machine with continuously moving carrier) and 22 (read-out part of storage unit with thyratron register) shall now be used, for explaining, by way of example, the transfer of a nineteen digit number. The pulse diagram shown in FIGURES 27 and 27A illustrates the read-in operation, and the pulse diagram shown in FIGURE 28 the read-out operation.

The transfer system is connected to a printing device with continuous carrier which is described in my Patent 2,936,704, and which is designed for the printing of a text line containing twenty-one digits, the first to nineteenth digit from the left hand end position being destined for ciphers 0, 1, 2, . . . 9; the twentieth digit on the carrier, counting from the left, is destined for receiving a "minus" sign, if available; the twenty-first digit is destined for receiving one of seven different symbols each of which consists of three coded pulses, being designated hereinafter as "A," "B," "C," "E," "G," "J," and "K." These letters are only used symbolically instead of such interpunctuation marks as a question mark, an exclamation mark, a hyphen, a period, or mathematical symbols such as a plus sign and the like.

In the same space as one of the nineteen cipher digits, a "comma" may be inserted by a corresponding adjustment of the "comma" insertion device which adjustment must have been made prior to storing information in register 500.

The cipher information is received from a computing machine in three-excess-code, i.e. each cipher is represented by a combination of four word pulses $d_I$, $d_{II}$, $d_{III}$, and $d_{IV}$ forming a "tetrade." These pulses are received in series from the computing machine. The same pulses may be received in parallel from a different memory unit, for instance a punched tape read-out device.

It should be mentioned that storage begins with the storage of a functional symbol, because this symbol should be printed as the last digit to the right and arrives as part of the first tetrade of pulses from the computer. The ciphers are then printed from the last, i.e. the unit digit toward the left, i.e. following with the tenth digit, the hundredth digit, the thousandth digit, etc.

The first arriving tetrade is split into a first single pulse and a next following group of three pulses.

If the first pulse of the first tetrade is made available from the computer, then this signifies that the transfer system will transfer a "minus" sign. The "minus" sign will be stored in core 500y and can later be printed as the twentieth digit from the left in the text line.

If, as has been explained hereinbefore, the first pulse of the first tetrade does not arrive, no "minus" sign will be stored which means that the number beginning with the then following first cipher as expressed by the second tetrade, will be a positive number.

The three remaining pulses of the first tetrade permit $(2^3-1)=7$ combinations, 000 being excepted. These combinations may serve for representing functional symbols as explained above. If the three remaining pulses of the first tetrade are received from the computer, the corresponding symbol is stored and later printed as the twentieth digit from the right.

It shall be assumed that a nineteen-digit number is to be printed, the first digit of which shall be "4," the eighteenth digit of which shall be "3," the nineteenth digit shall be "8," with a decimal point, called a "comma" for the sake of brevity and following continental European practice. The number shall be negative, so that "minus" sign will be the twentieth digit, and a symbol "C" representing, for instance a "credit sign" shall occupy the place of the twenty-first digit.

The printed number will therefore look as follows:

4 . . . . . . . . . . . . . . . . . 3, 8 — C

After the main switch (not shown) is turned on, the clearance key 306 is depressed and the transfer system is cleared by the occurrences described hereinbefore (see columns 28 and 29 of this specification).

At the end of the clearing step, pulse $i_8$ is received from the work-performing machine, passes through "and" circuit 588 (FIGURES 11 and 18) as pulse $i_9$, and switches flip-flop circuits 583, 303 and 304 in such a manner that information from the computer can now be received. In this state, the raised positive potential at side 304a of flip-flop circuit 304 has prepared "and" circuit 303, i.e. one side only of the latter circuit is energized.

Upon arrival of the command pulse $b$ from the computing machine that "calculation is complete and the result can be stored and exploited," flip-flop 302 is shifted and the increased potential at side 302a thereof makes "and" circuit 303 conductive, whereby heptode "and" circuit 301 is prepared.

It shall be assumed that the first tetrade arriving from the computing machine be "1101". The first word pulse $d$ which corresponds to the first "1" of the tetrade and represents the "minus" sign, is applied to limiter 311 (FIGURE 12) and as $d'$ to anode amplifier 312 and further on as pulse $d_2$ to the two diode "and" circuits 313 and 314. Flip-flop circuit 317 is still in the shown starting position, so that "and" circuit 313 is conductive and 314 non-conductive. Pulse $d_1$ thus arrives via "and" circuit 313 and cathode follower 320 to heptode "and" circuits 321 to 324, but cannot effect any switching operations as long as ring counter 325 has not prepared these heptode "and" circuits 321 to 324. Track starting pulse $c$ arrives with a brief delay compared with clock pulse $a$ at the control unit, as will be seen by comparing the corresponding pulse lines in FIGURE 27(a). Since only its right hand (later) positive slope is of interest, this pulse $c$ is first differentiated in differentiator 300 (FIGURE 11). The positive pulse $c'$ makes the already prepared heptode "and" circuit 301 conductive and negative pulse $c_1$ from the latter initiates the following occurrences.

(1) Flip-flop circuit 317 (FIGURE 12) is shifted, thereby closing diode "and" circuit 313 and making diode "and" circuit 314 conductive. Pulse $d_1$ now arrives as $d_3$ at anode amplifiers 318 and 319 (FIGURE 14) and is ultimately stored as pulse $d_5$ in register thyratron 500y (FIGURE 14) as the "minus" sign.

(2) Stage 325a of ring counter 325 (FIGURE 12) is switched on and prepares heptode "and" circuit 321. However, the latter is not yet made conductive, since pulse $d_2$ has been switched off simultaneously by diode "and" circuit 313 being closed (see (1) above).

(3) Stage $S_1$ of counter S (FIGURE 14) is switched on and prepares the counter for step-wise operation.

Storage of the remaining pulses of the above mentioned first tetrade, i.e. "101" is effected as follows:

Clock pulse $a$ is limited in limiter 315 (FIGURE 12), amplified in anode amplifier 316 and then differentiated in differentiator 316a. The resulting negative pulse $a_3$ resets flip-flop 317, so that "and" circuit 314 is closed and "and" circuit 313 is prepared. The positive pulse from differentiator 316a is amplified in anode amplifier 326 and switches as negative pulse $a_3$ ring counter 325 to the next following stage 325b, so that heptode "and" circuit 322 is prepared. At the same time, the second word pulse of the first tetrade arrives as $d_2$ at heptode "and" circuits 321 to 324 since "and" circuit 313 has become conductive. Pulse $d_2$ passes "and" circuit 322 as pulse II and switches flip-flop circuit 402 (FIGURE 13). The next following clock pulse $a$ switches ring counter 325 to stage 325c, so that heptode "and" circuit 323 is prepared. However, no word pulse arrives in our example of tetrade "1101", so that no further switching is initiated. The fourth clock pulse switches ring counter 325 to stage 325d, whereby the following occurrences take place:

(1) Heptode "and" circuit 324 is prepared, and the simultaneously arriving word pulse $d_2$ passes the same as pulse IV. This pulse switches flip-flop 404 (FIGURE 13). By the operations described hereinbefore, the series sequence of the word pulses of a tetrade is converted to a parallel occurrence in the spaced distribution of flip-flop circuits 401 to 404 (FIGURE 13).

(2) Reset pulse $e$ from ring counter 325 arrives, on the one hand, the stage 325a of ring counter 325 and prepares the latter stage for the next following clock pulse; on the other hand, pulse $e$ arrives at the two monostable flip-flop circuits 332 and 333 provided for pulse delay.

The functional symbol following the "minus" sign is now stored in flip-flop circuits 402 to 404 as "101". The potential from these flip-flops arrive via anode amplifiers 442 to 449 at the decoder 400 which switches the information in the manner as described in the case of the decoder unit illustrated in FIGURE 6, so that corresponding potentials occur at the output terminals of diode "and" circuits 431 to 441.

Somewhat delayed in relation to reset pulse $e$, pulse $e_1$ arrives from monostable flip-flop 333 at heptode "and" circuits 410 to 419, preparing the latter. Thereby, in the present example, the pulse which corresponds to the functional symbol "C" can pass through heptode "and" circuit 417, and from there via terminal 2921 (FIGURES 13 and 14) and amplifier 457 (FIGURE 14), to be stored in line $500_7$ of register 500 (FIGURE 14). Simultaneously, pulse $e_1$ also arrives at counter S and switches the latter by one step to stage $S_2$. The latter stage emits pulse $f_2$ which is amplified by amplifier group 470 and arrives as pulse $f_{2'}$ in register column $500^a$. At the thyratron representing the storage element $500_{a7}$ at the intersection of column $500_a$ and line $500_7$, the information corresponding to the functional symbol "C" is thus stored.

Emission of pulses $e_1$ and $f_2$, respectively, completes the storage of a number or symbol.

In order to decode a new subsequently arriving tetrade, flip-flop circuits 401 to 404 must first be reset to their initial stage. This is effected by means of monostable flip-flop circuit 332 (FIG. 12) which emits pulse $e_3$ after storage is terminated, and thereby resets flip-flops 401 to 404.

The next following clock pulse $a$ initiates the decoding of the second tetrade. It switches ring counter 325 back to stage 325$a$, and word pulse $d_2$ arrives via heptode "and" circuit 321 at flip-flop circuit 401, switching the latter. In the above described manner, the pulses of the second tetrade are now introduced in flip-flops 401 to 404. Since, in the present example, the second tetrade corresponds to decadic number "8", the tetrade consists of "1011" in three-excess-code. Via diode "and" circuits 420 to 441 of the decoder, heptode "and" circuit 418 and amplifier 458, this information is stored in register line 500$_8$. At the same time, counter S is switched by pulse $e_1$ to stage $S_3$, and emits pulse $f_3$ via amplifier group 471 as pulse $f_{3'}$, into the column 500$_b$ for unit digits. This information is then stored in the thyratron 500$_{b8}$ at the intersection of line 500$_8$ and column 500$_b$. Subsequently, flip-flop circuits 401 to 404 are then reset as described above, and the decoding and storage of the next following number "3" and the next following numbers may take place, while counter S is always switched by one step.

After the twentieth tetrade, i.e. the tetrade corresponding to the nineteenth digit, which is "4" in the present example, counter S switches from stage $S_{20}$ to stage $S_{21}$. This last stage $S_{21}$ emits pulse $f_{21}$, on the one hand, via amplifier 489 and as $f_{21'}$, for storage in the corresponding register column 500$t$, and, on the other hand, to the monostable flip-flop circuit 330 (FIGURE 19).

From the output of flip-flop side 330$a$, pulse $f_{22}$ arrives undelayed at flip-flop circuits 302 and 304 (FIGURE 11 and FIGURE 18, respectively) and thereby switches off the pulses $b$ (calculation terminated) and $i_9$ (exploitation terminated) still existing from a previous work performance exploiting former information.

From flip-flop circuits 302 and 304, "and" circuit 303 and thereby also "and" circuit 301 are blocked, so that a later pulse $c$ can initiate no further storage of information.

The other flip-flop side 330$b$ emits a delayed pulse $f_{23}$ to ring counter 325 (FIGURE 12) and, furthermore, simultaneously a corresponding pulse $f_{23'}$, via amplifier 590 to counter S (FIGURE 14). Thereby, counters 325 and S are switched off, subsequently arriving clock pulses cannot switch ring counter 325, and the loading of new information is interrupted.

Before further insertion of information can be resumed by the transfer system, the command pulses $b$ and $i_9$ must have occurred. The latter pulse, however, will only occur after the register 500 is free, i.e. after all information stored therein has been exploited, for instance, by printing the same.

*Exploitation of Stored Information*

The read-out and exploitation of the information stored in register 500 will now be described for the above numerical example, with the aid of FIGURES 21, 11, 22 and pulse plan 28($a$) and ($b$).

In FIGURES 21 and 22, there is shown the endless, continuously movable carrier 111 of a work-performing machine which, in this example, is a high speed printing apparatus. The tools borne by carrier 111 are, therefore, movable printing types, the operation of which does not form part of the present invention and is described in detail in my copending Patent 2,936,704.

As part of the linking unit, photoelectric cell 580 is sationary mounted on one side of the movable carrier 111, while registering with the photoelectric cell, but on the other side of carrier 111 there is provided a light source (not shown). The types or similar tools of the work-performing machine are so mounted on carrier 111 that air gaps remain between them, so that light for the light source may be received intermittently by photoelectric cell 580 as each type or tool passes between light source and photoelectric cell. At each passage of a type or tool, a pulse $g$ is generated.

It shall be assumed that carrier 111 contains twice the entire set of possible types required for printing, while the first set extending from the zero opposite from type "0" opposite hammer 521$a$ in FIGURE 22 to symbol K opposite hammer 521$s$ in the same figure passes the set of hammers 521$a$ to 521$u$, the second set extending from symbol "0" opposite hammer 521$t$ to the left moves past the light source-photoelectric cell assembly and is scanned thereby.

It shall now be assumed that during its continuous movement, one of these two sets of types attains the printing position illustrated in FIGURE 22. The series of pulses $g_1$ emitted by photoelectric cell 580 remains initially without effect.

However, as the first type (or tool) to be used for printing reaches the position at a distance of one type width prior to reaching the first printing position, slide contact 537 makes contact with contact terminal 540$x$, pulse $g$ amplified as $g_1$ in anode amplifier 581 (FIGURE 21), reaches heptode "and" circuit 582 (FIGURE 18). Since, as already described, pulse $f_{22}$ has prepared flip-flop circuit 304 (FIGURE 18) after decoding and storage have been terminated, flip-flop side 304$b$ is raised to higher potential and has prepared heptode "and" circuit 582. Pulse $i_4$ therefore opens "and" circuit 582 and passes as pulse $i_5$ to flip-flop circuit 583. The latter is reversed and prepares "and" circuits 584, 585, and 588 (FIGURES 18). Pulse $g_1$ can now pass through "and" circuit 584 as pulses $g_2$. After amplification in anode amplifier 586A (FIGURE 22) these pulses arrive as $g_3$ at diodes 622$a$ to 622$t$ (FIGURE 22) the other sides of which diodes are connected to contact terminals 639$a$ to 639$t$ sliding on contact bar 620.

During the continuous movement of carrier 111 from the position illustrated in FIGURE 22 in the direction of arrow 111$d$, a pulse $g_1$ is now generated at each "step" of carrier 111 in that direction. Each pulse $g_1$ passes "and" circuit 584 due to the switching of flip-flop circuit 583 effected during the first "step," and further passes anode amplifier 586A and arrives at the group of diodes 622$a$ to 622$t$. Since all but one of contact terminals 639$a$ to 639$t$ are connected to ground via contact bar 620, pulses $g_3$ applied to these contact terminals have no effect in the diagonal loops 602$a$ to 602$t$ connected thereto. However, one of contact terminals 639$a$ to 639$t$, namely terminal 639$a$ in the position illustrated in FIGURE 22 is not connected to ground but insulated by means of insulating piece 623 of contact bar 620. In this one instance, pulse $g_3$ therefore raises the potential at the respective diode 622$a$ and the diagonal loop 602$a$ connected thereto. Thereby, the potential of the cathodes of the thyratrons connected to this diagonal loop 602$a$ is raised and such thyratrons as had been fired so as to store information therein, now become extinguished. The operations of storing and extinguishing thyratrons during read-in and read-out in the thyratron register are described in detail in my patent application Serial No. 771,430 (now abandoned).

Each of diagonal loops 602$a$ to 602$t$ represent an extinguishing line in the thyratron register of this type. If anode amplifier 586A is laid out of sufficient dimensions to raise the cathode potential in the thyratrons sufficiently to extinguish the latter, special amplifiers for the diagonal loops of the register can be dispensed with.

In the example now being discussed, the thyratron 500$_{c3}$ at the intersection of line 503 and column 500$_c$ had been fired to store "3" as the fourth decoded information of the number to be stored. Pulse $g_3$ arriving on diagonal loop 602$a$ and extinguishing the respective thyratron 500$_{c3}$ thereby generates a read-out pulse $k_{18}$ which is applied to monostable flip-flop circuit 510c. The pulse is broadened in this flip-flop and then amplified in amplifier 520c and energizes magnet 521c thereby actuating the corresponding hammer of the work-performing machine, which prints cipher "3".

In the same manner the entire information stored in register 500 is read-out and printed. Thus, after the fourth printing "step" counting from the starting position magnet 521t effects printing of cipher "4", after the sixth printing "step," magnet 521b effects printing of cipher "8", and after the twelfth printing "step," magnet 521a causes printing of functional symbol "c" and magnet 521u causes printing of the "minus" sign, since both thyratrons in which the latter two information had been stored, namely register elements 500$_{a7}$ and 500y, are read out via the same diagonal loop 602m. Furthermore, during this last mentioned twelfth printing step, magnet 521c simultaneously effects the printing of a "comma" in the following manner:

As has been mentioned hereinbefore, the "comma" position had been pre-determined by correspondingly setting in advance slide contacts 542 and 543 (FIGURE 22) to register with contact terminals 539b and 541m, respectively. After the twelfth printing "step" counting from the starting position, pulse $g_1$ passes via slide contact 537 to contact terminal 540m and from there via contact terminal 541m and slide contact 542 as pulse $i_6$ to the prepared diode "and" circuit 585 (FIGURE 18). It passes the latter as pulse $i_7$ and arrives via slide contact 543 and contact terminal 539b to register column 500c and via the latter to monostable flip-flop circuit 510c, amplifier 520c and magnet 521c. The "comma" is thus printed at the same position in which the numeral "3" has already been printed. Due to its arrangement in the right hand bottom corner of the respective type carrier the "comma" will be printed in correct relationship to the numeral "3" occupying the same position. Of course, if this is desirable, the "comma" may occupy a full position of its own, or it may be printed as a decimal point, either to the right of the next preceding numeral in the same printing position, or occupying a position of its own.

After carrier 111 has passed all twenty work performing, i.e. printing positions, slide contact 537 moving synchronously with the carrier arrives at the final contact 540y and passes pulses $g_1$ as $i_8$ to the prepared heptode "and" circuit 588 (FIGURE 18) which now, in turn, releases pulse $i_9$. This pulse states that exploitation, i.e. printing, of the register has been terminated and resets flip-flop circuits 304 and 583 (FIGURE 18) to starting position. Thereby, flip-flop side 583b emits a pulse $i_{10}$ via differentiator 589 to the computer which pulse reports termination of work performance and emptying of the storage register to the computer. Furthermore, flip-flop side 583a emits a positive pulse $j$ via differentiator 566 (FIGURE 21) to thyratron amplifier 567 whose thyratron is fired and excites the windings of electro-magnet $T_0$. Magnet $T_0$ then actuates in a known manner the line-by-line shift of the work piece, in our example of the paper on which text lines are being printed.

After the paper or similar work piece has been shifted by one line, the thyratron of amplifier 567 is again extinguished by switch 568 being opened by contact arm $T_1$. Magnet $T_0$ is thereby deenergized since anode voltage $U_0$ is briefly interrupted. The complete exploitation of the decoded information corresponding to the printing of a complete text line is thereby terminated.

It will be understood that this invention is susceptible to modification in order to adapt it to different usages and conditions, and, accordingly, it is desired to comprehend such modifications within the scope of the appended claims.

I claim:

1. A method of printing coded information from high speed computing devices, comprising the steps of gating coded information pulses from a track of the recording section of a computing device, depending on the arrival of a track scanning command from the program control section of said computing device, through to a gate stage prior to decoding said information; gating a track starting pulse from said recording section through to a successively ignited and extinguished plurality of counter stages, depending upon the simultaneous presence of a message from a printing device that the latter is ready for printing, and a command from the computing device that a calculation is terminated and the result is to be stored; applying clock pulses from said program control section successively to said counter stages, said clock pulses where coinciding with said track starting pulse in one of said counter stages causing emission of a pulse which, where coinciding in said gate stage with said coded information pulse, causes said coded information pulse to operate a flip-flop arrangement and a plurality of "and" circuits, upon simultaneous arrival, in the latter, of a delayed decode control pulse from the output side of the last of said counter stages, said coded information pulse thereby becoming decoded to a decadic pulse; applying said decadic pulse to the lines of a matrix register for storage therein, resetting said flip-flop arrangement by applying thereto a delayed reset pulse derived from the output side of said last counter stage; preparing a ring counter assembly, for triggering by applying to the first stage thereof said track starting pulse; triggering said ring counter assembly by applying thereto a delayed register column loading pulse equally derived from said last counter stage output side, thereby generating a coincidence pulse for charging a column of said matrix register, and storing said decoded decadic pulse at the intersection of the latter with said coincidence pulse by demagnetizing a magnetic means at said intersection; automatically extinguishing said ring counter arrangement and said counter stages upon storing of decoded information in the last register column concurrently with emitting a command that storage has been completed, directed from the output side of said ring counter arrangement to said computing device, while concurrently therewith interrupting temporarily passage of said coded information pulse and said track starting pulse, until the stored decoded information has been printed.

2. In an arrangement consisting of (a) a high speed computing device comprising a recording section having a plurality of recording tracks and a program control section, and (b) a high speed printing apparatus comprising automatic control means for automatically turning the printing on and off, and emitting signals concurrently therewith; a command transfer system interposed between said computing device and said printing apparatus comprising, in combination, a storage unit including two matrix registers in said storage unit, a track selector unit connected to the information output of said computing device, a decoder unit including a unit for loading information received through said track selector unit and to be decoded into said decoder, a unit connected to the output of said decoder for loading register column information alternately into one of said matrix registers, and a control unit connected to said decoder unit and said loading unit for controlling the decoding and storing respectively of coded information, and further controlling the printing of stored information by said printing apparatus; said control unit comprising amplifying means connected to said computing device for boosting a track starting pulse received from said recording section of said computing device, a heptode gate means for gating said track starting pulse therethrough, a first flip-flop arrangement, an "and" circuit, line means connecting one input side of said "and" circuit and one side of said first flip-flop to said program control section to receive a command therefrom when a calculation is completed by the computing device and ready to be stored, a second flip-flop arrangement, line means connecting the other side of said "and" circuit and one side of said second flip-flop to said automatic control means of said printing apparatus for conducting a signal emitted therefrom (concurrent) arrival of said signal and said command from said program control section in said "and" circuit causing said gate means to open and pass said track starting pulse, and line means connecting the other sides of said first and second flip-flops as well as said program control section of said computing device to said unit for loading register columns, so as to conduct reset pulse emitted from the latter upon completion of loading; and means connected to said recording section for amplifying and transmitting clock pulses emitted by the latter to said unit for loading said decoder.

3. In an arrangement consisting of (a) a high speed computing device comprising a recording section having a plurality of recording tracks and a program control section, and (b) a high speed printing apparatus comprising automatic control means for automatically turning the printing on and off and emitting signals concurrently therewith; a command transfer system interposed between said computing device and said printing apparatus comprising, in combination, a storage unit including two matrix registers, a track selector unit connected to said computing device and transmitting selected information pulses, a decoder unit, a unit connected to said decoder unit for loading said information pulses to be decoded into said decoder, a unit for deriving decoded information from said decoder and feeding them into one of said matrix registers, a control unit interconnecting said computing device said loading unit for said decoder and said register feeding unit for controlling the decoding and storing (respectively) of coded information received from said computing device through said track selector unit, and the printing of stored information by said printing apparatus; said unit for loading said decoder comprising including ring counter means, a gates group, amplifying means, and cathode output means at the output side of said ring counter means comprising a first and second delay line, said ring counter means comprising a plurality of thyratrons to be fired and extinguished in continuous succession, line means connected to said track selector unit for loading said information pulses into said gates group, said control unit including line means for loading track starting pulses from said computing device into said ring counter means, line means connecting the cathode output sides of said ring counter means with said gates group, line means for connecting said gates group via said amplifying means with the input side of said decoder, line means connecting the output side of said first delay line with (a) the input side of said decoder to carry delayed decoding pulses thereto, and (b) to the input side of unit for loading register columns, and line means connecting the output side of said second delay line with said decoder to send reset pulses thereto.

4. In an arrangement consisting of (a) a high speed computing device comprising a recording section having a plurality of recording tracks and a program control section, and (b) a high speed printing apparatus comprising automatic control means for automatically turning the printing on and off and emitting signals concurrently therewith; a command transfer system interposed between said computing device and said printing apparatus comprising, in combination, a storage unit including two matrix registers in said storage unit, a track selector unit connected to said computing device for receiving and transmitting gated information signals, a decoder unit connected to said track selector unit, a unit for said loading information to be decoded into said decoder, a unit for loading register column information alternately into one of said matrix registers, and a control unit to said two loading units for controlling the decoding and storing, respectively, of coded information received from said computing device, and the printing of stored information by said printing apparatus; said decoder unit comprising a plurality of flip-flop arrangements each having an information pulse input side connected to said decoder loading unit, a control tube separate from said flip-flop arrangements and controlling the entrance of decoding pulses from said decoder loading unit, a zero entrance line connected to the input side opposite said information pulse input side of said flip-flop arrangements, a plurality of "and" circuit groups each connected with the input sides to the output sides of said flip-flop arrangements, said "and" circuit groups being successively traversed by said information pulses thereby decoding them to decadic line pulses, and a plurality of output lines from the output side of the last "and" circuit group connected to said storage unit to insert said decadic line pulses into the lines of one of said matrix registers.

5. In an arrangement consisting of (a) a high speed computing device comprising a recording section having a plurality of recording tracks and a program control section, and (b) a high speed printing apparatus comprising automatic control means for automatically turning the printing on and off and emitting signals concurrently therewith; a command transfer system interposed between said computing device and said printing apparatus comprising, in combination, a decoder unit, a unit for loading said decoder including ring counter means, a gates group, amplifying means, and end cathode output means at the output side of said ring counter means including a first and second delay line, said ring counter means comprising a plurality of interconnected thyratrons to be fired and extinguished in continuous succession, line means including a track selector unit connected to the gated input of said gate means for loading information pulses in successive order into said gates group, line means connected to a first one of said thyratrons for loading track starting pulses into said ring counter means, line means connecting the cathode output sides of said ring counter means with said gates group, line means for connecting said gates group via said amplifying means with the input side of said decoder, line means connecting the output side of said first delay line to the input side of said decoder to carry delayed decoding pulses thereto, line means connecting the output side of said second delay line to said decoder to send reset pulses thereto; a unit for register loading including a counter arrangement, including a plurality of interconnected thyratrons; line means connecting the output side of said first delay line to said last mentioned thyratrons for successively firing and extinguishing said thyratrons; amplifier and transformer means connected to the cathode output sides of said last mentioned thyratrons; relay means connected to and operated by the last of said thyratrons; switch means operable by said relay means for switching on and off the anode current of all of said thyratrons; a control unit, line means for connecting the first of said thyratrons of the ring counter arrangement of said unit for register loading to said control unit for carrying information pulses from the latter which fire said last mentioned thyratron, said line means from the output side of said first delay line leading in parallel to each of said last mentioned thyratrons succeeding the first one in said counter arrangement of said unit for loading register columns; line means connecting the cathode output side of the last of said thyratrons of said unit for register loading concurrently to (a) said track selector unit, (b) said control unit, and (c) said program control section of said computer for carrying reset pulses reporting the completion of storage of decoded information thereto, whenever the last of said thyratrons is extinguished by said relay actuating said second switch means; two register storage units, selectively connected to said decoder and said register loading unit; means for selectively connecting said storage units to said printing apparatus; and means for deriving a control signal from said last mentioned means for initiating storing into a register which has been emptied by said printing apparatus.

6. A command transfer system for interposition between a high speed printing apparatus and a computing device having a recording section with at least one recording track, comprising a decoder having an input and an output circuit; means for deriving information signals to be decoded from said computer and for feeding said signals to said input circuit of said decoder; means for deriving a signal from said decoder upon completion of each decoding step; a loading circuit having means for receiving said last mentioned signals, said loading circuit including a plurality of energizable channels and further including means for successively energizing said channels upon receiving said last mentioned signals; two storage registers, each having lines, columns and storage elements at the crosspoints of said lines and columns; first switching means for alternately connecting said energizable channels to the columns of said two registers; second switching means for alternately connecting the output circuit of said decoder to the lines of said two registers; read-out circuits associated to said storage registers; means for connecting that one of said read-out circuits to said printing apparatus which is associated to a storage register not connected to said decoder output circuit; a control unit having first and second input terminals; means for deriving a first control signal from any of said printing apparatus and said storage register connected thereto upon emptying said storage register; means for deriving a second control signal from said loading circuit upon completion of storage into the other one of said storage registers; means for applying said first and second control signal to said control unit; means interconnecting said control unit, said decoder and said storage register for starting decoding and storing of decoded signals dependent upon reception of said first control signal, and for preventing storing upon reception of said second control signal; and means for stopping storing simultaneously with occurrence of said second control signal.

7. In an arrangement as set forth in claim 6; each of said storage registers in said storage section comprising ten horizontal loops for receiving line pulses, and the same number of vertical loops for receiving column pulses, first line means connecting the input side of said horizontal loops to the output side of said decoder unit, relay switch means for automatically switching said first line means alternately to one of said matrix registers, second line means connecting said vertical loops to said unit for loading register columns, second relay switch means for automatically switching said second line means alternately to one of said matrix registers, and third line means for connecting said horizontal and vertical loops to said printing apparatus, said first and second switch means automatically connecting the other matrix register to said third line means while the aforesaid one matrix register is connected to said first and second line means.

8. A command transfer system for interposition between a high speed printing apparatus and a computing device having a recording section with at least one recording track comprising: a decoder having an input and output circuit; means for deriving information signals to be decoded from said computer and for feeding said signals to said input circuit of said decoder; a storage register, having a read-in circuit including a loading device and a read-out circuit network; means for interconnecting the output circuit of said decoder and said read-in circuit of said storage register; means for interconnecting said read-out circuit network of said storage register and said printing apparatus, including means for starting printing upon completion of storage of decoded signals in said storage register; a control unit including a signal path terminating at said decoder for passing a starting signal to said decoder, said control unit further having first and second input terminals; means for deriving a first control signal from any of said printing apparatus and said storage register upon completion of printing and for feeding said first control signal to said first input terminal of said control unit; means for deriving a second control signal from said storage register upon completion of storage and for feeding said second control signal to said second input terminal of said control unit; said control unit permitting passage of said starting signal for starting and storing of decoded signals dependent upon reception of said first control signal, said control unit preventing storing upon reception of said second control signal; and means for stopping storing simultaneously with occurrence of said second control signal.

9. In a system as set forth in claim 8, including means for feeding said second control signal to (a) said computer which then makes new coded information available, (b) said printing apparatus which then begins work on the basis of the decoded and stored data, and (c) to said control unit which then admits new coded data from said computer for decoding and storage after it has received simultaneously a new command from said work performing device that the previous work is completed and the latter device is ready to do new work.

10. In an apparatus of the character described, a command transfer system interposed between a computing device and a work performing automatic device, and comprising a control unit adapted for receiving a message that calculation is completed and results are available from said computing device, for further receiving a message from said work performing automatic device that it is ready to perform new work; a decoder unit activated by said control unit and connected to said computing device receiving said results therefrom and decoding said results upon arrival of both aforesaid messages at said control unit; and a storage unit including at least one storage register, serving for storing the resulting decoded data from said decoder unit, while the other register is available for removal of data therefrom for directing the operation of said work performing device.

11. In the arrangement of a command transfer system of the kind described, and a computing device comprising a computing section, a program control section and a recording section, the combination of: a storage unit including two matrix registers each having, text line loops and text column loops and input and output circuit networks, a dual-decimal decoder unit, having its output connected to the input network of one of said registers, a printing apparatus connected to the output network of the other of said registers and comprising printing means movable between two determined end positions, relay switch means for shifting connection of one of said registers from said decoder unit to said printing apparatus, and simultaneously shifting connection of the other register from said printing apparatus to said decoder unit, and vice versa, and a control unit connected to said decoder for initiating decoding upon the register connected thereto being empty.

12. In the arrangement of a command transfer system of the kind described, and a computing device comprising a computing section, a program control section and a recording section, the combination of a storage unit of said command transfer system having two matrix registers each having, text line loops and text column loops, a dual-decimal decoder unit connected to one of said registers, a ring counter arrangement comprising several stages and being shiftable from stage to stage by clock pulses emitted by said program control section, a counter arrangement comprising a plurality of stages; first line means interconnecting said ring counter and said counter for shifting the latter from stage to stage by a pulse produced by said first ring counter arrangement after energy cycle thereof, a printing apparatus connected to the other of said registers and comprising printing means movable between two determined end positions; relay switch means for shifting connection of one of said registers from said decoder unit to said printing apparatus, and simultaneously shifting connection of the other register from said printing apparatus to said decoder unit, and vice versa, line means for interconnecting said ring counter arrangement and said decoder unit to transmit electric pulses thereto, thereby causing the latter to load decoded information pulses into said text line loops of the register connected to the decoder unit, line means for interconnecting said ring counter and said counter arrangement to concurrently with each decoded information pulse send column information pulses coincident with said decoded information pulses into the text column loops of said one register, said relay switch means being actuated by said movable printing means to shift connections of said registers whenever said movable printing means reaches one of said determined end positions.

13. The combination claimed in claim 12, wherein said command transfer system further includes a track selector unit and track scanning means for scanning said recording section of said computer and deriving coded information therefrom for transfer to said decoder unit, and gate means associated with said track scanning means for interrupting the scanning action of the latter upon receipt of said reset pulse from said counter arrangement, and simultaneously therewith cutting off said first and second ring counter arrangements.

14. An electronic command and information transfer system for transferring coded information from a programming device comprising electronic, mechanical or magnetic storage means such as punched cards, punched tapes, magnetic tapes, and drums, electronic or mechanical computers, measuring and control devices of machine tools and the like, to a work performing machine such as a printer, puncher, measuring device, machine tools, and the like; which transfer system comprises a storage unit and a control unit for effecting read-in of information into said storage unit dependent upon an occurrence of a pulse ($b$) from said programming device stating that a computed coded information is available, a track starting pulse ($c$), and a third pulse ($f_{21}$, $f_{22}$, $f_{23}$) stating that a previous storage in said storage unit is terminated; clock pulse ($a$) introducing means in said control unit for determining the working rythm of the transfer system, track starting pulse-introducing means in said control unit, for the introduction into said system of said track starting pulse destined for opening the path for subsequent information pulses ($d$) from said programming device whenever a storage is possible in the command and information transfer system and whenever coded information is available from the aforesaid programming device, said track starting pulse introducing means being adapted to be blocked by a storage terminating pulse and being opened again by a "register free and ready for new storage" pulse, data pulse introducing means in said control unit for introducing said data pulse immediately subsequent to said track starting pulse and synchronously with the clock pulses and being transferred to the decoder whenever said track starting pulse is permitted to pass, electronic means whereby said track starting pulse is enabled to select the first pulse of a next-following tetrade of binary coded pulses for separate decoding from the remaining three pulses of said tetrade, thereby characterizing negative data as distinguished from positive data, said storage unit comprising a storage register having lines and columns, and storage elements at the intersections of said lines and columns, a decoding unit interposed between said control unit and said storage unit, comprising loading means for series-to-parallel conversion of every four data pulses arriving in sequence to four parallel pulses in synchronism with four equally series-parallel converted clock pulses, output flip-flop means in said loading means, means for decoding tetrades of binary code pulses to differently coded data, a delaying circuit connected to said decoder loader to receive every fourth clock pulse and data pulse, being the last pulse of each tetrade and adapted for releasing each decoded data pulse obtained by decoding of each triade or tetrade from said decoding means to the subsequently following storage unit, delayedly after the decoding is complete, and thereafter delayedly resetting said output flip-flops of said decoder loading means, a storage column loader adapted for receiving said track starting pulse for being prepared thereby and said delayed decoded-data releasing pulse, which latter pulse switches the loading means step by step, thereby emitting storage pulses into the columns of the register and storing information in those storage elements where said storage pulses coincide with decoded data pulses from the decoder introduced into a register line, a register filling control which receives a pulse synchronously with the last column filling pulse from the storage register, for filling the last column which is predetermined as "last" in the register by the length of the information to be stored, said register filling control then blocking the entrance of the track starting pulses, and extinguishing the counter of the storage column loader and the ring counter of the decoder loader, main energizing switch means supplying positive and negative potential to said transfer system, and means in said control unit for receiving from the work-performing machine a pulse ($i_{10}$) stating that work performance by said work-performing machine.

15. An electronic command and information transfer system as described in claim 14, further comprising a clearing unit for setting all flip-flops into starting position after the command and information transfer system has been turned on by means of said main energizing switch.

16. An electronic command and information transfer system as described in claim 14, further comprising a work precisioning unit comprising manually adjustable "comma" inserting means, contactor means associated with said storage unit on the one hand, and said "comma" inserting means for reading out information from said storage register via said "comma" inserting means, and photoelectric means adapted for observing the working rhythm of the work performing machine and generating corresponding control pulses, said photoelectric means being so connected to said "comma" inserting means so that the resulting control pulse determines.

($a$) beginning of read-out of a manually preadjusted "comma" position and termination of readout, and ($b$) subsequent to initiating read-out, passage of a pulse to contactor means associated with the storage register so as to finally effect read-out from the latter.

17. An electronic command and information transfer system as described in claim 16, wherein said photoelectric means comprise at least one photoelectric cell (580) and a light source, the light from said light source scanning the operation of the work-performing machine to which said transfer system is connected and correspondingly causing said photoelectric cell (580) to emit pulses ($g$)$_1$, and wherein said contactor means comprise a first stationary contact member (540$x$), and a slide contact arm (537) connected to said photoelectric cell (580) said transfer system further comprising (A) a first and a second "and" circuit (582 and 584), the former of which "and" circuits is connected to said first contact member (540$x$);

(B) a first and a second flip-flop circuit (302, 583), said first and second "and" circuits, first and second flip-flop circuits, first contact member and photoelectric cell be so connected with each other that said pulse stating that storage is terminated ($f_{22}$) from said storage unit is applied to said first flip-flop circuit (304), the resulting raised output potential ($i_3$) from the latter flip-flop circuit (304) is applied to said first "and" circuit (582), said pulse ($g_1$) is applied via said slide contact arm (537) and first contact terminal (540$x$) whenever the former makes contact with the latter, as a pulse ($i_4$) also to said first "and" circuit (582), and the output pulse ($i_5$) from the latter "and" circuit resulting when said pulses ($f_{22}$) and ($i_4$) are both applied thereto, is applied to said second flip-flop circuit (583) reversing the latter so that the raised potential from the latter together with pulse $g_1$ opens said second "and" circuits (584) and causes an output pulse ($g_2$) to initiate the read out of the storage register.

18. In a command and information transfer system as described in claim 14, the control system for effecting read-in of information into said storage unit dependent upon occurrence of a command pulse (b) from said programming device stating that a completed coded result is available and can be stored, said track starting pulse (c), and said pulse $f_{21}$ stating that a previous read-in operation in said storage register has been terminated, which control system comprises
(A) a first and a second "and" circuit (53 and 109 or 301 and 303) and
(B) a first and a second flip-flop circuit (51 and 55, or 302 and 304) which four electrical parts are interconnected in such a manner that
(1) upon occurrence of said pulse $i_{10}$ stating that work performance by said work-performing machine is terminated, and of said command pulse (b) both flip-flop circuits are so switched that the second "and" circuit (109 or 303) puts out a positive potential and thereby so prepares said first "and" circuit (53 or 301), that the next subsequently occurring pulse (c) can pass through said first "and" circuit, and can thereby initiate the read-in, and that
(2) a pulse $f_{21}$ stating that read-in has been terminated, resets said two flip-flop circuits, thereby interrupting the passage of pulses through said first "and" circuit (53 or 301), so that no further pulse (c) may pass the latter.

19. In a command and information transfer system as described in claim 14, the control system for effecting read-in of information into said storage unit dependent upon occurrence of a command pulse (b) from said programming device stating that a completed coded result is available and can be stored, said track starting pulse (c), and said pulse $f_{21}$ stating that a previous read-in operation in said storage register has been terminated, which control system comprises
(A) a first and a second "and" circuit (53 and 109 or 301 and 303),
(B) a first and a second flip-flop circuit (51 and 55, or 302 and 304), and
(C) clearance means for resetting all said flip-flop circuits into such state that said second "and" circuit (109 or 303) opens and said first "and" circuit (53 or 301) is thereby prepared for subsequent opening to permit passage of a further pulse (c), the four electrical parts listed under (B) being interconnected in such a manner that
(1) upon occurrence of said pulse $i_{10}$ stating that work performance by said work-performing machine is terminated, and of said command pulse (b) both flip-flop circuits are so switched that the second "and" circuit (109 or 303) puts out a positive potential and thereby so prepares said first "and" circuit (53 or 301), that the next subsequently occurring pulse (c) can pass through said first "and" circuit, and can thereby initiate the read-in, and that
(2) a pulse $f_{21}$ stating that read-in has been terminated, resets said two flip-flop circuits, thereby interrupting the passage of pulses through said first "and" circuit (53 or 301), so that no further pulse (c) may pass the latter.

20. In a command and information transfer system as described in claim 14, the control system for effecting read-in of information into said storage unit dependent upon occurrence of a command pulse (b) from said programming device stating that a completed coded result is available and can be stored, said track starting pulse (c), and said pulse $f_{21}$ stating that a previous read-in operation in said storage register has been terminated, which control system comprises
(A) a first, a second, and a third "and" circuit (301, 303, and 588), and
(B) a first, a second, and a third flip-flop circuit (302, 304, and 583) which six electrical parts are interconnected in such a manner that
(1) upon occurrence of said pulse $i_{10}$ stating that work performance by said work-performing machine is terminated, and of said command pulse (b) both flip-flop circuits are so switched that the second "and" circuit (303) puts out a positive potential and thereby so prepares said "and" circuit (301), that the next subsequently occurring pulse (c) can pass through said "and" circuit, and can thereby initiate the read-in, that
(2) a pulse $f_{21}$ stating that read-in has been terminated, resets said first and second flip-flop circuits (302, 304), thereby interrupting the passage of pulses through said first "and" circuit (302), so that no further pulse (c) may pass the latter, and that
(3) a pulse $i_8$ cannot pass from said storage unit to said control unit as long as said third "and" circuit (583) is not prepared by said third flip-flop circuit (583) until, at the beginning of each work performance, one side (583b) of said third flip-flop circuit (583) emits a positive potential, thereby preparing said third "and" circuit (588) so that a now arriving pulse $i_8$ can pass through said third "and" circuit, while said second and said third flip-flop circuits (304 and 583) are returned to inoperative state.

21. In a command and information transfer system as described in claim 14, the control system for effecting read-in of information into said storage unit dependent upon occurrence of a command pulse (b) from said programming device stating that a completed coded result is available and can be stored, said track starting pulse (c), and said pulse $f_{21}$ stating that a previous read-in operation in said storage register has been terminated, which control system comprises
(A) a first, a second, and a third "and" circuit (301, 303, and 588),
(B) a first, a second, and a third flip-flop circuit (302, 304, and 583), and
(C) clearance means for resetting all said flip-flop circuits into such state that said second "and" circuit (109 or 303) opens and said first "and" circuit (53 or 301) is thereby prepared for subsequent opening to permit passage of a further pulse (c), the six electrical parts listed under (A) and (B) being interconnected in such a manner that
(1) upon occurrence of said pulse $i_{10}$ stating that work performance by said work-performing machine is terminated, and of said command pulse (b) both flip-flop circuits are so switched that the second "and" circuit (303) puts out a positive potential and thereby so prepares said "and" circuit (301), that the next subsequently occurring pulse (c) can pass through said "and" circuit, and can thereby initiate the read-in, that
(2) a pulse $f_{21}$ stating that read-in has been terminated, resets said first and second flip-flop circuits (302, 304), thereby interrupting the passage of pulses through said first "and" circuit (302), so that no further pulse (c) may pass the latter, that
(3) a pulse $i_8$ cannot pass from said storage unit to said control unit as long as said third "and" circuit (583) is not prepared by said third flip-flop circuit (583) until, at the beginning of each work performance, one side (583b) of said third flip-flop circuit (583) emits a positive potential, thereby preparing said third "and" circuit (588) so that a now arriving pulse $i_8$ can pass through said third "and" circuit, while said second and said third flip-flop circuits (304 and 583) are returned to inoperative state, and that (4) said third flip-flop circuit (583) is so switched that read-out from said storage unit is prevented, until read-in in said storage register is completed as marked by pulse ($f_{21}$), and until the work-performing machine has readed a starting position for performing work, which starting position is marked by a pulse ($i_4$).

22. In an electronic command and information transfer system of the type described and comprising
a control unit adapted for connection to
a decoding unit, a programming device,
a storage unit comprising means for emitting a pulse $f_{22}$ when storage therein is terminated, and a linking unit adapted for connection to a work-performing machine;
the control system for read-in into, and read-out from said storage unit comprising:

(A) a photoelectric cell (580) in said linking unit adapted for emitting pulses ($g_1$), (B) a plurality of contact terminals having a starting contact terminal (540x) and a final contact terminal (540y), (C) a slide contact arm (537) movable in synchronism with a complete work cycle of said work-performing machine so as to successively make contact with all said contact terminals beginning with the starting and ending with the final contact terminal, (540x, 540a to 540s, 540y), (D) manually adjustable "comma" insertion means adapted for adjustment to making contact with a determined one of said contact terminals (540a to 540s) intermediate said starting and said final contact terminal, on the one hand, and with said storage unit, on the other hand, (E) a first, second, third, fourth, fifth, and sixth "and" circuit (301, 303, 582, 584, 585, 586), and (F) a first, second, and third flip-flop circuit (302, 304, 583), all of which parts (A) to (F) are so connected with each other that, after storage of information is terminated in said storage unit, a pulse $f_{22}$ switches said second flip-flop circuit (303), so that positive potential from the latter prepares said third "and" circuit (582), so that a pulse $g_1$ from said photoelectric cell (580), when passing as pulse $i_4$ through said starting contact terminal (540x) due to said slide contact arm (537) making contact therewith, can pass through said third "and" circuit (582) and can so switch said third flip-flop circuit (583) that (I) a raised positive potential from the latter is applied to said sixth "and" circuit (588), until, upon termination of a work cycle, of said work-performing machine, when said slide contact arm (537) makes contact with said last contact terminal (540y), a pulse $g_1$ passing therethrough as pulse $i_8$ passes through said sixth "and" circuit (588) to said third flip-flop circuit (583) and reverses the latter, and that (II) said raised positive potential from said third flip-flop circuit (583) so prepares said fourth and fifth "and" circuits (584, 585) that, on the one hand, said pulse $g_1$ can pass therethrough to initiate read out of information from said storage unit to said work-performing machine, and, on the other hand, said pulse $g_1$ can pass said "comma" insertion means via one of said intermediate contact terminals (540a to 540s) as pulse $i_6$ and via said fifth "and" circuit (585) as pulse $i_7$ to initiate a "comma" insertion in said work cycle of said work-performing machine, and that (III) said pulse $g_2$ can pass via said final contact terminal (540y) when said slide contact arm (537) makes contact therewith, and can pass as pulse $i_8$, said sixth "and" circuit (588) and, as pulse $i_9$, reverse said third flip-flop circuit (583), thereby causing emission of a pulse (h) from said third flip-flop circuit which is available for causing a specific displacement of a work piece or the like in said work-performing machine, and emission of another pulse ($i_{10}$) from said third flip-flop circuit, which pulse $i_{10}$ is introduced into the programming device to report to the latter termination of the work cycle performed by said work-performing machine.

23. In an electronic command and information transfer system of the type described and comprising
a control unit adapted for connection to
a decoding unit, a programming device,
a storage unit comprising means for emitting a pulse $f_{22}$ when storage therein is terminated,
and a linking unit adapted for connection to a work-performing machine;
the control system for read-in into, and read-out from said storage unit for effecting read-in of information into said storage unit dependent upon occurrence of a command pulse (b) from said programming device stating that a completed coded result is available and can be stored, said track starting pulse (c), and said pulse $f_{21}$ stating that a previous read-in operation in said storage register has been terminated, which control system comprises (A) a photoelectric cell (580) in said linking unit adapted for emitting pulses ($g_1$), (B) a plurality of contact terminals having a starting contact terminal (540x) and a final contact terminal (540y), (C) a slide contact arm (537) movable in synchronism with a complete work cycle of said work-performing machine so as to successively make contact with all said contact terminals beginning with the starting and ending with the final contact terminal, (540x, 540a to 540s, 540y), (D) manually adjustable "comma" insertion means adapted for adjustment to making contact with a determined one of said contact terminals (540a to 540s) intermediate said starting and said final contact terminal, on the one hand, and with said storage unit, on the other hand, (E) a first, second, third, fourth, fifth and sixth "and" circuit (301, 303, 582, 584, 585, 586), and (F) a first, second, and third flip-flop circuit (302, 304, 583), and (G) clearance means for resetting all said flip-flop circuits into such state that said second "and" circuit (109 or 303) opens and said first "and" circuit (53 or 301) is thereby prepared for subsequent opening to permit passage of a further pulse (c), all of which parts (A) to (G) are so connected with each other that, after storage of information is terminated in said storage unit, a pulse $f_{22}$ switches said second flip-flop circuit (303), so that positive potential from the latter prepares said third "and" circuit (582), so that a pulse $g_1$ from said photoelectric cell (580), when passing a pulse $i_4$ through said starting contact terminal (540x) due to said slide contact arm (537) making contact therewith, can pass through said third "and" circuit (582) and can so switch said third flip-flop circuit (583) that (I) a raised positive potential from the latter is applied to said sixth "and" circuit (588), until, upon termination of a work cycle, of said work-performing machine, when said slide contact arm (537) makes contact with said last contact terminal (540y), a pulse $g_1$ passing therethrough as pulse $i_8$ passes through said sixth "and" circuit (588) to said third flip-flop circuit (583) and reverses the latter, and that (II) said raised positive potential from said third flip-flop circuit (583) so prepares said fourth and fifth "and" circuits (584, 585) that, on the one hand, said pulse $g_1$ can pass therethrough to initiate readout of information from said storage unit to said work-performing machine, and, on the other hand, said pulse $g_1$ can pass said "comma" insertion means via one of said intermediate contact terminals (540a to 540s) as pulse $i_6$ and via said fifth "and" circuit (585 as pulse $i_7$ to initiate a "comma" insertion in said work cycle of said work-performing machine, and that (III) said pulse $g_1$ can pass via said final contact terminal (540y) when said slide contact arm (537) makes contact therewith, and can pass as pulse $i_8$, said sixth "and" circuit (588) and, as pulse $i_9$, reverse said third flip-flop circuit (583), thereby causing emission of a pulse ($h$) from said third flip-flop circuit which is suitable for causing a specific displacement of a work piece or the like in said work-performing machine, and emission of another pulse ($i_{10}$) from said third flip-flop circuit, which pulse $i_{10}$ is introduced into the programming device to report to the latter termination of the work cycle performed by said work-performing machine, said first, second and sixth "and" circuit (301, 303, 588), and said first, second, and third flip-flop circuit being furthermore connected with each other in such a manner that (1) upon occurrence of said pulse $i_{10}$ stating that work performance by said work-performing machine is terminated, and of said command pulse ($b$) both flip-flop circuits are so switched that the second "and" circuit (303) puts out a positive potential and thereby so prepares said "and" circuit (301), that the next subsequently occurring pulse ($c$) can pass through said "and" circuit, and can thereby initiate the read-in, that (2) a pulse $f_{21}$ stating that read-in has been terminated, resets said first and second flip-flop circuits (302, 304), thereby interrupting the passage of pulses through said first "and" circuit (302), so that no further pulse ($c$) may pass the latter, and that (3) a pulse $i_8$ cannot pass from said storage unit to said control unit as long as said third "and" circuit (583) is not prepared by said third flip-flop circuit (583) until, at the beginning of each work performance, one side (583b) of said third flip-flop circuit (583) emits a positive potential, thereby preparing said third "and" circuit (588) so that a now arriving pulse $i_8$ can pass through said third "and" circuit, while said second and said third flip-flop circuits (304 and 583) are returned to inoperative state.

24. A command transfer system for interposition between a high speed printing apparatus and a computing device having a recording section with at least one recording track, comprising: a decoder having an input and an output circuit; said input circuit including an electronic ring counter and a gate circuit connected to and controlled by said ring counter; said gate circuit providing a plurality of channels opened successively by said ring counter; a control unit connected to and including means for starting said ring counter; means for deriving information signals to be decoded from said computer and for feeding said signals to said gate circuit for passage through any of said channels opened by said ring counter; a storage register having a read-in circuit including a loading device and a read-out circuit network; means for interconnecting the output circuit of said decoder and said read-in circuit of said storage register; means for interconnecting said read-out circuit network of said storage register and said printing apparatus, including means for starting printing upon completion of storage of decoded signals in said storage register; means for deriving a first control signal from any of said printing apparatus and said storage register upon completion of printing and for feeding said first control signal to said control unit; means for deriving a second control signal from said storage register upon completion of storage and for feeding said second control signal to said control unit; said control unit permitting decoding dependent upon reception of said first control signal, and preventing decoding upon reception of said second control signal; and means for stopping storing simultaneously with occurrence of said second control signal.

25. A command transfer system for interposition between a high speed printing apparatus and a computing device having a recording section with at least one recording track, comprising: a decoder having an input and an output circuit; said input circuit including an electronic ring counter and a gate circuit connected to and controlled by said ring counter, said gate circuit providing a plurality of channels opened successively by said ring counter; a control unit including means for starting said ring counter; means for deriving information signals to be decoded from said computer and for feeding said signals to said gate circuit for passage through any of said channels opened by said ring counter; said decoder further including a plurality of flip flops associated to and connected to said channels, said flip flops normally being in one state but flipped into the other state by said information signal if passing through the associated channel; a plurality of logic "and" circuit groups having an input circuit network connected to said flip flops and having an output circuit network including a plurality of decoder signal output channels and further including a pulse trigger circuit including pulse delay means connected to and deriving a first and a second successive signal from said ring counter after every cycle thereof, said first signal triggering said decoder to pass the information combination as present in said flip flops into said last mentioned channels; means for feeding said second signal to said flip flops for resetting them; a storage register having a read-in circuit including a loading device and read-out circuit network; means for interconnecting said output channels of said decoder and said read-in circuit of said storage register; means for interconnecting said read-out circuit network of said storage register and said printing apparatus, including means for starting printing upon completion of storage of decoded signals in said storage register; means for deriving a first control signal from any of said printing apparatus and said storage register upon completion of printing and for feeding said first control signal to said control unit; means for deriving a second control signal from said storage register upon completion of storage and for feeding said second control signal to said control unit; means interconnecting said control unit, said decoder and said storage register for starting storing of decoded signals dependent upon reception of said first control signal, and for preventing storing upon reception of said second control signal; and means for stopping storing simultaneously with occurrence of said second control signal.

26. A command transfer system for interposition between a high speed printing apparatus and a computing device having a recording section with at least one recording track, comprising: a decoder having an input and an output circuit; means for deriving information signals to be decoded from said computer and for feeding said signals to said input circuit of said decoder; a storage register having lines and columns and storage elements at the cross points of said lines and columns; control means for said columns; a connection circuit interconnecting the output circuit of said decoder and said lines; means for deriving a trigger signal from said decoder and feeding it to said control means for said columns to successively activate said columns after each decoding step; said storage circuit further including a read-out circuit for detecting the intelligence stored in said storing elements; means for interconnecting said read-out circuit network of said storage register and said printing apparatus, including means for starting printing upon completion of storage of decoded signals in said storage register; a control unit having first and second input terminals; means for deriving a first control signal from any of said printing apparatus and said storage register upon completion of printing and for feeding said first control signal to said first input terminal of said control unit; means for deriving a second control signal from said storage register upon completion of storage and for feeding said second control signal to said second input terminal of said control unit; means interconnecting said control unit, said decoder and said storage register for starting storing of decoded signals dependent upon reception of said first control signal, and for preventing storing upon reception of said second control signal; and means for stopping storing simultaneously with occurrence of said second control signal.

27. A command transfer system for interposition between a high speed printing apparatus and a computing device having a recording section with at least one recording track, comprising: a decoder having a signal input, a starting input and a signal output circuit; means for deriving information signals to be decoded from said computer and for feeding said signals to said signal input circuit of said decoder; a storage register having a read-in circuit including a loading device and a read-out circuit network; means for interconnecting the output circuit of said decoder and said read-in circuit of said storage register; means for interconnecting said read-out circuit network of said storage register and said printing apparatus, including means for starting printing upon completion of storage of decoded signals in said storage register; a gating circuit having two inputs and an output; means for feeding a decoding starting signal to one of said inputs; means for connecting the output of said gating circuit to said starting input circuit of said decoder for starting it upon receiving said decoding starting signal; a logic "and" circuit having an input and an output circuit; means for connecting said output circuit of said logic "and" circuit to the other one of the inputs of said gating circuit; means for deriving a signal from said computer and feeding it to the input circuit of said logic "and" circuit, said signal being indicative for the termination of calculation in said computer; means for deriving a first control signal from any of said printing apparatus and said storage register upon said apparatus having printed the entire content of said storage register; means for feeding said first control signal to said input circuit of said logic "and" circuit; means for deriving a second control signal from said storage register upon completion of storage and for feeding said second control signal to said input circuit of said logic "and" circuit, said gating circuit being kept open for said starting signal by said logic "and" circuit upon receiving said signal indicative for termination of calculation and said first control signal, said gating circuit being closed upon receiving said second control signal, means for interrupting storage substantially simultaneously with the production of said second control signal.

28. A command transfer system for interposition between a high speed printing apparatus and a computing device having a recording section with at least one recording track, comprising a decoder having a starting circuit, a signal input circuit and a signal output circuit; means for deriving information signals to be decoded from said computer and for feeding said signals to said signal input circuit of said decoder; a storage register having lines, columns, storage elements arranged at the crosspoints of said lines and columns and a read-out circuit for detecting the intelligence in said storing elements; circuit means interconnecting the output circuit of said decoder and said lines; a counter; means for deriving a signal from said decoder after each decoding step; means for feeding said last mentioned signal to said counter for successive activation thereof; means for connecting said columns to ring counter and for successively energizing said columns; means for interconnecting said read-out circuit network of said storage register and said printing apparatus, including means for starting printing upon completion of storage of decoded signals in said storage register; a gating circuit having two inputs and an output; means for feeding a decoding starting signal to one of said inputs; means for connecting the output of said gating circuit to said starting circuit of said decoder for starting it upon receiving said decoding starting signal; a logic "and" circuit having an input and an output circuit; means for connecting said output circuit of said logic "and" circuit to the other one of the inputs of said gating circuit; means for deriving a signal from said computer and feeding it to the input circuit of said logic "and" circuit, said signal being indicative for the termination of calculation in said computer; means for deriving a first control signal from any of said printing apparatus and said storage register upon said apparatus having printed the content of said storage register; means for feeding said first control signal to said input circuit of said logic "and" circuit; means for deriving a second control signal from said storage register upon completion of storage and for feeding said second control signal to said input circuit of said logic "and" circuit, said gating circuit being kept open for said starting signal by said logic "and" circuit upon receiving said signal indicative for termination of calculation and said first control signal, said gating circiut being closed upon receiving said second control signal, and means for interrupting storage substantially simultaneously with the production of said second control signal.

29. A command transfer system for interposition between a high speed printing apparatus and a computing device having a recording section with at least one recording track, comprising a decoder connected to said computing device and receiving signals to be decoded therefrom, at least one storage register connected to said decoder and receiving decoded signals therefrom for storage; means for interconnecting said storage register and said printing apparatus and for feeding said stored signals thereto to be printed; a signal path for feeding starting signals to said decoder; and means responsive to the storage conditions of said register for blocking said signal path when said register is full and for removing said blocking when said register is empty.

30. A command transfer system for interposition between a high speed printing apparatus and a computing device having a recording section with at least one recording track, comprising a decoder having an input circuit, a decoder unit, and an output circuit; said input circuit including an electronic ring counter and a gate circuit connected to and controlled by said ring counter; means for starting said ring counter; said gate circuit providing a plurality of channels opened successively by said ring counter; means for deriving information signals to be decoded from said computer and for feeding said signals to said gate circuit for passage through any of said channels opened by said ring counter into said decoder unit, each cycle of said ring counter constituting a decoding step; a storage register having lines and columns and storage elements arranged at the crosspoints of said lines and columns; circuit means interconnecting the output circuit of said decoder and said lines; a counter having a starting circuit; means for deriving a signal from said decoder after each decoding step; means for feeding said last mentioned signal to said counter for successive activation thereof; means for connecting said columns to said counter and for successively energizing said columns; said storage register further including a read-out circuit for detecting the intelligence in said storing elements; means for interconnecting said read-out circuit network of said storage register and said printing apparatus, including means for starting printing upon completion of storage of decoded signals in said storage register; a constorage register and said printing apparatus, including means for starting printing upon completion of storage of decoded signals in said storage register; a gate circuit connected to said starting circuit of said decoder and governing the commencement of decoding, and further connected to said loading device for starting the storing of decoded signals; a logic "and" circuit having two inputs and an output connected to said gate circuit for opening and closing thereof; means to feed starting pulses to said gate circuit for passage therethrough; a flip flop connected with one of its sides to one of said two inputs of said logic "and" circuit; means for deriving a first control signal from any of said printing apparatus and said storage register upon emptying of said storage register and for feeding said first control signal to said input of said logic "and" circuit and said flip flop; means for feeding a signal for starting storing to the other one of said inputs of said logic "and" circuit; means for producing a second control signal upon completion of storage; means for feeding said second control signal to the other side of said flip flop whereby said logic "and" circuit is blocked thus blocking said gating circuit, and means for initiating printing concurrently with the production of said second control signal.

39. A command transfer system for interposition between a high speed printing apparatus and a computing device having a recording section with at least one recording track, comprising a decoder having an information signal input circuit, a starting circuit and a signal output circuit; a track selector unit including a plurality of gating circuits having a common output; means for deriving information signals to be decoded from said computer and to apply them to said gating circuits; means for deriving track selector pulses and for separately applying them to said gating circuits and opening one of them; means for feeding said common output to the input circuit of said decoder; a storage register having a read-in circuit including a loading device and a read-out circuit network; means for interconnecting the output circuit of said decoder and said read-in circuit of said storage register; means for interconnecting said read-out circuit network of said storage register and said printing apparatus, control means for starting printing upon completion of storage of decoded signals in said storage register; a starting signal gate circuit connected to said starting circuit of said decoder and governing the commencement of decoding; a logic "and" circuit having two inputs and an output connected to said starting signal gate circuit for opening and closing thereof; means to pass starting pulses to said gate circuit; a flip flop connected with one of its sides to one of said two inputs of said logic "and" circuit; means for deriving a first control signal from said control means for said printing apparatus upon emptying of said storage register and completion of printing and for feeding said first control signal to said input of said logic "and" circuit; means for feeding signals for starting storing to the other one of said inputs of said logic "and" circuits; means for producing a second control signal upon completion of storage; means for feeding said second control signal to the other side of said flip flop whereby said logic "and" circuit is blocked thus blocking said gating circuit, and means acting concurrently with the production of said second control signal for initiating printing the content of said storage register.

40. A command transfer system for interposition between a high speed printing apparatus and a computing device having a recording section with at least one recording track, comprising a decoder having an input and an output circuit; a track selector unit including a plurality of gating circuits each having a signal input, a gating input and all having a common signal output; means for deriving information signals to be decoded from said computer and to apply them to at least one signal input of said gating circuits; means for deriving track selector pulses and for separately applying them to one gating input of said gating circuits; means for feeding said common signal output to the input circuit of said decoder; a storage register having a loading device a read-in circuit, and a read-out circuit network; means for interconnecting the output circuit of said decoder and said read-in circuit of said storage register via said loading device; means for interconencting said read-out circuit network of said storage register and said printing apparatus, including means for starting printing upon completion of storage of decoded signals in said storage register; a control unit having first and second input terminals; means for deriving a first control signal from any of said printing apparatus and said storage register upon completion of printing and for feeding said first control signal to said first input terminal of said control unit; means for deriving a second control signal from said storage register upon completion of storage and for feeding said second control signal to said second input terminal of said control unit; means interconnecting said control unit, said decoder and said storage register for starting storing of decoded signals dependent upon reception of said first control signal, and for preventing storing upon reception of said second control signal; and means for stopping storing simultaneously with occurrence of said second control signal.

41. A circuit as set forth in claim 40 and including further means to apply said second control signal to said gating circuits of said track selector unit for resetting them.

42. A command transfer system for interposition between a high speed printing apparatus and a computing device having a recording section with at least one recording track, comprising a decoder having an input and an output circuit; means for deriving information signals to be decoded from said computer and for feeding said signals to said input circuit of said decoder; a loading circuit including a counter having a plurality of output terminals; means for deriving a signal from said decoder after each decoding step to activate said counter; at least one storage register having lines, columns, storage elements effective at the crosspoints of said lines and columns, and a read-out network; means interconnecting said terminals and said columns; means interconnecting the output circuit of said decoder and said lines, means for interconnecting said read-out network and said printing apparatus; a control unit having first and second input terminals; means for deriving a first control signal from any of said printing apparatus and said storage register upon completion of printing and for feeding said first control signal to said first input terminal of said control unit; means for deriving a second control signal from said counter after completion of a cycle thereof, means for applying said second control signal to said decoder for interrupting decoding; means for feeding said second control signal to said printing apparatus to initiate emptying said storage register and its content; means for applying said second control signal for deenergizing said counter; means for applying said second control signal to said second input terminal of said control unit; and means for connecting said control unit to said decoder; said first control signal in said control unit initiating decoding and storing, said second signal preventing further storing until further receiving of said first control signal.

43. A command transfer system for interposition between a high speed printing apparatus and a computing device having a recording section with at least one recording track, comprising a decoder having a starting circuit, an information signal, input circuit and a signal output circuit; means for deriving information signals to be decoded from said computer and for feeding said signals to said information signal input circuit of said decoder; a storage register having a read-in circuit including a loading device and a read-out circuit network; means for interconnecting the output circuit of said decoder and said read-in circuit of said storage register; means for interconnecting said read-out circuit network and said printing apparatus; a control unit having first and second input terminals and an output terminal connected to said starting circuit and said loading device; means for deriving a first control signal from any of said printing apparatus and said storage register upon completion of printing and for feeding said first control signal to said first input terminal of said control unit; means for deriving a second control signal from said storage register upon completion of storage and for feeding said second control signal to said second input terminal of said control unit; means for feeding said second control signal to said printing apparatus to start printing and emptying said storage register; means for feeding the starting signals to said control unit for starting decoding and storing of decoded signals dependent upon reception of said first control signal, said control unit preventing decoding and storing upon reception of said second control signal; and means for feeding said second control signal back to said storage register for stopping storing.

44. A command transfer system for interposition between a high speed printing apparatus and a computing device having a recording section with at least one recording track, comprising a decoder having an input and an output circuit; said input circuit including a gating circuit having an information signal input terminal and a starting-gating signal input terminal, said gating signal being fed thereto from said computer means for deriving information signals to be decoded from said decoder and feeding it to said information signal input terminal; a storage register having a read-in circuit including a loading device and a read-out circuit network; means for interconnecting the output circuit of said decoder and said read-in circuit of said storage register; means for interconnecting said read-out circuit network of said storage register and said printing apparatus, including means for starting printing upon completion of storage of decoded signals in said storage register; and a control unit for gating said starting-gating signal in response to the filling condition of said storage register.

References Cited in the file of this patent
UNITED STATES PATENTS

| | | |
|---|---|---|
| 2,045,436 | Bryce | June 23, 1936 |
| 2,264,622 | Dickenson | Dec. 2, 1941 |
| 2,636,672 | Hamilton et al. | Apr. 28, 1953 |
| 2,761,620 | Lindesmith et al. | Sept. 4, 1956 |
| 2,770,415 | Lindesmith et al. | Nov. 13, 1956 |
| 2,793,806 | Lindesmith | May 28, 1957 |
| 2,853,696 | Mendelson | Sept. 23, 1958 |
| 2,909,993 | Shafer et al. | Oct. 27, 1959 | trol unit having first and second input terminals, having a first output terminal connected to said means for starting said ring counter and having a second output terminal connected to said starting circuit of said counter; means for deriving a first control signal from any of said printing apparatus and said storage register upon completion of printing the content of said storage register and for feeding said first control signal to said first input terminal of said control unit; means for deriving a second control signal from said storage register upon completion of storage and for feeding said second control signal to said second input terminal of said control unit; said control unit permitting passage of a starting signal for a starting decoding and storing of decoded signals dependent upon reception of said first control signal, and for preventing decoding and storing upon reception of said second control signal; and means for stopping storing simultaneously with occurrence of said second control signal.

31. A command transfer system for interposition between a high speed printing apparatus and a computing device having a recording section with at least one recording track, comprising a decoder having an input circuit, a decoder unit and an output circuit; said input circuit including an electronic ring counter and a gate circuit connected to and controlled by said ring counter; means for starting said ring counter; said gate circuit providing a plurality of channels opened successively by said ring counter; means for deriving information signals to be decoded from said computer and for feeding said signals to said gate circuit for passage through any of said channels opened by said ring counter into said decoder unit, each cycle of said ring counter constituting a decoding step; a storage register having lines and columns and storage elements arranged at the crosspoints of said lines and columns; circuit means interconnecting the output circuit of said decoder and said lines; a counter; means for deriving a signal from said decoder after each decoding step; means for feeding said last mentioned signal to said counter for successive activation thereof; means for connecting said columns and said counter for successively energizing said columns; said storage register further including a read-out circuit for detecting the intelligence in said storing elements; means for interconecting said read-out circuit network of said storage register and said printing apparatus, including means for starting printing upon completion of storage of decoded signals in said storage register; a gating circuit having two inputs and an output; means for feeding a decoding starting signal to one of said inputs; means for connecting the output of said gating circuit to said starting means of said ring counter for starting it upon receiving said decoding starting signal; a logic "and" circuit having an input and an output circuit; means for connecting said output circuit of said logic "and" circuit to the other one of the inputs of said gating circuit; means for deriving a signal from said computer and feeding it to the input circuit of said logic "and" circuit, said signal being indicative for the termination of calculation in said computer; means for deriving a first control signal from any of said printing apparatus and said storage register upon said apparatus having printed the content of said storage register; means for feeding said first control signal to said input circuit of said logic "and" circuit; means for deriving a second control signal from said storage register upon completion of storage and for feeding said second control signal to said input circuit of said logic "and" circuit, said gating circuit being kept open for said starting signal by said logic "and" circuit upon receiving said signal indicative for termination of calculation and said first control signal, said gating circuit being closed upon receiving said second control signal, and means to interrupt storage substantially simultaneously with the production of said second control signal.

32. A command transfer system for interposition between a high speed printing apparatus and a computing device having a recording section with at least one recording track, comprising a decoder having an input and an output circuit; means for deriving information signals to be decoded from said computer and for feeding said signals to said input circuit of said decoder; a loading circuit including a counter having a plurality of output terminals; means for deriving a signal from said decoder after each decoding step to successively activate said counter; a storage register having lines, columns, storage elements effective at the crosspoints of said lines and columns, and a read-out network; means for connecting said output terminals of said loading circuit to said column, means for connecting the output circuit of said decoder to said lines, means for interconnecting said read-out circuit network of said storage register and said printing apparatus, including means for starting printing upon completion of storage of decoded signals in said storage register; a control unit having first and second input terminals; means for deriving a first control signal from any of said printing apparatus and said storage register upon completion of priniting to content of said register and for feeding said first control signal to said first input terminal of said control unit; means for deriving a second control signal from said counter after every cycle completed thereof; means for simultaneously with the production of said second signal deactivating said decoder and said counter of said loading circuit; means for feeding said second control signal to said second input terminal of said control unit; and means interconnecting said control unit and said decoder for starting decoding and storing decoded signals dependent upon receiving said first control signal and for preventing further storing upon receiving said second control signal.

33. A device as set forth in claim 32 said deactivating means being a relay in circuit connection with the last stage of said counter for interrupting current supply to said decoder and said counter.

34. A command transfer system for interposition between a high speed printing apparatus and a computing device having a recording section with at least one recording track, comprising a decoder having an input and an output circuit; means for deriving information signals to be decoded from said computer and for feeding said signals to said input circuit of said decoder; two storage registers each having a read-in and a read-out circuit network; a register loading circuit connected between the output circuit of said decoder and any of said read-in circuits; means for substantially simultaneously interconnecting said printing apparatus to the read-out circuit pertaining to the other one of said registers for emptying said register; a control unit having first and second input terminals; means for deriving a first control signal from any of said printing apparatus and said storage register connected thereto upon completion of printing and for feeding said first control signal to said first input terminal of said control unit; means for deriving a second control signal from the other one of said storage register upon completion of storage and for feeding said second control signal to said second input terminal of said control unit; means interconnecting said control unit, said decoder and said loading circuit for starting storing of decoded signals dependent upon reception of said first control signal, and for preventing storing upon reception of said second control signal; and means for stopping storing simultaneously with occurrence of said second control signal.

35. A command transfer system for interposition between a high speed printing apparatus and a computing device having a recording section with at least one recording track, comprising a decoder having a starting circuit, an information signal input circuit and a signal output circuit; means for deriving information signals to be decoded from said computer and for feeding said signals to said information input circuit of said decoder; means for deriving a signal from said decoder upon completion of each decoding step; a loading circuit having means for receiving said last mentioned signals, said loading circuit including a plurality of energizable channels and further including means for successively energizing said channels upon receiving said last mentioned signals; two storage registers each having lines, columns and storage elements at the crosspoints of said lines and columns; first switching means for alternately connecting said energizable channels to the columns of said two registers; second switching means for alternately connecting the output circuit of said decoder to the lines of said two registers; read-out circuits associated to said storage registers; means for connecting that one of said read-out circuits to said printing apparatus which is associated to a storage register not connected to said decoder output circuit; a gate circuit connected to said starting circuit of said decoder and governing the commencement of decoding, and further connected to said loading circuit for starting storing of decoded signals; a logic "and" circuit having two inputs and an output connected to said gate circuit for opening and closing thereof; means for passing starting pulses to said gate circuit; a flip flop connected with one of its sides to one of said two impulses of said "and" circuit; means for deriving a first control signal from any of said printing apparatus and said storage register connected thereto upon emtpying of said storage register and for feeding said first control signal to said input of said logic "and" circuit; means for feeding a signal for starting storing to the other one of said inputs of said logic "and" circuit; means for producing a second control signal upon completion of storage; means for feeding a second control signal to the other side of said flip flop whereby said logic "and" circuit is blocked thus blocking said gating circuit, and a relay circuit connected between said printing apparatus and said loading circuit reversing the connections of said two registers upon completion of printing and storing.

36. A command transfer system for interposition between a high speed printing apparatus and a computing device having a recording section with at least one recording track, comprising a decoder having an input circuit, a starting circuit and an output circuit; a track selector unit including a plurality of gating circuits having a common output; means for deriving information signals to be decoded from said computer and to apply them to said gating circuits; means for deriving track selector pulses and for separately applying them to said gating circuits and for opening one of them; means for feeding said common output to the input circuit of said decoder; means for deriving a signal from said decoder upon completion of each decoding step; a loading circuit having means to receiving said last mentioned signals, said loading circuit including a plurality of energizable channels and further including means for successively energizing said channels upon receiving said last mentioned signals; two storage registers each having lines, columns and storage elements at the crosspoints of said lines and columns; first switching means for alternately connecting said energizable channels to the columns of said two registers; second switching means for alternately connecting the output circuit of said decoder to the lines of said two registers; read-out circuit associated to said storage registers; means for connecting that one of said read-out circuits to said printing apparatus which is associated to a storage register not connected to said decoder output circuit; an electronic gate circuit for starting pulses, connected to said starting circuit of said decoder and governing the commencement of decoding, and further connected to said loading circuit for starting storing of decoded signals; a logic "and" circuit having two inputs and an output connected to said gate circuit for opening and closing thereof; a flip flop connected with one of its sides to one of said two inputs; means for deriving a first control signal from any of said printing apparatus and said storage register connected thereto upon emptying of said storage register and for feeding said first control signal to said input of said logic "and" circuit; means for feeding a signal for starting storing to the other one of said inputs of said logic "and" circuit; means for producing a second control signal upon completion of storage; means for feeding a second control signal to the other side of said flip flop whereby said logic "and" circuit is blocked thus blocking said gating circuit, and a relay circuit reversing the connections of said two registers upon completion of printing and storing.

37. A command transfer system for interposition between a high speed printing apparatus and a computing device having a recording section with at least one recording track, comprising a decoder having an input and an output circuit; said input circuit including an electronic ring counter and a gate circuit connected to and controlled by said ring counter; said gate circuit providing a plurality of channels opened successively by said ring counter; a control unit including means for starting said ring counter; means for deriving information signals to be decoded from said computer and for feeding said signals to said gate circuit for passage through any of said channels opened by said ring counter; means for deriving a signal from said decoder upon completion of each decoder step; a loading circuit having means to receive said last mentioned signals, said loading circuit including a plurality of energizable channels and further including means for successively energizing said channels upon receiving said last mentioned signals; two storage registers each having lines, columns and storage elements at the crosspoints of said lines and columns; first switching means for alternately connecting said energizable channels to the column of said two registers; second switching means for alternately connecting the output circuit of said decoder to the lines of said two registers; read-out circuits associated to said storage registers; means for connecting that one of said read-out circuits to said printing apparatus which is associated to a storage register not connected to said decoder output circuit; a gate circuit connected to said decoder and governing the commencement of decoding, and further connected to said loading circuit for starting storing of decoded signals; a logic "and" circuit having two inputs and and output connected to said gate circuit for opening and closing thereof; means for passing starting pulses to said gate circuit; a flip flop connected with one of its sides to one of said two inputs of said "and" circuit; means for deriving a first control signal upon emptying of said storage register and for feeding said first control signal to said input of said logic "and" circuit; means for a feeding signal for starting storing to the other one of said inputs of said logic "and" circuit; means for producing a second control signal upon completion of storage; means for feeding a second control signal to the other side of said flip flop whereby said logic "and" circuit is blocked thus blocking said gating circuit, and a relay circuit including said first and said second switching means, and further including said means for producing said first and said second control signal, for reversing the connections of said two registers upon completion of printing and storing.

38. A command transfer system for interposition between a high speed printing apparatus and a computing device having a recording section with at least one recording track, comprising a decoder having an information signal input circuit, a starting circuit and a signal output circuit; means for deriving information signals to be decoded from said computer and for feeding said signals to said signal input circuit of said decoder; a storage register having a read-in circuit including a loading device and a read-out circuit network; means for interconnecting the signal output circuit of said decoder and said read-in circuit of said storage register; means for interconnecting said read-out circuit network of said